(12) United States Patent
Goto et al.

(10) Patent No.: US 9,935,548 B2
(45) Date of Patent: Apr. 3, 2018

(54) POWER SUPPLY SYSTEM HAVING TWO DC POWER SUPPLIES

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Shigeaki Goto, Nagakute (JP); Masanori Ishigaki, Nagakute (JP); Shuji Tomura, Nagakute (JP); Takahide Sugiyama, Nagakute (JP); Takaji Umeno, Nagakute (JP); Masaki Okamura, Toyota (JP); Naoyoshi Takamatsu, Sunto-gun (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 15/122,571

(22) PCT Filed: Feb. 24, 2015

(86) PCT No.: PCT/JP2015/000899
§ 371 (c)(1),
(2) Date: Aug. 30, 2016

(87) PCT Pub. No.: WO2015/133087
PCT Pub. Date: Sep. 11, 2015

(65) Prior Publication Data
US 2017/0077810 A1  Mar. 16, 2017

(30) Foreign Application Priority Data
Mar. 3, 2014 (JP) .................. 2014-040445

(51) Int. Cl.
*B60L 11/18* (2006.01)
*H02M 1/088* (2006.01)
(Continued)

(52) U.S. Cl.
CPC ......... *H02M 3/158* (2013.01); *B60L 11/1855* (2013.01); *B60L 11/1866* (2013.01);
(Continued)

(58) Field of Classification Search
CPC    B60L 11/1855; B60L 11/1866; B60L 15/007; B60L 2210/10; H02M 1/088;
(Continued)

(56) References Cited

U.S. PATENT DOCUMENTS

| 2013/0134786 | A1 | 5/2013 | Ishigaki et al. |
| 2014/0145694 | A1 | 5/2014 | Ishigaki et al. |
| 2014/0361617 | A1* | 12/2014 | Ohnuki ................. H02M 3/158 307/24 |

FOREIGN PATENT DOCUMENTS

| JP | 2012-070514 A | 4/2012 |
| JP | 2013-013234 A | 1/2013 |
| JP | 2013-046446 A | 3/2013 |

* cited by examiner

*Primary Examiner* — Daniel Kessie
*Assistant Examiner* — Xuan Ly
(74) *Attorney, Agent, or Firm* — Oliff PLC

(57) ABSTRACT

A power supply system includes first and second DC power supplies and a power converter having first to fifth semiconductor elements and first and second reactors. The first and fourth semiconductor elements are electrically connected between a first node and a second node, and a first power line, respectively. Second and third switching elements are electrically connected between the first node and the second node, and a second power line, respectively. A fifth switching element is electrically connected between the first node and the second node. The first reactor is electri- (Continued)

cally connected in series with the first DC power supply, between the first node and the second power line. The second reactor is electrically connected in series with the second DC power supply, between the first power line and the second node.

13 Claims, 29 Drawing Sheets

(51) Int. Cl.
*H02M 3/158* (2006.01)
*B60L 15/00* (2006.01)
*H02M 1/00* (2006.01)

(52) U.S. Cl.
CPC ............ *B60L 15/007* (2013.01); *H02M 1/088* (2013.01); *H02M 3/1584* (2013.01); *B60L 2210/10* (2013.01); *H02M 2001/0003* (2013.01); *H02M 2001/0077* (2013.01); *Y02T 10/645* (2013.01); *Y02T 10/7005* (2013.01); *Y02T 10/705* (2013.01); *Y02T 10/92* (2013.01)

(58) Field of Classification Search
CPC ............... H02M 3/158; H02M 3/1584; H02M 2001/0003; H02M 2001/0077; Y02T 10/645; Y02T 10/7005; Y02T 10/705; Y02T 10/92
USPC .......................................................... 307/43
See application file for complete search history.

FIG.9
(a)
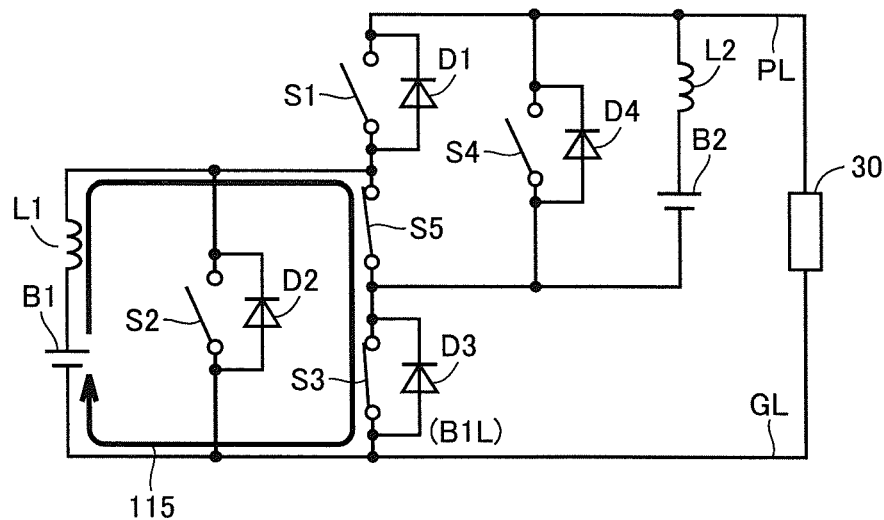
(b)
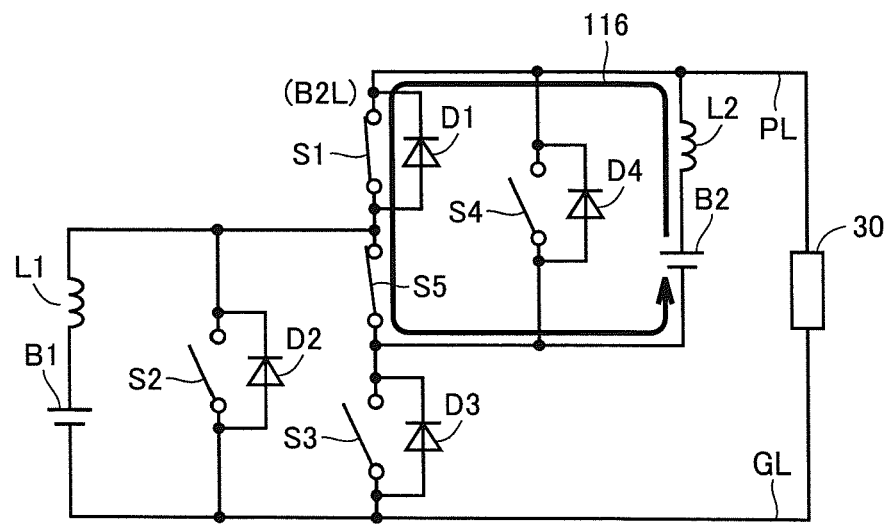

FIG.10
(a)
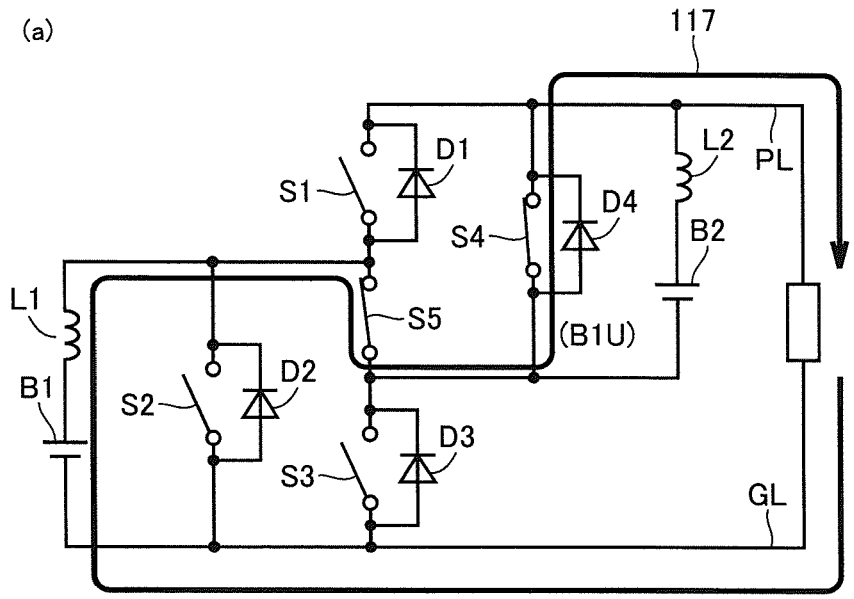
(b)
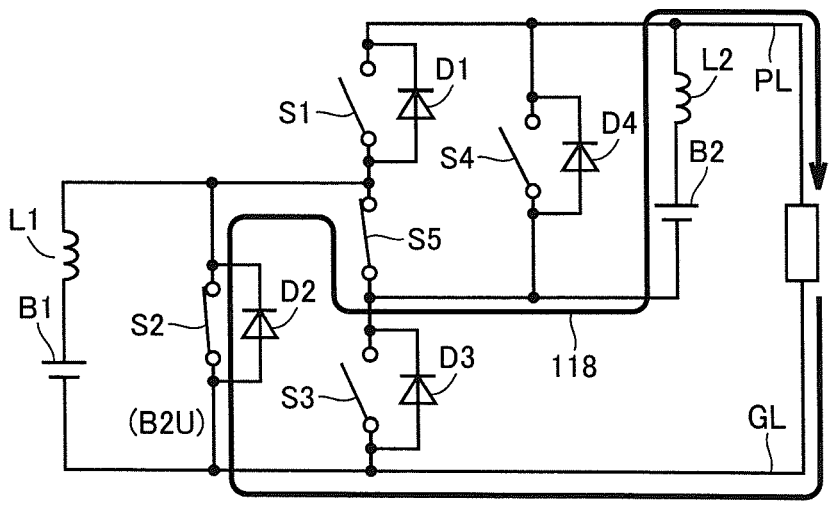

|  |  | S1 | S2 | S3 | S4 | S5 |
|---|---|---|---|---|---|---|
| FIRST ARM (S5:OFF) | B1UPPER(B1U)ON | ON | (OFF) | — | — | — |
|  | B1LOWER(B1L)ON | (OFF) | ON | — | — | — |
|  | B2UPPER(B2U)ON | — | — | ON | (OFF) | — |
|  | B2LOWER(B2L)ON | — | — | (OFF) | ON | — |
| SECOND ARM (S5:ON) | B1UPPER(B1U)ON | — | — | (OFF) | ON | ON |
|  | B1LOWER(B1L)ON | — | — | ON | (OFF) | ON |
|  | B2UPPER(B2U)ON | (OFF) | ON | — | — | ON |
|  | B2LOWER(B2L)ON | ON | (OFF) | — | — | ON |

| SWITCH | BOOLEAN EXPRESSION |
|---|---|
| S1 | /SD1 |
| S2 | SD1 |
| S3 | /SD2 |
| S4 | SD2 |
| S5 | SD1 xor SD2 |

| SD1 | SD2 | S1 | S2 | S3 | S4 | S5 |
|---|---|---|---|---|---|---|
| H (I[1]INCREASE) | L (I[2]DECREASE) | OFF | ON | ON | OFF | ON |
| H (I[1]INCREASE) | H (I[2]INCREASE) | OFF | ON | OFF | ON | OFF |
| L (I[1]DECREASE) | H (I[2]INCREASE) | ON | OFF | OFF | ON | ON |
| L (I[1]DECREASE) | L (I[2]DECREASE) | ON | OFF | ON | OFF | OFF |

FIG.22
(a)
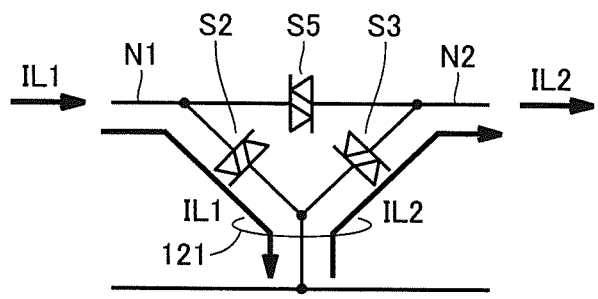
(b)
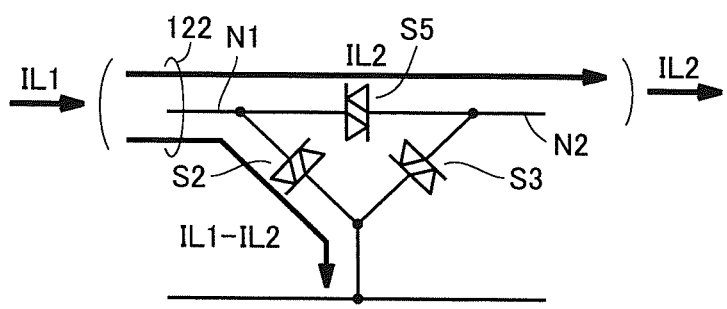
(c)
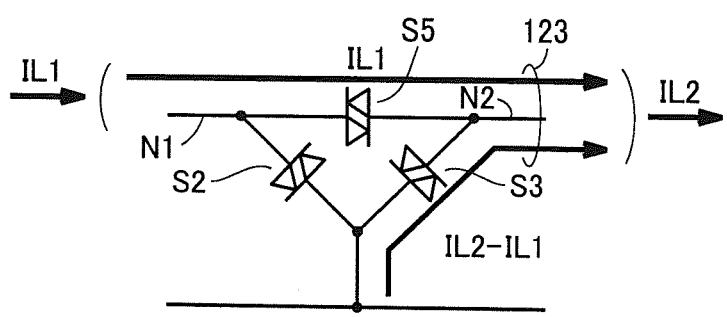
FIG.23
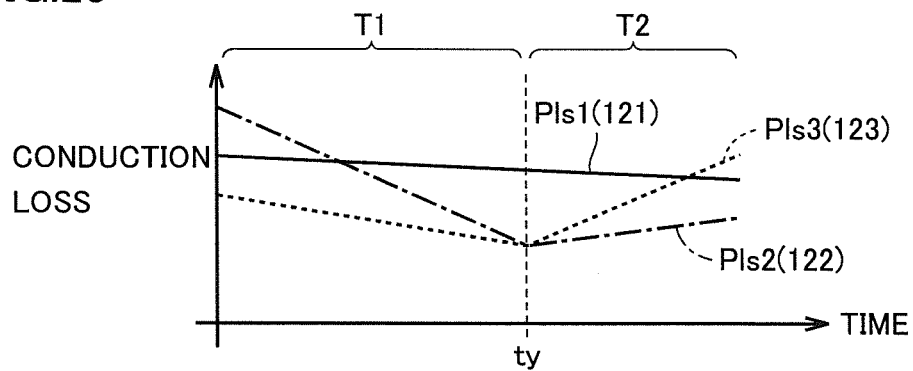

COMPLETELY CANCELED
(FIG.22(b))

FIG.28
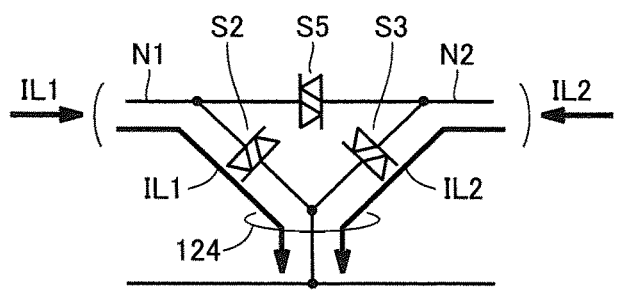
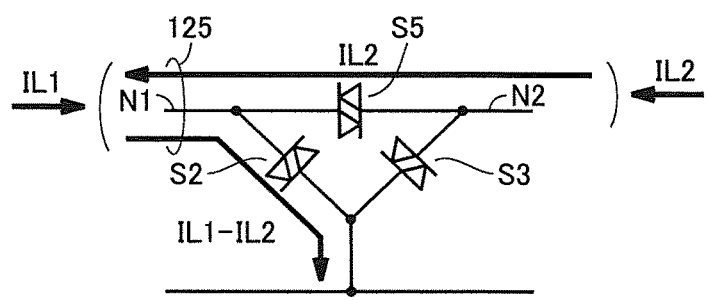
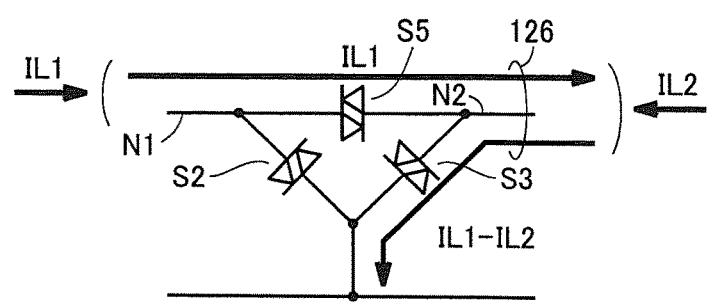
FIG.29
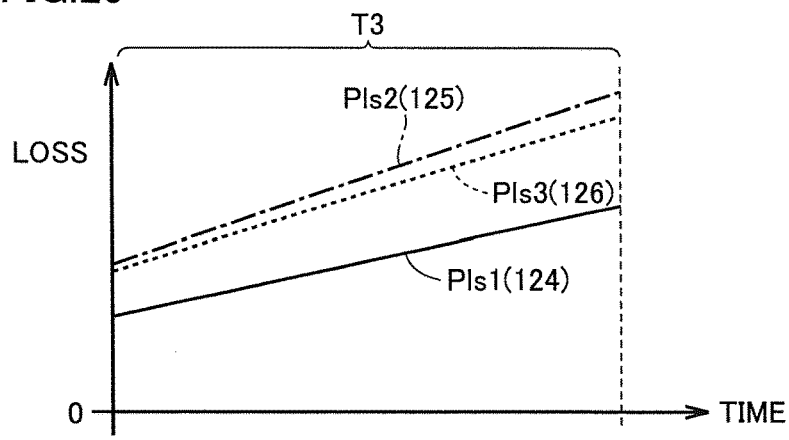

| SWITCH | BOOLEAN EXPRESSION |
|---|---|
| S1 | FIXED TO L(OFF) |
| S2 | SD |
| S3 | FIXED TO L(OFF) |
| S4 | SD |
| S5 | /SD |

FIG.42
(a)
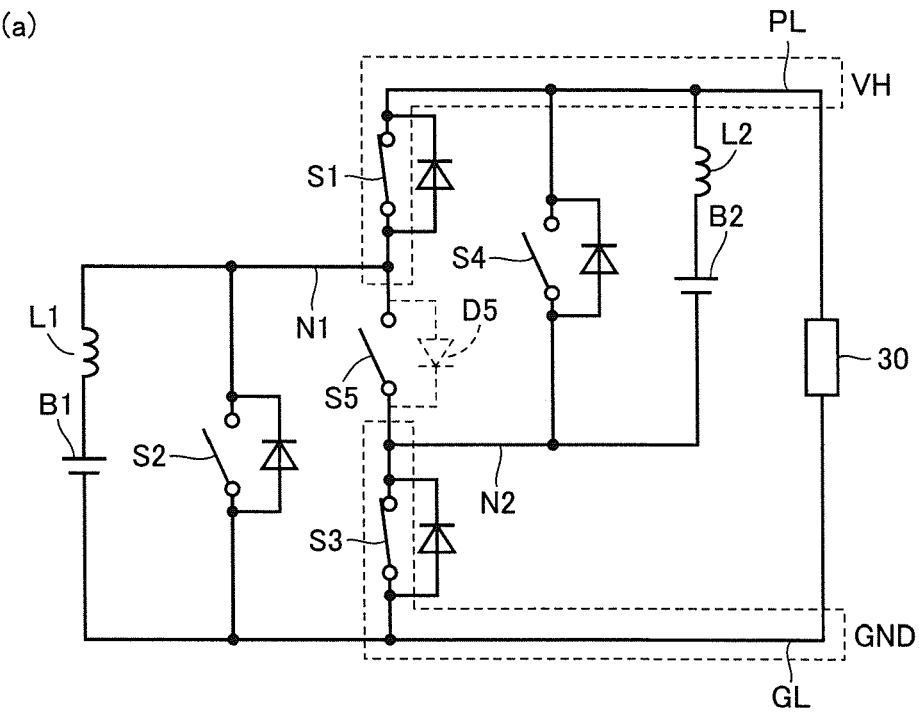
(b)
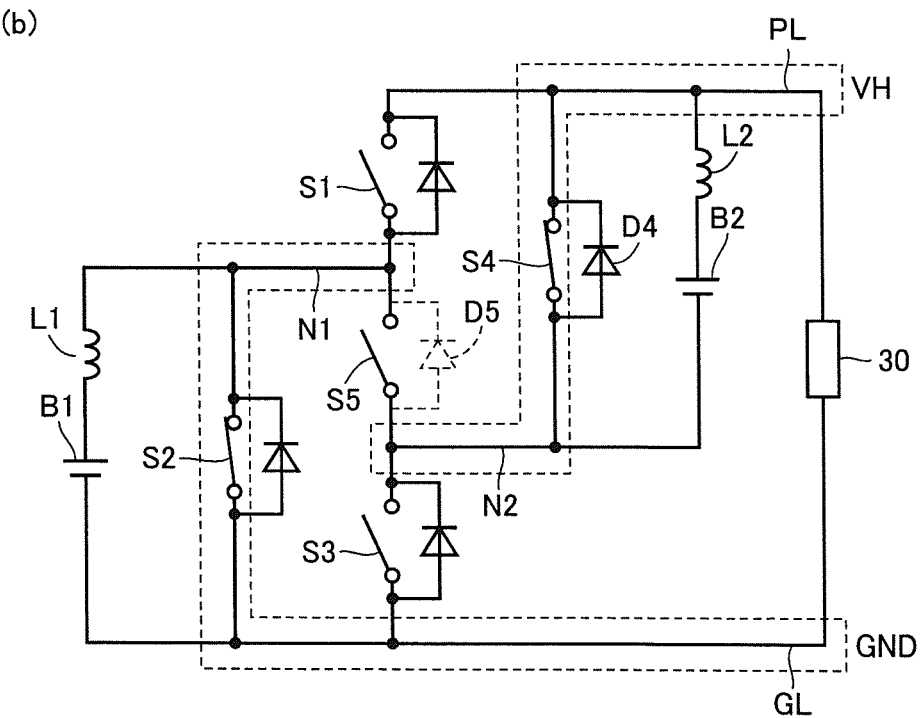

SG1~SG4,SG5a,SG5b(FROM 100)

| SWITCH | BOOLEAN EXPRESSION |
|--------|--------------------|
| S1     | FIXED TO L(OFF)    |
| S2     | SD                 |
| S3     | FIXED TO L(OFF)    |
| S4     | SD                 |
| S5a    | FIXED TO H(ON)     |
| S5b    | /SD                |

FIG.49

| MODE | POWER SUPPLY | OUTPUT VOLTAGE | S1 | S2 | S3 | S4 | S5 (S5a,S5b) |
|---|---|---|---|---|---|---|---|
| PARALLEL BOOST | B1, B2 | VH → VH* | ON/OFF CONTROL IN ACCORDANCE WITH FIG. 12 (FIG. 47) | | | | |
| SERIES BOOST | B1, B2 | VH → VH* | ON/OFF CONTROL IN ACCORDANCE WITH FIG. 35 (FIG. 44) | | | | |
| B1 BOOST | ONLY B1 | VH → VH* | /SD1 | SD1 | FIX TO OFF | FIX TO OFF | FIX TO OFF |
| B2 BOOST | ONLY B2 | VH → VH* | FIX TO OFF | FIX TO OFF | /SD2 | SD2 | FIX TO OFF |
| B1 DIRECT COUPLING | ONLY B1 | V[1] (>V[2]) | FIX TO ON | FIX TO OFF | FIX TO OFF | FIX TO OFF | FIX TO OFF |
| B2 DIRECT COUPLING | ONLY B2 | V[2] (>V[1]) | FIX TO OFF | FIX TO OFF | FIX TO ON | FIX TO OFF | FIX TO OFF |
| SERIES DIRECT COUPLING | B1, B2 | V[1] + V[2] | FIX TO OFF | FIX TO OFF | FIX TO OFF | FIX TO OFF | FIX TO ON |
| PARALLEL DIRECT COUPLING | B1, B2 | max(V[1],V[2]) | FIX TO ON | FIX TO OFF | FIX TO ON | FIX TO OFF | FIX TO OFF |

SG1,SG2,SG3,SG5a(FROM 100)

SG2,SG4,SG5a(FROM 100)

POWER SUPPLY SYSTEM HAVING TWO DC POWER SUPPLIES

TECHNICAL FIELD

This invention relates to a power supply system, and more particularly to control of a power supply system configured to include a power converter connected between two direct-current (DC) power supplies and a common power line.

BACKGROUND ART

A hybrid power supply system supplying, by using a power converter connected between a plurality of power supplies and a load, power supply to the load with the plurality of power supplies being combined, has been employed.

For example, Japanese Patent Laying-Open No. 2013-46446 (Patent Literature 1) describes a power supply system for a vehicle in which boost choppers (power converters) provided for each of a secondary battery and an auxiliary power supply which can be charged and discharge are connected in parallel.

Japanese Patent Laying-Open No. 2013-13234 (Patent Literature 2) describes a configuration of a power converter capable of switching between an operation mode in which DC/DC conversion is carried out while two DC power supplies are connected in series (a series connection mode) and an operation mode in which DC/DC conversion is carried out while two DC power supplies are used in parallel (a parallel connection mode) by switching a switching pattern of a plurality of switching elements.

CITATION LIST

Patent Literature

[PTL 1] Japanese Patent Laying-Open No. 2013-46446
[PTL 2] Japanese Patent Laying-Open No. 2013-13234

SUMMARY OF INVENTION

Technical Problem

Since the power converter described in Patent Literature 1 can control a ratio of power allocation between the secondary battery and the auxiliary power supply used in parallel, electric power supply to the load can be controlled, with charging and discharging power of the secondary battery being allowed to have a degree of freedom. Consequently, an opportunity for overcoming high-rate deterioration of the secondary battery can be ensured. The secondary battery and the auxiliary power supply, however, cannot be connected in series to each other, and hence a ratio of boost by the boost chopper is higher. Thus, increase in iron loss in a reactor or power loss caused by current ripples lowers efficiency of the power supply system.

In the power converter described in Patent Literature 2, by suppressing a boost ratio by selecting the series connection mode, a power loss in particular during output of a high voltage can be suppressed as compared with the configuration in Patent Literature 1. In the circuit configuration in Patent Literature 2, however, such a phenomenon occurs that a current for electric power conversion for a first DC power supply and a current for electric power conversion for a second DC power supply flow through a common switching element as being superimposed on each other. Thus, increase in conduction loss in the switching element depending on an amount of current which passes as compared with Patent Literature 1 is concerned.

This invention was made to solve such problems, and an object thereof is to reduce a power loss in a power supply system including two DC power supplies and achieving higher efficiency in DC electric power conversion.

Solution to Problem

According to one aspect of this invention, a power supply system for controlling a DC voltage between a first power line on a high voltage side and a second power line on a low voltage side includes a first DC power supply, a second DC power supply, a power converter for carrying out DC voltage conversion between the first and second DC power supplies and the first and second power lines, and a control device for controlling an operation of the power converter. The power converter includes first to fifth semiconductor elements and first and second reactors. The first semiconductor element is electrically connected between the first power line and a first node. The first reactor is electrically connected in series with the first DC power supply, between the first node and the second power line. The second semiconductor element is electrically connected between the second power line and the first node. The second reactor is electrically connected in series with the second DC power supply, between a second node and the first power line. The third semiconductor element is electrically connected between the second node and the second power line. The fourth semiconductor element is electrically connected between the first power line and the second node. The fifth semiconductor element is electrically connected between the first node and the second node. At least some of the first to fifth semiconductor elements each include a switching element configured to control formation and cut-off of a current path in response to a signal from the control device. The power converter operates as switching among a plurality of operation modes different in manner of DC voltage conversion, by switching a manner of on/off control of the switching element by the control device.

Advantageous Effects of Invention

A primary advantage of this invention is that a power loss in a power supply system including two DC power supplies can be reduced and higher efficiency in DC electric power conversion can be achieved.

BRIEF DESCRIPTION OF DRAWINGS

FIG. 6 is a circuit diagram showing a current path when a lower arm of each DC power supply in the equivalent circuit diagram shown in FIG. 5 is turned on.

FIG. 7 is a circuit diagram showing a current path when an upper arm of each DC power supply in the equivalent circuit diagram shown in FIG. 5 is turned on.

FIG. 9 is a circuit diagram showing a current path when the lower arm of each DC power supply in the equivalent circuit diagram shown in FIG. 8 is turned on.

FIG. 10 is a circuit diagram showing a current path when the upper arm of each DC power supply in the equivalent circuit diagram shown in FIG. 8 is turned on.

FIG. 22 is a circuit diagram for illustrating three current paths which can be formed in the equivalent circuit shown in FIG. 19.

FIG. 23 is a waveform diagram showing transition of a conduction loss in each of the three current paths shown in FIG. 22.

FIG. 28 is a circuit diagram for illustrating three current paths which can be formed during a period shown in FIG. 27.

FIG. 29 is a waveform diagram showing transition of a conduction loss in each of the three current paths shown in FIG. 28.

FIG. 42 is a circuit diagram for illustrating a reason why an anti-parallel diode cannot be disposed in a switching element operating as an upper arm in the series boost mode in the power converter shown in FIG. 1.

FIG. 49 is a chart for showing a list of a plurality of operation modes which can selectively be applied to the power converter according to the present embodiment.

DESCRIPTION OF EMBODIMENTS

Figure 1:
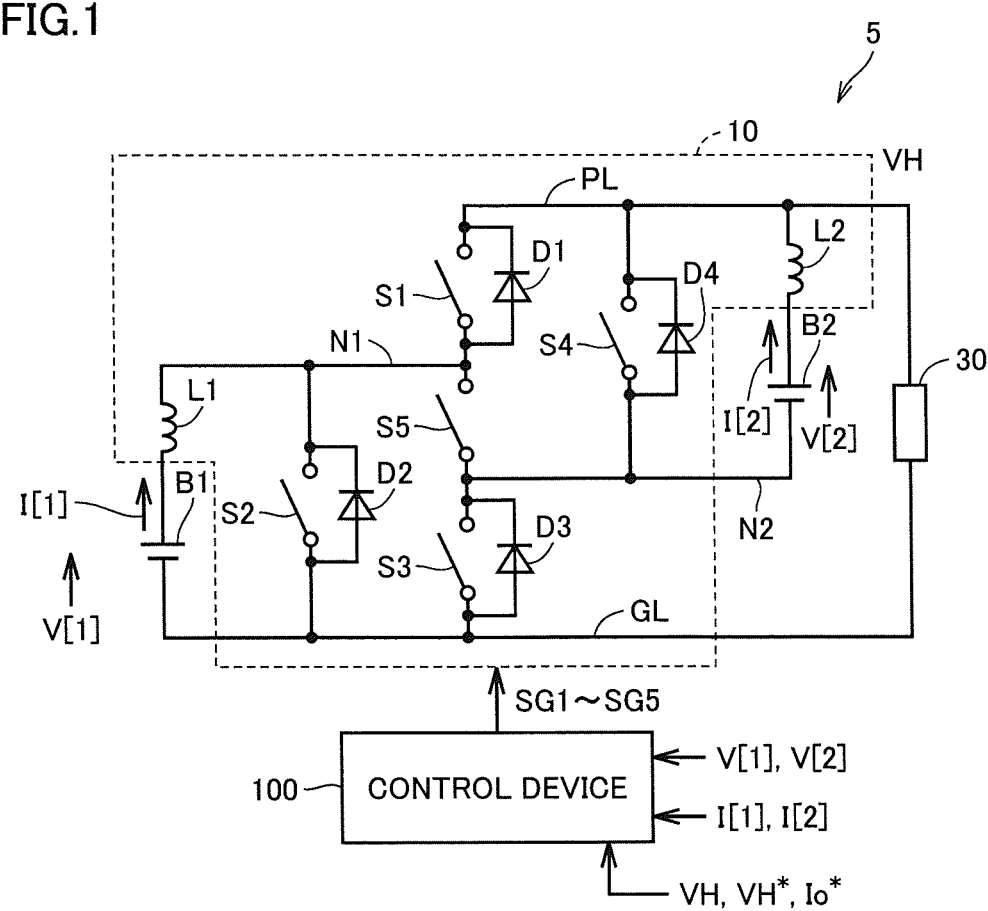
FIG. 1 is a circuit diagram showing a configuration of a power supply system according to an embodiment of the present invention.

In the following, embodiments of the present invention will be described in detail with reference to the figures. In the figures, the same or corresponding portions are denoted by the same reference characters and, basically, description thereof will not be repeated.

First Embodiment

Circuit Configuration

FIG. 1 is a circuit diagram showing a configuration of a power supply system according to an embodiment of the present invention.

Referring to FIG. 1, a power supply system 5 includes a DC power supply B1, a DC power supply B2, a power converter 10, and a control device 100.

In the present embodiment, DC power supplies B1 and B2 are implemented by such a power storage device as a secondary battery or an electric double layer capacitor. For example, DC power supply B1 is implemented by such a secondary battery as a lithium ion secondary battery or a nickel metal hydride battery. DC power supply B2 is implemented by a DC voltage source element excellent in output characteristics, such as an electric double layer capacitor or a lithium ion capacitor. DC power supply B1 and DC power supply B2 correspond to the "first DC power supply" and the "second DC power supply," respectively.

DC power supplies B1 and B2 may also be implemented by power storage devices of the same type. A capacity of DC power supplies B1 and B2 is not particularly limited either. DC power supplies B1 and B2 may be implemented to be equal in capacity to each other, or one DC power supply may be higher in capacity than the other DC power supply.

Power converter 10 is configured to control a DC voltage VH (hereinafter also referred to as an output voltage VH) between a power line PL on a high voltage side and a power line GL on a low voltage side. Power line GL is representatively implemented by a ground line.

A load 30 operates as it receives output voltage VH from power converter 10. A voltage command value VH* of output voltage VH is set to a voltage suitable for an operation of load 30. Voltage command value VH* may variably be set depending on a state of load 30. Alternatively, load 30 may be configured to be able to generate charging power for DC power supply (power supplies) B1 and/or B2 through regenerative power generation.

Power converter 10 includes power semiconductor switching elements S1 to S5 and reactors L1 and L2. In the present embodiment, an insulated gate bipolar transistor (IGBT), a power metal oxide semiconductor (MOS) transistor, or a power bipolar transistor can be employed as the power semiconductor switching elements (hereinafter also simply referred to as a "switching element").

On and off of switching elements S1 to S5 can be controlled in response to control signals SG1 to SG5 from control device 100, respectively. Specifically, switching elements S1 to S5 can form current paths as they are turned on when control signals SG1 to SG5 are at the logic high level (hereinafter also denoted as the "H level"). On the other hand, switching elements S1 to S5 cut off the current paths as they are turned off when control signals SG1 to SG5 are at the logic low level (hereinafter also denoted as the "L level").

Anti-parallel diodes D1 to D4 are arranged for switching elements S1 to S4, respectively. Diodes D1 to D4 are arranged to each form a current path in a direction from power line GL toward power line PL (in the drawings, a direction upward from below) during forward biasing. On the other hand, diodes D1 to D4 form no current path during reverse biasing. Specifically, diode D1 is connected to have a direction from a node N1 toward power line PL as a forward direction, and diode D2 is connected to have a direction from power line GL toward node N1 as the forward direction. Similarly, diode D3 is connected to have a direction from power line GL toward a node N2 as the forward direction, and diode D4 is connected to have a direction from node N2 toward power line PL as the forward direction.

Switching element S1 is electrically connected between power line PL and node N1. Reactor L1 and DC power supply B1 are electrically connected in series between node N1 and power line GL. For example, reactor L1 is electrically connected between a positive electrode terminal of DC power supply B1 and node N1, and a negative electrode terminal of DC power supply B1 is electrically connected to power line GL. Switching element S2 is electrically connected between node N1 and power line GL. Even when an order of connection of reactor L1 and DC power supply B1 is interchanged, an electrically equivalent circuit configuration is maintained.

Switching element S3 is electrically connected between node N2 and power line GL. Switching element S4 is electrically connected between power line PL and node N2. Switching element S5 is electrically connected between nodes N1 and N2. Reactor L2 and DC power supply B2 are electrically connected in series between power line PL and node N2. For example, reactor L2 is electrically connected between a positive electrode terminal of DC power supply B2 and power line PL and a negative electrode terminal of DC power supply B2 is electrically connected to node N2. Even when an order of connection of reactor L2 and DC power supply B2 is interchanged, an electrically equivalent circuit configuration is maintained.

In the configuration example in FIG. 1, switching element S1 and diode D1 correspond to the "first semiconductor element," switching element S2 and diode D2 correspond to the "second semiconductor element," and switching element S3 and diode D3 correspond to the "third semiconductor element." Switching element S4 and diode D4 correspond to the "fourth semiconductor element," and switching element S5 corresponds to the "fifth semiconductor element." Reactors L1 and L2 correspond to the "first reactor" and the "second reactor", respectively. In the example in FIG. 1, by controlling on and off of switching elements S1 to S5, formation and cut-off of a current path can be controlled in each of the first to fifth semiconductor elements.

Control device 100 is implemented, for example, by an electronic control unit (ECU) having a central processing unit (CPU) and a memory which are not shown. Control device 100 is configured to perform operation processing using a detection value from each sensor, based on a map and a program stored in the memory. Alternatively, at least a part of control device 100 may be configured to perform prescribed numeric and logical operation processing with such hardware as an electronic circuit.

Control device 100 generates control signals SG1 to SG5 controlling on and off of switching elements S1 to S5 for controlling output voltage VH. Though illustration is not provided in FIG. 1, detectors (voltage sensors) for a voltage (denoted as V[1]) and a current (denoted as I[1]) of DC power supply B1, a voltage (denoted as V[2]) and a current (denoted as I[2]) of DC power supply B2, and output voltage VH are provided. Outputs from these detectors are provided to control device 100.

Figure 2:
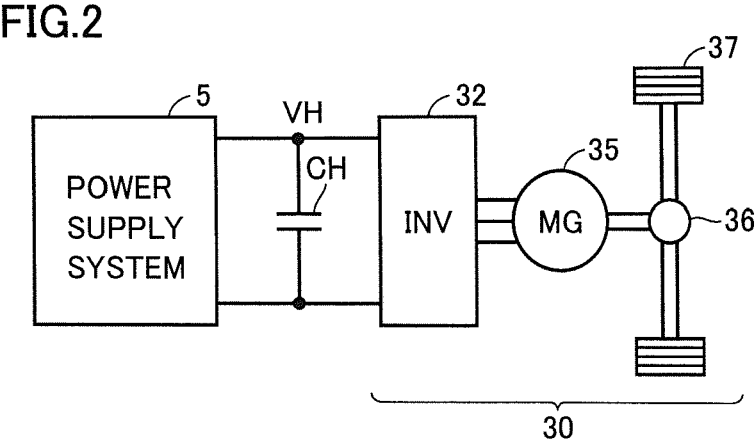
FIG. 2 is a schematic diagram showing a configuration example of a load.

FIG. 2 is a schematic diagram showing a configuration example of load 30.

Referring to FIG. 2, load 30 is configured to include, for example, a motor for running of an electrically powered vehicle. Load 30 includes a smoothing capacitor CH, an inverter 32, a motor generator 35, a power train 36, and a drive wheel 37.

Motor generator 35 is a motor for running, for generating vehicle driving force, and it is implemented, for example by a multiple-phase permanent magnet type synchronous motor. Output torque from motor generator 35 is transmitted to drive wheel 37 through power train 36 constituted of a reduction gear and a power split device. The electrically powered vehicle runs with torque transmitted to drive wheel 37. Motor generator 35 generates power with rotational force from drive wheel 37 during regenerative braking of the electrically powered vehicle. This generated electric power is subjected to AC/DC conversion by inverter 32. This DC power can be used as charging power for DC power supplies B1 and B2 included in power supply system 5.

In a hybrid car on which an engine (not shown) is mounted in addition to the motor generator, this engine and the motor generator 35 are operated in coordination so as to generate vehicle driving force necessary for the electrically powered vehicle. Here, DC power supplies B1 and B2 can also be charged with power generated through rotation of the engine.

Thus, the electrically powered vehicle comprehensively represents a vehicle on which a motor for running is mounted, and includes both of the hybrid car on which an engine and a motor are mounted and an electric car and a fuel cell car on which no engine is mounted.

(Operation of Power Converter)

Similarly to the power converter described in Patent Literature 2, power converter 10 has a plurality of operation modes different in manner of DC power conversion (DC/DC conversion) between DC power supplies B1 and B2 and power lines PL and GL. These operation modes are selectively applied by switching a manner of on/off control of the switching elements.

The plurality of operation modes of power converter 10 include a "parallel boost mode" for DC/DC conversion in parallel between DC power supplies B1 and B2 and power lines PL and GL and a "series boost mode" for DC/DC conversion between DC power supplies B1 and B2 connected in series and power lines PL and GL. The parallel boost mode corresponds to the "parallel connection mode" in Patent Literature 2 and the series boost mode corresponds to the "series connection mode" in Patent Literature 2. In a first embodiment, an operation in the parallel boost mode, which is defined as the basis, will be described.

As is understood from FIG. 1, power converter 10 has a circuit configuration as combination of a boost chopper circuit formed between DC power supply B1 and power lines PL and GL and a boost chopper circuit formed between DC power supply B2 and power lines PL and GL. Therefore, an operation of a basic boost chopper circuit will initially be described in detail.

Figure 3:
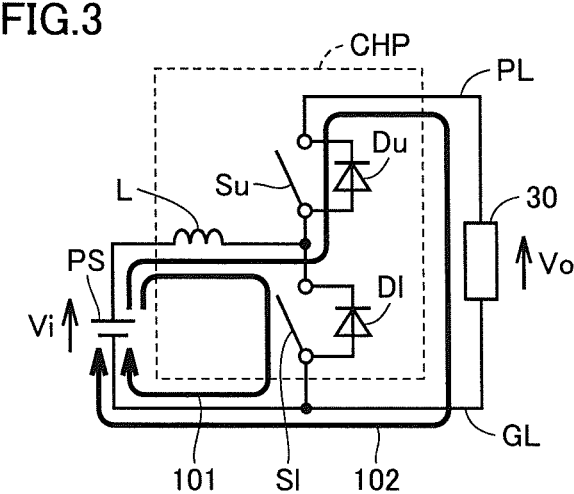
FIG. 3 is a circuit diagram showing a configuration of a basic boost chopper circuit.

FIG. 3 shows a circuit diagram showing a configuration of the basic boost chopper circuit.

Referring to FIG. 3, a boost chopper circuit CHP has a switching element Su implementing an upper arm, a switching element S1 implementing a lower arm, and a reactor L. Reactor L is electrically connected between a point of connection between switching element Su in the upper arm and switching element S1 in the lower arm and a positive electrode terminal of a DC power supply PS. Switching element Su in the upper arm and switching element S1 in the lower arm are connected in series between power lines PL and GL. Diodes Du and D1 are connected in anti-parallel to switching element Su in the upper arm and switching element S1 in the lower arm, respectively.

In boost chopper circuit CHP, an on period and an off period of the lower arm (switching element S1) are alternately provided. During the on period of the lower arm, a current path 101 through DC power supply PS, reactor L, and lower arm element S1 (on) is formed. Thus, energy is stored in reactor L.

During the off period of the lower arm, a current path 102 through DC power supply PS, reactor L, diode Du (or switching element Su), and a load 30 is formed. Thus, energy stored in reactor L during the on period of lower arm element S1 and energy from DC power supply PS are supplied to load 30. Thus, an output voltage to load 30 is boosted as compared with an output voltage from DC power supply PS.

Switching element Su in the upper arm should be turned off during the on period of switching element S1 in the lower arm. During the off period of switching element S1 in the lower arm, switching element Su in the upper arm is turned on, so that power from load 30 can be regenerated to DC power supply PS. For example, by periodically and complementarily turning on and off switching element Su in the upper arm and switching element S1 in the lower arm, DC/DC conversion can be carried out for both of regeneration and power running while controlling output voltage VH, without switching a manner of switching control (on/off control) in accordance with a direction of a current.

When power regeneration to DC power supply PS is not carried out, a direction of a current is limited to one direction. Therefore, it is not necessary to arrange switching element Su in the upper arm, and the upper arm can be implemented only by diode Du. In addition, it is not necessary to arrange diode D1 in the lower arm.

Figure 4:
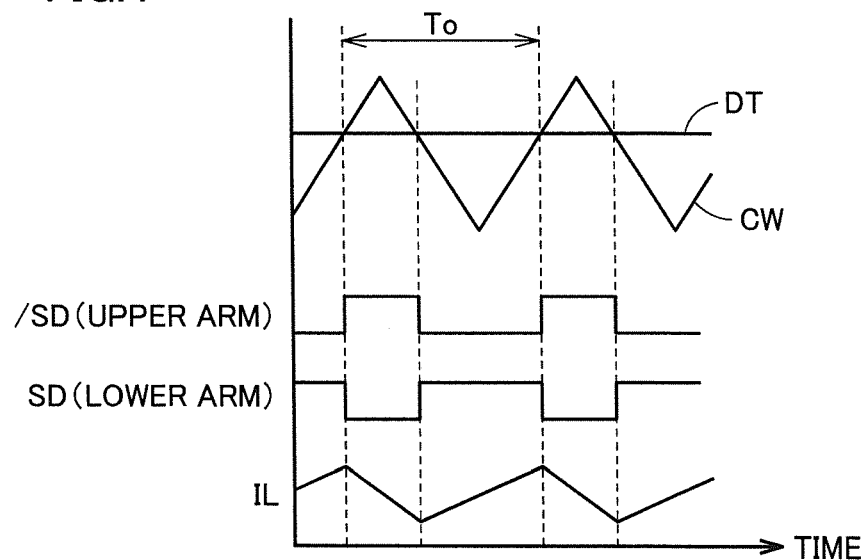
FIG. 4 is an operation waveform diagram of the boost chopper circuit shown in FIG. 3.

FIG. 4 shows an operation waveform example of the boost chopper circuit shown in FIG. 3.

Referring to FIG. 4, during the on period of the lower arm, a current which flows through reactor L (hereinafter referred to as a "reactor current") IL becomes higher and during the off period of the lower arm, reactor current IL is lowered. Therefore, by controlling a ratio between the on period and the off period of switching element S1 in the lower arm, output voltage VH can be controlled. Specifically, by raising a ratio of the on period, output voltage VH becomes higher.

A voltage conversion ratio (a boost ratio) in boost chopper circuit CHP has been known to be expressed by the Expression (1) below, by using a voltage Vi from DC power supply PS, output voltage VH, and an output duty ratio DT (hereinafter also simply referred to as a duty ratio DT). Duty ratio DT is a parameter which represents a ratio of the on period and is defined by a ratio of the on period of the lower arm (a time ratio) to a switching period To (the on period+the off period).

$$VH = 1/(1-DT) \times Vi \qquad (1)$$

In boost chopper circuit CHP, on and off of the switching element (hereinafter switching control) can be controlled based on pulse width modulation (PWM) control. For example, a control pulse signal SD for turning on and off the lower arm is generated in accordance with voltage comparison between a carrier wave CW and duty ratio DT.

Carrier wave CW is equal in period to switching period To. For example, a triangular wave is employed for carrier wave CW. A frequency of carrier wave CW corresponds to a switching frequency of switching element S1 (Su). A voltage width (peak to peak) of carrier wave CW is set to a voltage corresponding to DT=1.0.

Control pulse signal SD is set to the H level when a voltage exhibiting duty ratio DT is higher than a voltage of carrier wave CW, and set to the L level when it is lower than a voltage of carrier wave CW. A control pulse signal /SD is an inverted signal of control pulse signal SD.

On and off of switching element S1 in the lower arm is controlled in response to control pulse signal SD. Namely, switching element S1 in the lower arm is controlled to on during the H level period of control pulse signal SD, while it is controlled to off during the L level period of control pulse signal SD. On and off of switching element Su in the upper arm can be controlled periodically and complementarily to switching element S1 in the lower arm, in response to control pulse signal /SD.

As duty ratio DT is higher, the H level period of control pulse signal SD is longer and hence the on period of the lower arm is longer. Thus, with increase in output from DC power supply PS with increase in average value of current IL, output voltage VH increases. In contrast, as duty ratio DT is lower, the L level period of control pulse signal SD is longer and hence the on period of the lower arm is shorter. Thus, with lowering in output from DC power supply PS with lowering in average value of current IL, output voltage VH lowers.

(Circuit Operation in Parallel Boost Mode)

An operation and control in the parallel boost mode of power converter 10 will now be described in detail. Power converter 10 operates in such a manner that two boost chopper circuits are operated in the parallel boost mode in parallel with respect to each of DC power supplies B1 and B2. Namely, power converter 10 controls output voltage VH in accordance with voltage command value VH* by carrying out DC/DC conversion in parallel between DC power supplies B1 and B2 and power lines PL and GL (load 30), as in the parallel connection mode in Patent Literature 2.

Referring again to FIG. 1, power converter 10 is characterized by difference in boost chopper circuit formed for DC power supplies B1 and B2 between a case where switching element S5 is turned on and a case where it is turned off.

In power converter 10, while switching element S5 is off, nodes N1 and N2 are electrically disconnected from each other. An equivalent circuit of power converter 10 here is shown in FIG. 5.

Figure 5:
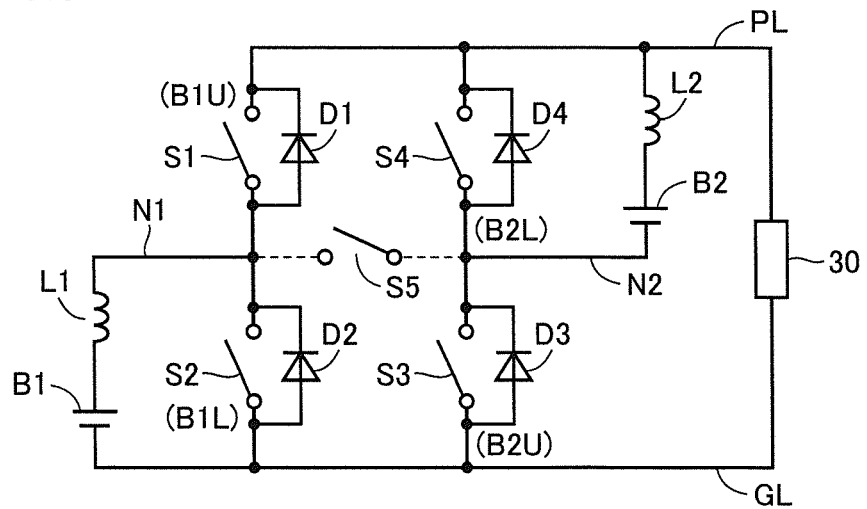
FIG. 5 is a first equivalent circuit diagram in a parallel boost mode of a power converter shown in FIG. 1.

Referring to FIG. 5, while switching element S5 is off, for DC power supply B1, such a boost chopper circuit that switching element S2 and diode D2 implement the lower arm and switching element S1 and diode D1 implement the upper arm is formed.

On the other hand, for DC power supply B2, such a boost chopper circuit that switching element S4 and diode D4 implement the lower arm and switching element S3 and diode D3 implement the upper arm is formed.

Figure 6:
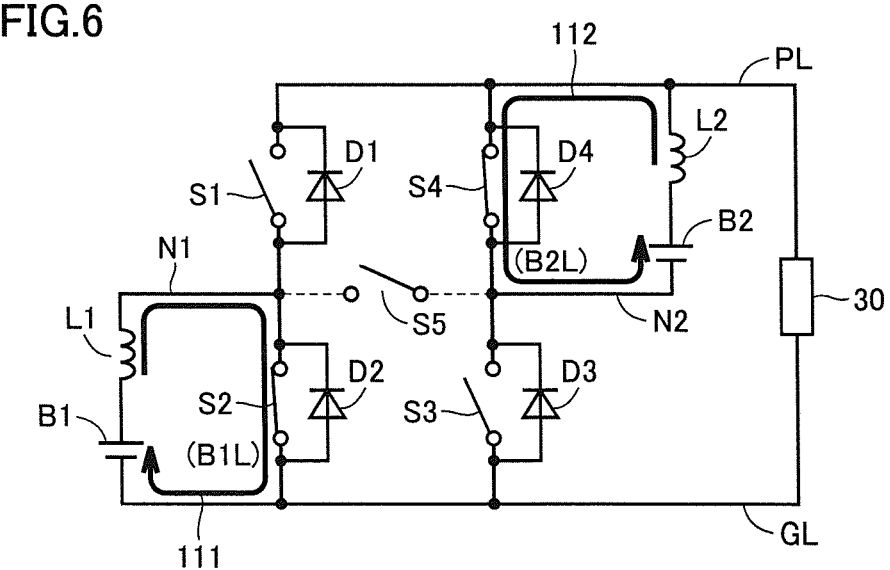

FIG. 6 shows a current path when lower arms of DC power supplies B1 and B2 in the equivalent circuit diagram shown in FIG. 5 are turned on.

Referring to FIG. 6, by turning on switching element S2, similarly to current path 101 in FIG. 3, a current path 111 for storing energy in reactor L1 with output from DC power supply B1 is formed. Namely, switching element S2 corresponds to the lower arm of the boost chopper circuit formed in correspondence with DC power supply B1.

Similarly, by turning on switching element S4, similarly to current path 101 in FIG. 3, a current path for storing energy in reactor L2 with output from DC power supply B2 is formed. Namely, switching element S4 corresponds to the lower arm of the boost chopper circuit formed in correspondence with DC power supply B2.

Figure 7:
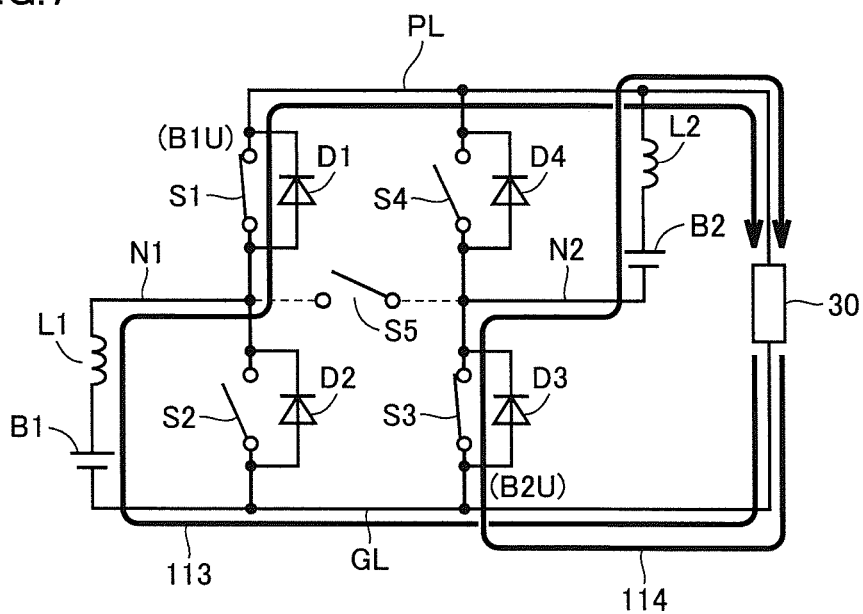

FIG. 7 shows a current path when upper arms of DC power supplies B1 and B2 in the equivalent circuit diagram shown in FIG. 5 are turned on.

Referring to FIG. 7, by turning off switching element S2, a current path 113 for outputting energy stored in reactor L1 to power line PL together with energy from DC power supply B1 through switching element S1 or diode D1 is formed. In the present embodiment, by complementarily turning on and off switching elements S1 and S2, switching element S1 is turned on during the off period of switching element S2. Switching element S1 corresponds to the upper arm of the boost chopper circuit formed in correspondence with DC power supply B1.

Similarly, by turning off switching element S4, a current path 114 for outputting energy stored in reactor L2 to power line PL together with energy from DC power supply B2 through switching element S3 or diode D3 is formed. In the present embodiment, since switching elements S3 and S4 are complementarily turned on and off, switching element S3 is turned on during the off period of switching element S4. Switching element S3 corresponds to the upper arm of the boost chopper circuit formed in correspondence with DC power supply B2.

As is understood from FIGS. 6 and 7, by alternately forming current paths 111 and 113, DC/DC conversion between DC power supply B1 and power lines PL and GL is carried out. Similarly, by alternately forming current paths 112 and 114, DC/DC conversion between DC power supply B2 and power lines PL and GL is carried out.

In the following, the upper arm of the boost chopper circuit formed in correspondence with DC power supply B1 is also referred to as a "B1U arm" and the lower arm is referred to as a "B1L arm". Similarly, the upper arm of the boost chopper circuit formed in correspondence with DC power supply B2 is also referred to as a "B2U arm" and the lower arm is also referred to as a "B2L arm".

As is understood from FIG. 6, if a current path from node N2 toward node N1 is formed while the B1L arm and the B2L arm are formed, a short-circuiting path from power line PL to power line GL is formed and hence the current path should be cut off. Similarly, as is understood from FIG. 7, if a current path from node N1 toward node N2 is formed while the B1U arm and the B2U arm are formed, a short-circuiting path from power line PL to power line GL is formed and hence the current path should be cut off. Therefore, while the B1L arm and the B2L arm are formed and while the B1U arm and the B2U arm are formed, formation of the short-circuiting path can be avoided by turning off switching element S5.

On the other hand, in power converter 10, while switching element S5 is on, nodes N1 and N2 are electrically connected to each other. An equivalent circuit of power converter 10 at this time is shown in FIG. 8.

Figure 8:
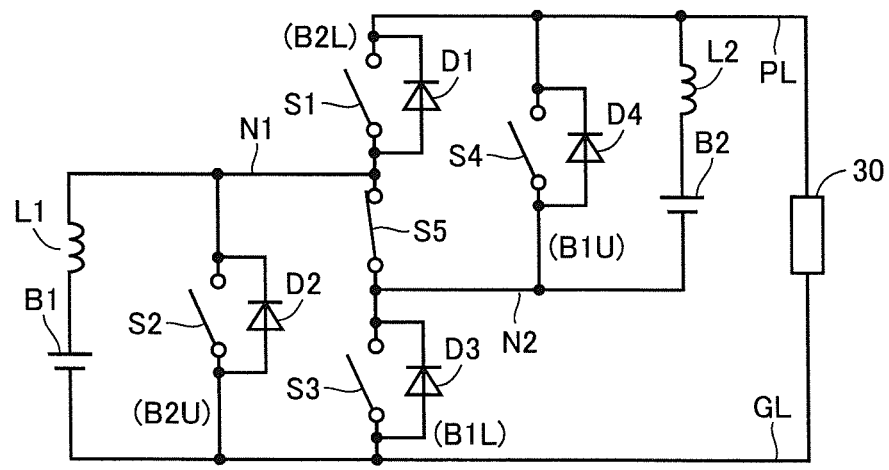
FIG. 8 is a second equivalent circuit diagram in the parallel boost mode of the power converter shown in FIG. 1.

Referring to FIG. 8, in connection with DC power supply B1, switching element S5 allows electrical connection of node N2 to node N1, and hence switching element S3 connected between node N2 and power line GL can serve as the lower arm (the B1L arm) of DC power supply B1 and the boost chopper circuit can thus be formed. Similarly, switching element S4 electrically connected between node N2 and power line PL serves as the upper arm (the B1U arm) of DC power supply B1 and the boost chopper circuit can thus be formed.

For DC power supply B2, the boost chopper circuit can be formed, with switching element S1 connected between node N1 and power line PL serving as the lower arm (the B2L arm) and switching element S2 serving as the upper arm (the B2U arm).

FIG. 9 shows current paths when the lower arms of DC power supplies B1 and B2 in the equivalent circuit diagram shown in FIG. 8 are turned on.

Referring to (a) of FIG. 9, by turning on switching elements S3 and S5, a current path 115 for storing energy in reactor L1 with output from DC power supply B1 is formed. As shown in (b) of FIG. 9, by turning on switching elements S1 and S5, a current path 116 for storing energy in reactor L2 with output from DC power supply B2 is formed.

FIG. 10 shows current paths when the upper arms of DC power supplies B1 and B2 in the equivalent circuit diagram shown in FIG. 8 are turned on.

Referring to (a) of FIG. 10, in connection with DC power supply B1, by turning off switching element S3 while switching element S5 is on, a current path 117 for outputting energy stored in reactor L1 to power line PL together with energy from DC power supply B1 through switching element S4 or diode D4 is formed. As described above, since switching elements S3 and S4 are complementarily turned on and off, switching element S3 can form the B1L arm and switching element S4 can form the B1U arm.

Referring to (b) of FIG. 10, in connection with DC power supply B2, by turning off switching element S1 while switching element S5 is on, a current path 118 for outputting energy stored in reactor L2 to power line PL together with energy from DC power supply B2 through switching element S2 or diode D2 is formed. As described above, since switching elements S1 and S2 are complementarily turned on and off, switching element S1 can form the B2L arm and switching element S2 can form the B2U arm.

Figures 11, 12, 13:
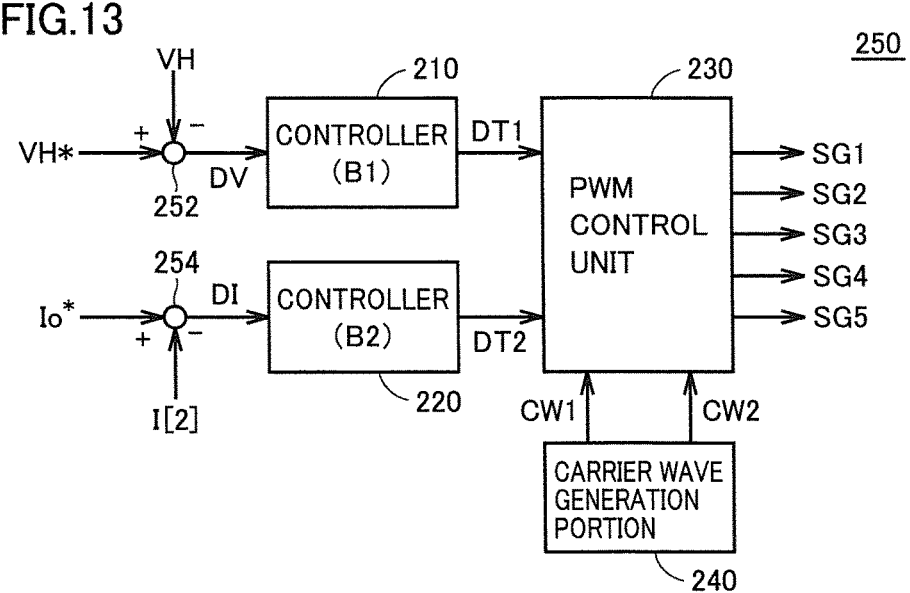
FIG. 11 shows correspondence between on and off of each arm of the boost chopper circuit including a first arm and a second arm and on and off of a switching element.
FIG. 12 is a chart showing a list of Boolean expressions for controlling on and off of each switching element in the parallel boost mode.
FIG. 13 is a functional block diagram for illustrating an example of control of output from the DC power supplies in the parallel boost mode of the power converter shown in FIG. 1.

FIG. 11 shows correspondence between each arm of the boost chopper circuit formed in each case of off and on of switching element S5 and on and off of the switching elements.

Referring to FIG. 11, each arm in the boost chopper circuit formed while switching element S5 is off (FIGS. 5 to 7) is referred to as a "first arm" and each arm of the boost chopper circuit formed while switching element S5 is on (FIGS. 8 to 10) is referred to as a "second arm".

While switching element S5 is off, that is, while the first arm is formed, for DC power supply B1, as described above, the B1L arm is turned on by turning on switching element S2 and the B1U arm is turned on by turning on switching element S1 (turning off of switching element S2). For DC power supply B2, the B2L arm is turned on by turning on switching element S4, and the B2U arm is turned on by turning on switching element S3 (turning off of switching element S4).

While switching element S5 is on, that is, while the second arm is formed, for DC power supply B1, as described above, the B1L arm is turned on by turning on switching element S3, and the B1U arm is turned on by turning on switching element S4 (turning off of switching element S3). For DC power supply B2, the B2L arm is turned on by turning on switching element S1, and the B2U arm is turned on by turning on switching element S2 (turning off of switching element S1).

Thus, in any of the first arm and the second arm, switching elements S1 and S2 are complementarily turned on and off and switching elements S3 and S4 are complementarily turned on and off, so that each of DC power supplies B1 and B2 can be controlled such that the upper arm and the lower arm are alternately turned on and off.

In the parallel boost mode of power converter 10 according to the first embodiment, DC/DC conversion is carried out by using both of the first arm and the second arm shown in FIG. 11. As shown in FIG. 11, however, switching elements S1 to S5 operate as the first arm for one of DC power supplies B1 and B2, while they operate as the second arm for the other of DC power supplies B1 and B2. Attention should be paid to such a fact that interference between the first arm and the second arm will limit a period during which the second arm can be applied.

Specifically, when the second arm is turned on for one of DC power supplies B1 and B2, the first arm on a side opposite in terms of upper and lower is turned on for the other of DC power supplies B1 and B2. For example, when switching elements S3 and S5 are turned on to thereby turn on the B1L arm of the second arm ((a) of FIG. 9), in response to on of switching element S3, as in FIG. 7, the B2U arm of the first arm is turned on for DC power supply B2. In contrast, when switching elements S4 and S5 are turned on to thereby turn on the B1U arm of the second arm ((a) of FIG. 10), as in FIG. 6, the B2L arm of the first arm is turned on for DC power supply B2.

As is understood also from FIG. 9, when both of the B1L arm and the B2L arm are turned on while the second arm is formed, a short-circuiting path is formed between power lines PL and GL through switching elements S1, S3, and S5 in the on state. Therefore, when both of the B1L arm and the B2L arm are turned on as described above, the first arm (FIG. 6) should be applied by turning off switching element S5.

Similarly, as is understood also from FIG. 10, when both of the B1U arm and the B2U arm are turned on while the second arm is formed, a short-circuiting path is formed between power lines PL and GL through switching elements S4, S5, and S2 in the on state. Therefore, when both of the B1L arm and the B2L arm are turned on as described above, the first arm (FIG. 6) should be applied by turning off switching element S5.

Therefore, a period during which the second arm can be used is limited to a period in which a command (on/off) to the upper arm and a command (on/off) to the lower arm are different from each other between DC power supplies B1 and B2. Namely, the second arm can be used only during a period in which on of the upper arm is indicated to DC power supply B1 and on of the lower arm is indicated to DC power supply B2 or during a period in which on of the lower arm is indicated to DC power supply B1 and on of the upper arm is indicated to DC power supply B2.

FIG. 12 shows Boolean expressions for controlling on and off of each of switching elements S1 to S5 in the parallel boost mode.

Referring to FIG. 12, a control pulse signal SD1 corresponds to control pulse signal SD (FIG. 4) in the boost chopper circuit corresponding to DC power supply B1. Namely, while control pulse signal SD1 is at the H level, on of the lower arm is instructed to DC power supply B1. As the H level period of control pulse signal SD1 is longer, output from DC power supply B1 increases.

A control pulse signal /SD1 is an inverted signal of control pulse signal SD1. Namely, while control pulse signal /SD1 is at the H level, on of the upper arm is instructed to DC power supply B1. As the H level period of control pulse signal /SD1 (that is, the L level period of control pulse signal SD1) is longer, output from DC power supply B1 decreases.

Similarly, a control pulse signal SD2 corresponds to control pulse signal SD (FIG. 4) in the boost chopper circuit corresponding to DC power supply B2, and a control pulse signal /SD2 is an inverted signal of control pulse signal SD2. Namely, while control pulse signal SD2 is at the H level, on of the lower arm of DC power supply B2 is instructed, and while control pulse signal /SD2 is at the H level, on of the upper arm of DC power supply B2 is instructed. Then, as the H level period of control pulse signal SD2 is longer, output from DC power supply B2 increases, and as the H level period of control pulse signal /SD1 (that is, the L level period of control pulse signal SD1) is longer, output from DC power supply B1 decreases.

In the parallel boost mode of power converter 10, on and off of switching element S2 is controlled in correspondence with control pulse signal SD1, and switching element S1 is turned on and off in response to control pulse signal /SD1. On and off of switching element S4 is controlled in response to control pulse signal SD2, and switching element S3 is turned on and off in response to control pulse signal /SD2. On and off of switching element S5 is controlled in accordance with an exclusive OR (xor) of control pulse signals SD1 and SD2.

When control pulse signals SD1 and SD2 are equal in logical level to each other (that is, SD1=SD2=H or SD1=SD2=L), switching element S5 is turned off. Namely, when states of on and off of switching elements S2 and S4 are the same, switching element S5 is turned off. Here, the boost chopper circuit including the first arm is implemented for each of DC power supplies B1 and B2.

Therefore, when the first arm is used, the logical levels of control pulse signals SD1 and SD2 are equal to each other, and hence it is understood that switching elements S2 and S4 are commonly turned on and off. Switching elements S1 and S3 are also commonly turned on and off. A pair of switching elements S1 and S3 and a pair of switching elements S2 and S4 are turned on and off complementarily. Therefore, complementary on and off of switching elements S1 and S2 and complementary on and off of switching elements S3 and S4 are ensured.

On the other hand, when control pulse signals SD1 and SD2 are different in logical level from each other (that is, SD1=H, SD2=L, or SD1=L, SD2=H), switching element S5 is turned on. Namely, when states of on and off of switching elements S2 and S4 are different from each other, switching element S5 is turned on. Here, the boost chopper circuit including the second arm is implemented for each of DC power supplies B1 and B2.

Therefore, when the second arm is used, switching elements S2 and S3 are commonly turned on and off and switching elements S1 and S4 are commonly turned on and off. Then, the pair of switching elements S1 and S3 and the pair of switching elements S2 and S4 are turned on and off complementarily. Therefore, when the second arm is used as well, complementary on and off of switching elements S1 and S2 and complementary on and off of switching elements S3 and S4 are ensured.

Thus, by controlling on and off of switching elements S1 to S5 in response to control pulse signals SD1 and SD2 in accordance with the Boolean expressions shown in FIG. 12, DC/DC conversion in the parallel boost mode can be carried out while automatic selection between the boost chopper circuit including the first arm and the boost chopper circuit using formation of the second arm is made. In particular, by controlling formation/cut-off of a current path between nodes N1 and N2 through switching element S5, switching between the first arm and the second arm can be made while formation of a short-circuiting path between power lines PL and GL is avoided.

FIG. 13 is a functional block diagram for illustrating an example of control of output from DC power supplies B1 and B2 in the parallel boost mode of power converter 10. In the following, a function of the functional block in each functional block diagram represented by FIG. 13 is implemented by software processing and/or hardware processing by control device 100.

Referring to FIG. 13, in the parallel boost mode, as in the parallel connection mode in Patent Literature 2, output from one of DC power supplies B1 and B2 can be controlled so as to compensate for a voltage difference DV (DV=VH*−VH) in output voltage VH (voltage control), and output from the other of DC power supplies B1 and B2 can be controlled so as to compensate for a current difference of current I[1] or I[2] (current control). For example, a command value (Io*) for current control can be set in order to control output power from the power supply.

By way of example, a converter control unit 250 in the parallel boost mode controls power converter 10 so as to subject output from DC power supply B1 to voltage control and subject output from DC power supply B2 to current control. In this case, by using a power command value P[2]* and voltage V[2] of DC power supply B2 so as to set Io*=P[2]*/V[2], an input/output voltage of DC power supply B2 can be controlled in accordance with power command value P[2]*.

Converter control unit 250 includes subtraction portions 252 and 254, a controller 210 for controlling output from DC power supply B1, a controller 220 for controlling output from DC power supply B2, a PWM control unit 230, and a carrier wave generation portion 240.

Subtraction portion 252 calculates voltage difference DV (DV=VH*−VH) for voltage control. Controller 210 operates an output duty ratio DT1 of DC power supply B1 (hereinafter simply referred to as duty ratio DT1) through feedback control for compensating for voltage difference DV (for example, PI control). Duty ratio DT1 can also be operated, with a theoretical boost ratio found from a voltage ratio between output voltage V[1] from DC power supply B1 and voltage command value VH* being further reflected.

Subtraction portion 254 calculates a current difference DI (DI=Io*−I[2]) for current control. Controller 220 operates an output duty ratio DT2 of DC power supply B2 (hereinafter simply referred to as duty ratio DT2) through feedback control for compensating for current difference DI (for example, PI control). Duty ratio DT2 can also be operated, with a theoretical boost ratio found from a voltage ratio between output voltage V[2] from DC power supply B2 and voltage command value VH* being further reflected.

Carrier wave generation portion 240 generates a carrier wave CW1 used for control of DC power supply B1 and CW2 used for control of DC power supply B2. PWM control unit 230 generates control signals SG1 to SG5 based on combination between PWM control based on comparison between duty ratio DT1 and carrier wave CW1 and PWM control based on comparison between carrier wave CW2 and duty ratio DT2. Carrier waves CW1 and CW2 have the same frequency corresponding to a switching frequency.

Figures 14, 15:
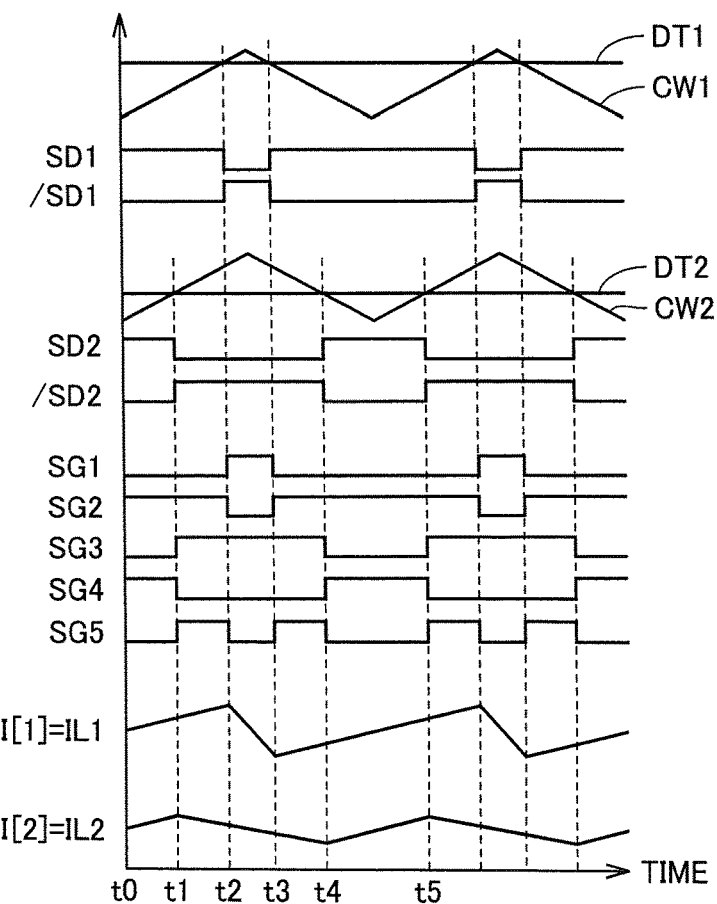
FIG. 14 is a waveform diagram for illustrating an operation of a PWM control unit shown in FIG. 13.
FIG. 15 is a chart showing a list of switching patterns in the parallel boost mode.

FIG. 14 shows a waveform diagram for illustrating an operation of PWM control unit 230 in the parallel connection mode.

Referring to FIG. 14, for DC power supply B1, control pulse signals SD1 and /SD1 are generated through PWM control based on voltage comparison between carrier wave CW1 and duty ratio DT1. During a period in which a condition of DT1>CW1 is satisfied, control pulse signal SD1 is set to the H level, and during a period in which a condition of CW1>DT1 is satisfied, control pulse signal SD1 is set to the L level. Therefore, with increase in duty ratio DT1, the H level period of control pulse signal SD1 is longer and the L level period of control pulse signal /SD1 is shorter. As described above, since on of the lower arm of DC power supply B1 is indicated during the H level period of control pulse signal SD1, output from DC power supply B1 increases with increase in duty ratio DT1, while output from DC power supply B1 decreases with lowering in duty ratio DT1. Thus, a ratio between the on period and the off period of switching element S2 is controlled based on control pulse signal SD1 for control of output from DC power supply B1.

Similarly, for DC power supply B2 as well, control pulse signals SD2 and /SD2 are generated through PWM control based on voltage comparison between duty ratio DT2 and carrier wave CW2. Similarly to control pulse signals SD1 and /SD1, during a period in which a condition of DT2>CW2 is satisfied, control pulse signal SD2 is set to the H level, and during a period in which a condition of CW2>DT2 is satisfied, control pulse signal SD2 is set to the L level. During the H level period of control pulse signal SD2, on of the lower arm of DC power supply B2 is indicated, and hence output from DC power supply B2 increases with increase in duty ratio DT2 while output from DC power supply B2 decreases with lowering in duty ratio DT2. Thus, a ratio between the on period and the off period of switching element S4 is controlled based on control pulse signal SD2 for control of output from DC power supply B2.

Control signals SG1 to SG5 are generated in response to control pulse signals SD1, /SD1, SD2, and /SD2 obtained through PWM control, in accordance with the Boolean expressions shown in FIG. 12. Here, in accordance with the Boolean expressions shown in FIG. 12, a switching pattern of switching elements S1 to S5 is limited to four shown in FIG. 15, depending on combination between the H/L level of control pulse signal SD1 and the H/L level of control pulse signal SD2.

FIG. 15 is a chart showing a list of on/off patterns (switching patterns) of switching elements S1 to S5 in the parallel boost mode.

Referring to FIG. 15, during a period from time t0 to t1, a condition of SD1=SD2=H is satisfied. Here, as shown in FIG. 15, a condition of control signal SG1=SG3=SG5=L is satisfied, while a condition of SG2=SG4=H is satisfied. Therefore, under such a condition that switching element S5 is turned off and the boost chopper circuit including the first arm is formed, switching elements S1 and S3 are turned off while switching elements S2 and S4 are turned on.

Here, as is understood from FIG. 11, the B1L arm and the B2L arm of the first arm are turned on. Namely, on of the lower arm is indicated to each of DC power supplies B1 and B2. Therefore, during the period from time t0 to t1, both of reactor currents IL1 and IL2 increase. As is clear from the circuit configuration in FIG. 1, reactor current IL1 corresponds to current I[1] from DC power supply B1, and reactor current IL2 corresponds to current I[2] from DC power supply B2.

Referring again to FIG. 14, since control pulse signal SD2 changes from the H level to the L level at time t1, during a period from time t1 to t2, a condition of SD1=H and SD2=L is satisfied. Here, as shown in FIG. 15, a condition of control signal SG2=SG3=SG5=H is satisfied, while a condition of SG1=SG4=L is satisfied. Therefore, under such a condition that switching element S5 is turned on and the boost chopper circuit including the second arm is formed, switching elements S2 and S3 are turned on while switching elements S1 and S4 are turned off.

Here, as is understood from FIG. 11, the B1L arm and the B2U arm of the first arm are turned on. Namely, on of the lower arm is indicated to DC power supply B1, while on of the upper arm is indicated to DC power supply B2. Therefore, during the period from time t1 to t2, reactor current IL1 increases while reactor current IL2 lowers.

Referring again to FIG. 14, since control pulse signal SD1 changes from the H level to the L level at time t2, during a period from time t2 to t3, a condition of SD1=SD2=L is satisfied. Here, as shown in FIG. 15, a condition of control signal SG2=SG4=SG5=L is satisfied, while a condition of SG1=SG3=H is satisfied. Therefore, under such a condition that switching element S5 is turned off and the boost chopper circuit including the first arm is formed, switching elements S1 and S3 are turned on and switching elements S2 and S4 are turned off.

Here, as is understood from FIG. 11, the B1U arm and the B2U arm of the first arm are turned on. Namely, on of the upper arm is indicated to each of DC power supplies B1 and B2. Therefore, during the period from time t2 to t3, both of reactor currents IL1 and IL2 lower.

Referring again to FIG. 14, since control pulse signal SD1 changes from the L level to the H level at time t3, during a period from time t3 to t4, a condition of SD1=H and SD2=L is satisfied. Therefore, as a switching pattern during the period from time t0 to t1 is reproduced, under such a condition that the first arm is used, switching elements S1 to S5 are controlled such that reactor current IL1 increases while reactor current IL2 lowers.

In the operation example in FIG. 14, since a condition of DT1>DT2 is satisfied, in contrast to the period from time t0 to t1, there is no period during which a condition of SD1=L and SD2=H is satisfied. During that period, however, as shown in FIG. 15, a condition of control signal SG1=SG4=SG5=H is satisfied, while a condition of SG2=SG3=L is satisfied. Therefore, under such a condition that switching element S5 is turned on and the boost chopper circuit including the second arm is formed, switching elements S1 and S4 are turned on while switching elements S2 and S3 are turned off.

Here, as is understood from FIG. 11, the B1U arm and the B2L arm of the second arm are turned on. Namely, on of the lower arm is indicated to DC power supply B2, while on of the upper arm is indicated to DC power supply B1. Therefore, it is understood that, during that period, switching elements S1 to S5 are controlled such that reactor current IL2 increases while reactor current IL1 lowers.

At time t4 or later in FIG. 14 as well, switching elements S1 to S5 can similarly be controlled in accordance with the switching pattern shown in FIG. 15 through PWM control in accordance with duty ratios DT1 and DT2.

Thus, according to power converter 10 in the first embodiment, in the parallel boost mode, on and off of switching elements S1 to S5 is controlled in accordance with duty ratios DT1 and DT2 for control of output from DC power supplies B1 and B2, in accordance with the Boolean expressions shown in FIG. 12. Thus, DC power supplies B1 and B2 can carry out DC/DC conversion in parallel for power lines PL and GL, while switching between a period in which the boost chopper circuit including the first arm is formed and a period in which the boost chopper circuit including the second arm is formed is automatically made.

In particular, power converter 10 can be controlled such that one of DC power supplies B1 and B2 is subjected to voltage control (VH to VH*) and the other of DC power supplies B1 and B2 is subjected to current control (I[1] or I[2] to Io*) through control of output from DC power supplies B1 and B2 based on duty ratios DT1 and DT2. Thus, in the parallel boost mode, input/output power of the DC power supply subjected to current control, of input/output power (input/output power of power converter 10 as a whole) to/from load 30, can be controlled.

Namely, power converter 10 can control power allocation between DC power supplies B1 and B2 and can control output voltage VH to voltage command value VH* in the parallel boost mode, as in the parallel connection mode in the power converter described in Patent Literature 2.

(Power Loss in Power Converter in Parallel Boost Mode)

An effect of reduction in power loss in the parallel boost mode of power converter 10 according to the first embodiment will now be described in detail.

Power converter 10 is equivalent to the circuit configuration in which two boost chopper circuits are connected in parallel as shown in FIG. 5, that is, the power supply system in Patent Literature 1, when switching element S5 is off, that is, when the boost chopper circuit including the first arm is formed. It is understood that a power loss in switching elements S1 to S5 here is comparable to that in the power converter in Patent Literature 1.

On the other hand, the power converter shown in Patent Literature 2 has such a circuit configuration that switching between the series connection mode and the parallel connection mode can be made in accordance with switching patterns. Therefore, it is concerned that a conduction loss increases due to flows of currents resulting from DC/DC conversion for two DC power supplies as being superimposed on each other through some switching elements. Namely, there is a concern that a power loss in the switching element is greater than in the power converter in Patent Literature 1 in the parallel connection mode of the power converter in Patent Literature 2.

In contrast, in power converter 10 according to the first embodiment, as will be described below, a conduction loss in the switching element can be reduced by providing a period in which the boost chopper circuit including the second arm described above is formed.

Referring again to FIG. 15, when switching element S5 is turned on in power converter 10, that is, during a period in which the boost chopper circuit including the second arm is formed, there are only two patterns of a pattern in which switching elements S2, S3, and S5 are turned on (S1 and S4 are turned off) and a pattern in which switching elements S1, S4, and S5 are turned on (S2 and S3 are turned off). Namely, when the second arm is used, arms different between DC power supplies B1 and B2 are turned on.

As is understood from FIG. 8, when switching elements S1, S4, and S5 are turned on, switching elements S1 and S4 are electrically connected in parallel between node N1 and power line PL through switching element S5, as the upper arm of DC power supply B1. Switching elements S1 and S4 are electrically connected in parallel between the positive electrode terminal and the negative electrode terminal of DC power supply B2 through switching element S5 and reactor L2, as the lower arm of DC power supply B2.

When switching elements S2, S3, and S5 are turned on, switching elements S2 and S3 are electrically connected in parallel between node N2 and power line GL through switching element S5, as the upper arm of DC power supply B2. Switching elements S2 and S3 are electrically connected in parallel between the positive electrode terminal and the negative electrode terminal of DC power supply B1 through switching element S5 and reactor L1, as the lower arm of DC power supply B1.

Therefore, when switching elements S1 and S5 are each implemented by a semiconductor element having linear characteristics such as a field effect transistor or a Schottky barrier diode having a rising voltage of 0 and linear forward current-voltage characteristics in the on state, current paths formed by two switching elements are present in parallel for each of the B1L arm, the B1U arm, the B2L arm, and the B2U arm. Consequently, owing to a branching effect in a parallel circuit, a current which passes through each switching element is lowered as compared with a case that the boost chopper circuit having the first arm formed is formed, that is, a case where each arm is implemented by a single switching element. Thus, a conduction loss in the switching element dependent on an amount of current can be reduced.

Alternatively, when switching elements S1 to S5 are each implemented by a semiconductor element having non-linear characteristics such as a diode or an insulated gate bipolar transistor (IGBT), reduction in conduction loss is achieved by a mechanism not relying on a simple branching effect. The mechanism will be described in detail below.

As described above, when the second arm is used, there are only two patterns of the pattern in which switching elements S1, S4, and S5 are turned on (S2 and S3 are turned off) and the pattern in which switching elements S2, S3, and S5 are turned on (S1 and S4 are turned off). Since a phenomenon that occurs is the same in any pattern above owing to symmetry of the circuit configuration of power converter 10, an operation in the pattern in which switching elements S2, S3, and S5 are turned on (S1 and S4 are turned off), that is, in a case that the B1L arm and the B2U arm are turned on, will be described below.

Figure 16:
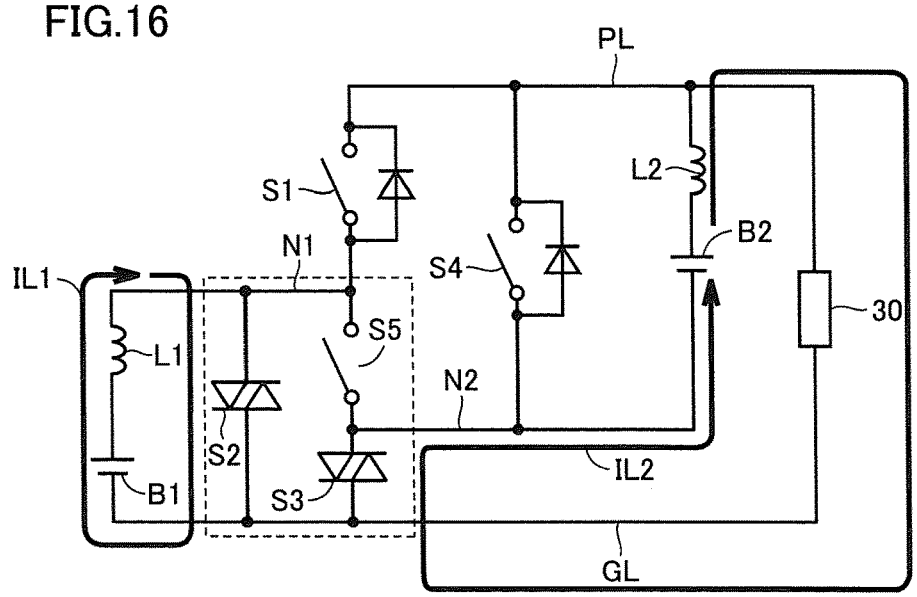
FIG. 16 is an equivalent circuit diagram of the boost chopper circuit including the first arm.

Initially, for comparison, a case that the B1L arm and the B2U arm are turned on in the boost chopper circuit including the first arm is considered. In this case, switching elements S1, S4, and S5 are turned off, while switching elements S2 and S3 are turned on. FIG. 16 shows an equivalent circuit diagram at this time.

Referring to FIG. 16, switching elements S2 and S3 are controlled to such a state that a current path can be formed as corresponding control signals SG2 and SG3 are set to the H level. Namely, switching elements S2 and S3 are equivalent to such a state that diodes are connected in parallel bidirectionally. On the other hand, since switching element S5 is off, a current path between nodes N1 and N2 has been cut off.

Figure 17:
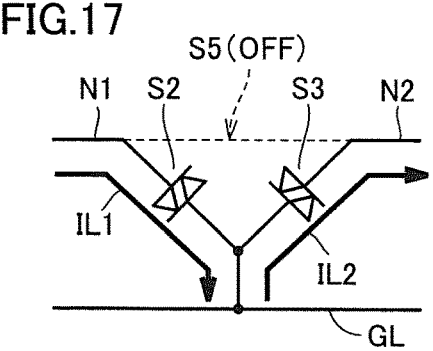
FIG. 17 is an enlarged view of a portion surrounded by a dotted line in FIG. 16.

FIG. 17 is an enlarged view of a portion surrounded by a dotted line in FIG. 16.

Referring to FIG. 17, in response to turning on of the B1L arm through switching element S2, reactor current IL1 which has passed through reactor L1 from DC power supply B1 flows through a current path from node N1 to power line GL formed by switching element S2. In response to turning on of the B2U arm through switching element S3, reactor current IL2 which has passed through reactor L2 form DC power supply B2 flows through a current path from power line GL to node N2 formed by switching element S3. Thus, when the B1L arm and the B2U arm are turned on while the first arm is formed (S5 is off), reactor current IL1 flows through switching element S2 and current IL2 flows through switching element S3.

Figure 18:
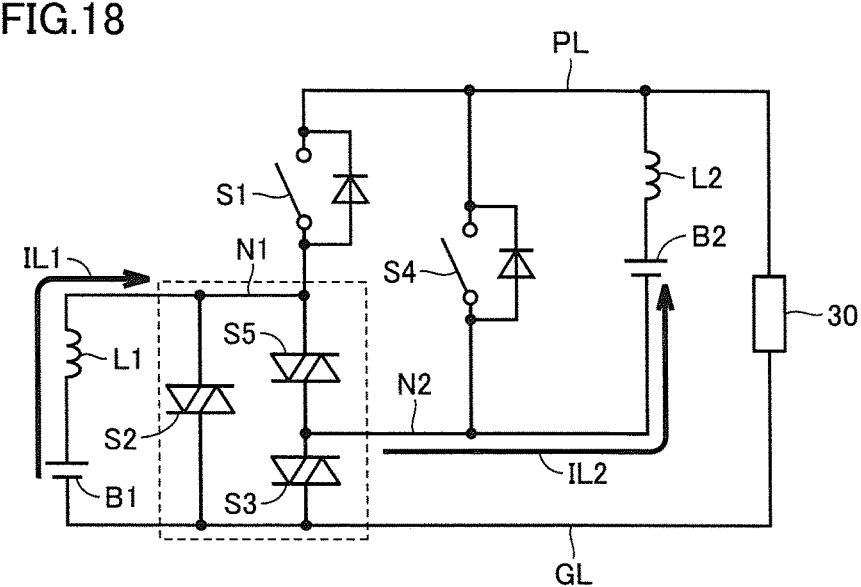
FIG. 18 is an equivalent circuit diagram of the boost chopper circuit including the second arm.

FIG. 18 is an equivalent circuit diagram at the time when the B1L arm and the B2U arm in the boost chopper circuit including the second arm are turned on.

Referring to FIG. 18, when the second arm is used, control signals SG2, SG3, and SG5 are set to the H level, so that each of switching elements S2, S3, and S5 is in such a state that a current path can be formed bidirectionally, that is, diodes are connected in parallel bidirectionally.

Figure 19:
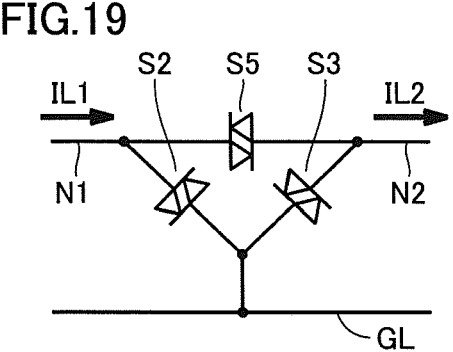
FIG. 19 is an enlarged view of a portion surrounded by a dotted line in FIG. 18.

FIG. 19 is an equivalent circuit diagram of a portion surrounded by a dotted line in FIG. 18.

Referring to FIG. 19, when the second arm is used, unlike FIG. 17, a current path can be formed between nodes N1 and N2 also through switching element S5. Therefore, paths for reactor currents IL1 and IL2 change depending on relation of potentials at nodes N1 and N2.

As shown also in FIGS. 17 and 19, a switching element having non-linear characteristics (such as an IGBT) has characteristics comparable to those of a diode in the on state. As is generally known, a diode has non-linear current-voltage characteristics, and in order to make transition to a conducting state in which a current flows, a forward voltage not lower than a rising voltage should be applied thereto.

It has been known that, in a diode, sensitivity for increase in forward voltage is lower than that for increase in current, and a high current is necessary for producing a forward voltage at least twice as high as the rising voltage. Namely, in each diode in such a conducting state as allowing passage of a current, a forward voltage substantially the same in magnitude is produced.

Owing to a property of the diode above, in the equivalent circuit shown in FIG. 19, such a state that a current flows through all of switching elements S2, S3, and S5 connected in a form of a loop (a conducting state) does not take place, because, if three substantially comparable voltages form a closed path in a loop, the Kirchhoff's voltage law does not hold whichever orientation each voltage may be in.

Therefore, in the equivalent circuit shown in FIG. 19, only two switching elements of switching elements S2, S3, and S5 can be in the conducting state. Therefore, in the equivalent circuit in FIG. 19, reduction in conduction loss owing to a simple branching effect among switching elements S2, S3, and S5 cannot be expected.

For each combination of conduction patterns of switching elements S2, S3, and S5, however, a conduction loss is different, and hence a conduction loss can be reduced by selecting a conduction path in accordance with combination which is least in loss. In particular, power converter 10 according to the present embodiment is characterized in that, in selection of a conduction path for reducing a conduction loss as above, a conduction path least in loss is automatically selected simply by turning on all switching elements S2, S3, and S5 without control with the use of a sensor. This mechanism for reducing a loss will be described in further detail below.

Figure 20:
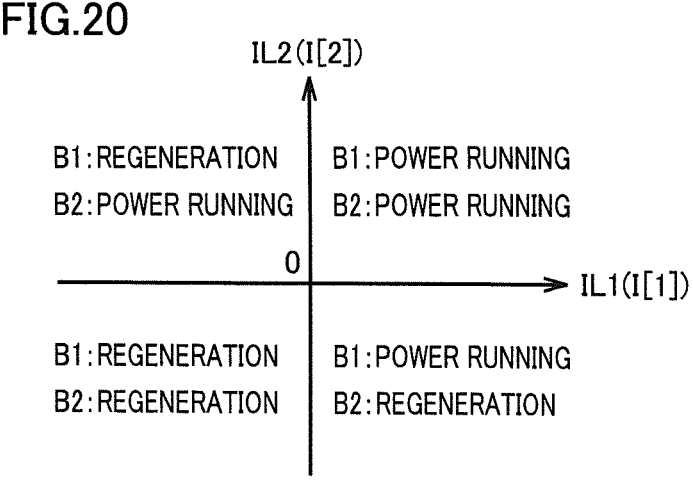
FIG. 20 is a conceptual diagram illustrating combination of orientations of reactor currents in the power converter according to a first embodiment.

Initially, in power converter 10, combination of directions of reactor currents IL1 and IL2 is categorized into four as shown in FIG. 20.

Referring to FIG. 20, based on combination of positive/negative of reactor currents IL1 and IL2, an operation region of power converter 10 is divided into a region where both of DC power supplies B1 and B2 perform a power running operation (IL1>0, IL2>0), a region where DC power supply B1 performs a regeneration operation while DC power supply B2 performs a power running operation (IL1<0, IL2>0), a region where both of DC power supplies B1 and B2 perform a regeneration operation (IL1<0, IL2<0), and a region where DC power supply B1 performs a power running operation while DC power supply B2 performs a regeneration operation (IL1>0, IL2<0).

Figure 21:
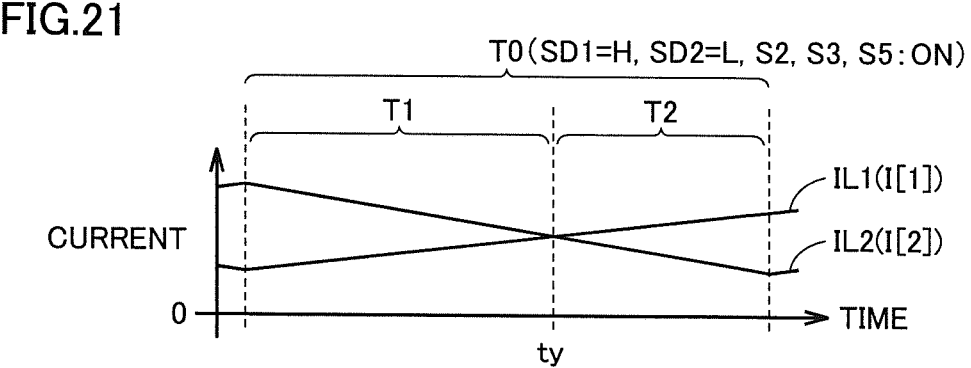
FIG. 21 is a waveform diagram showing an example of a current behavior when both of DC power supplies perform power running operations.

Initially, an operation of power converter 10 in a case that both of DC power supplies B1 and B2 perform the power running operation, that is, in a first quadrant in FIG. 14, will be described. FIG. 21 shows a waveform example of reactor currents IL1 and IL2 in this case.

Referring to FIG. 21, a current waveform during a period T0 in which reactor currents IL1 and IL2 are positive (IL1>0, IL2>0) and the B1L arm is turned on (SD1=H) while the B2U arm is turned off (SD2=L) is shown. Namely, since a condition of control pulse signals SD1=H and SD2=L is satisfied during period T0, switching elements S2, S3, and S5 are turned on.

Therefore, during period T0, reactor current IL1 increases while reactor current IL2 lowers. Period T0 is divided into a period T1 in which a condition of IL2>IL1 is satisfied and a period T2 in which a condition of IL1>IL2 is satisfied, with a time ty at which magnitude of reactor currents IL1 and IL2 is reversed being defined as the boundary.

As described above, even when switching elements S2, S3, and S5 are turned on, all of switching elements S2, S3, and S5 are not simultaneously in the conducting state. Therefore, a current path which may be formed in the equivalent circuit in FIG. 19 is any of three in (a)-(c) of FIG. 22.

Referring to (a) of FIG. 22, when switching elements S2 and S3 are in the conducting state, a current path 121 is formed. Current path 121 includes a current path in which reactor current IL1 flows through switching element S2 and a current path in which reactor current IL2 flows through switching element S3. Consequently, a sum Pls1 of conduction losses in switching elements S2, S3, and S5 is shown in the Expression (2) below:

$$Pls1 = Vfe \times (|IL1| + |IL2|) \qquad (2)$$

where Vfe represents a forward voltage of each diode corresponding to the switching element in the on state. Vfe can be regarded as a constant positive value.

Referring to (b) of FIG. 22, when switching elements S2 and S5 are in the conducting state, a current path 122 is formed. Current path 122 includes a current path in which a current (IL1−IL2) flows through switching element S2 and a current path in which reactor current IL2 flows through switching element S5. A conduction loss Pls2 in switching elements S2, S3, and S5 here is shown in the Expression (3) below.

$$Pls2 = Vfe \times (|IL2| + |IL1 - IL2|) \qquad (3)$$

Referring to (c) of FIG. 22, when switching elements S3 and S5 are in the conducting state, a current path 123 is formed. Current path 123 includes a current path in which a current (IL2−IL1) flows through switching element S3 and a current path in which reactor current IL1 flows through switching element S5. A conduction loss Pls3 in switching elements S2, S3, and S5 here is shown in the Expression (4) below.

$$Pls3 = Vfe \times (|IL1| + |IL2 - IL1|) \quad (4)$$

Current path 121 shown in (a) of FIG. 22 is the same as the current path at the time when the B1L arm and the B2U arm are turned on in the boost chopper circuit including the first arm shown in FIG. 17. Therefore, the conduction loss in (a) of FIG. 22 is comparable to that at the time when the first arm is formed.

FIG. 23 is a waveform diagram showing transition of conduction losses Pls1 to Pls3 in each of the current paths 121 to 123 shown in FIG. 22.

Referring to FIG. 23, with transition of reactor currents IL1 and IL2 as shown in FIG. 21, conduction losses Pls1 to Pls3 vary with change in IL1 and IL2, each of which is positive, in accordance with the Expressions (2) to (4).

During period T1 in which a condition of IL2>IL1 is satisfied, as is understood from comparison among the Expressions (2) to (4), conduction loss Pls3 while current path 123 ((c) of FIG. 22) is formed is less than conduction losses Pls1 and Pls2 while current paths 121 and 122 are formed.

In contrast, during period T2 in which a condition of IL1>IL2 is satisfied, conduction loss Pls2 in current path 122 ((b) of FIG. 22) is less than conduction losses Pls1 and Pls3 while current paths 121 and 123 are formed.

Here, a current path which may be formed during period T1 (IL1>IL2) is considered. Initially, in the case of current path 121 shown in (a) of FIG. 22, the sum of forward voltages of switching elements S2 and S5 is applied to switching element S5. Since this sum of the forward voltages exceeds the rising voltage of switching element S5, this phenomenon is inconsistent with an event that switching element S3 is not conducting. Therefore, during period T1, current path 121 shown in (a) of FIG. 22 is not formed.

In the case of current path 122 shown in (b) of FIG. 22, a current which flows through switching element S2 is in a direction opposite to the illustrated direction, and the sum of forward voltages of switching elements S2 and S5 is applied to switching element S3. This sum of the forward voltages exceeds the rising voltage of switching element S3. Therefore, during period T1, current path 122 in which switching element S3 is non-conducting is not formed.

On the other hand, in the case of current path 123 shown in (c) of FIG. 22, a voltage applied to switching element S2 is equal to a difference between forward voltages of switching elements S3 and S5 and it is substantially 0. This phenomenon is consistent with an event that switching element S2 is not conducting. In other words, during period T1, in the equivalent circuit shown in FIG. 19, current path 123 shown in (c) of FIG. 22 is always formed. As shown in FIG. 23, during period T1, conduction loss Pls3 in current path 123 is least.

Then, a current path which may be formed during period T2 (IL1>IL2) is considered. Initially, in the case of current path 121 shown in (a) of FIG. 22, the sum of forward voltages of switching elements S2 and S3 is applied to switching element S5. Therefore, during period T2, current path 122 in which switching element S5 is non-conducting is not formed.

In current path 123 shown in (c) of FIG. 22, a current which flows through switching element S3 is in a direction opposite to the illustrated direction, and the sum of forward voltages of switching elements S3 and S5 is applied to switching element S2. This sum of the forward voltages exceeds the rising voltage of switching element S2. Therefore, during period T2, current path 123 in which switching element S2 is non-conducting is not formed.

On the other hand, in the case of current path 122 shown in (b) of FIG. 22, a voltage applied to switching element S3 is equal to a difference between forward voltages of switching elements S5 and S2 and it is substantially 0. This event is consistent with an event that switching element S3 is not conducting. In other words, during period T2, in the equivalent circuit shown in FIG. 19, current path 122 shown in (b) of FIG. 22 is always formed. As shown in FIG. 23, during period T2, conduction loss Pls2 in current path 122 is least.

It is thus understood that a current path formed by switching elements S2, S3, and S5 is automatically selected, with time ty at which magnitude of reactor currents IL1 and IL2 is reversed being defined as the boundary. Furthermore, the automatically selected current path is least in conduction loss in switching elements S2, S3, and S5 which are turned on, of the three current paths shown in FIG. 22.

Figure 24:
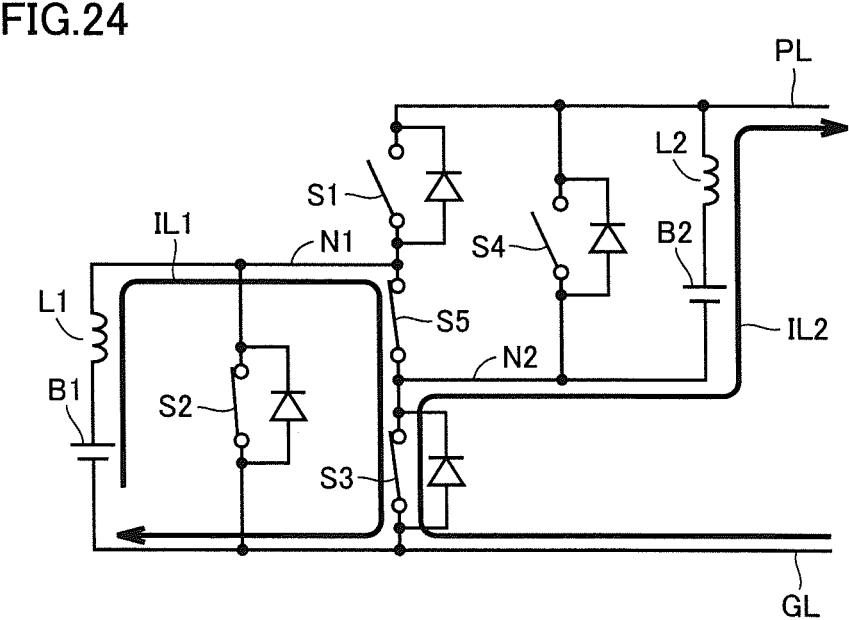
FIG. 24 is a circuit diagram for illustrating a current path formed during a first period in FIGS. 21 and 23 in the power converter according to the first embodiment.

FIG. 24 is a circuit diagram for illustrating a current path formed during period T1 in FIGS. 21 and 23 in power converter 10.

Referring to FIG. 24, during period T1, current path 123 shown in (c) of FIG. 22 is formed for switching elements S2, S3, and S5 which are turned on. Namely, though switching element S2 is turned on, no current passes therethrough. On the other hand, reactor current IL1 passes through switching element S5, while a current (IL1−IL2) passes through switching element S3.

As shown in FIG. 21, during period T1, reactor current IL2 lowers, while reactor current IL1 increases. Therefore, a current (IL2−IL1) which flows through switching element S3 gradually decreases. Then, when a condition of IL1=IL2 is satisfied at time ty (FIG. 21), a current through switching element S3 attains to 0. Thus, current path 122 shown in (b) of FIG. 22 in which no current flows through switching element S3 is formed.

Figure 25:
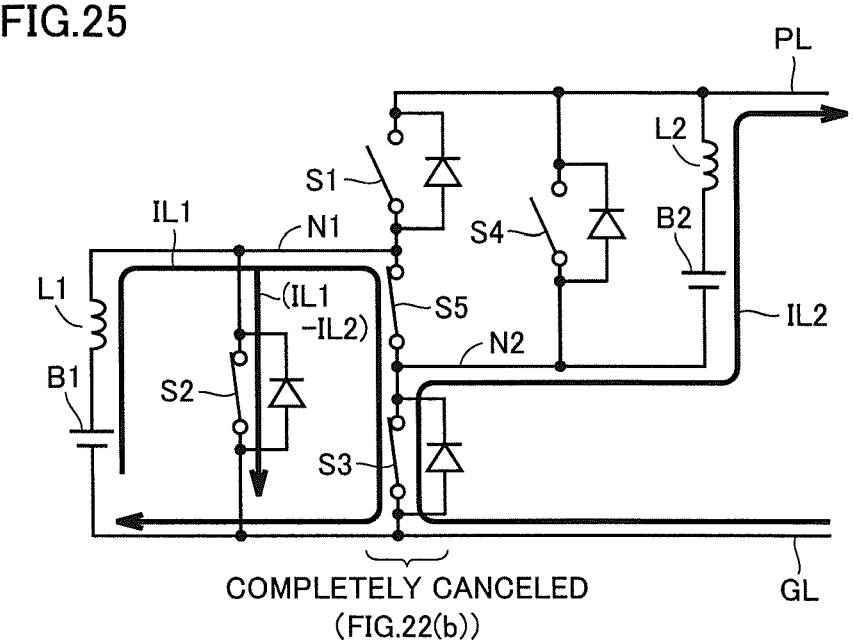
FIG. 25 is a circuit diagram for illustrating a current path formed during a second period in FIGS. 21 and 23 in the power converter according to the first embodiment.

FIG. 25 shows a current path formed during period T2 in FIGS. 21 and 23 in power converter 10.

Referring to FIG. 25, during period T2 after time ty, switching element S3 allows passage of a flow of reactor current IL2, while a potential at node N2 varies such that a current through switching element S3 maintains 0, that is, a state of the circuit in (b) of FIG. 22 is maintained.

Such change in potential at node N2 is caused as reactor current IL1 is branched to switching elements S2 and S3 and a ratio of branching varies. Namely, during period T2, in switching element S3, a current which passes is 0 because a branch current of reactor current IL1 and reactor current IL2 cancel each other.

In other words, during period T2, a ratio of branching of reactor current IL1 automatically varies in accordance with reactor current IL2 such that a state that a current through switching element S3 is 0 is maintained. Thus, during period T2, current path 122 shown in (b) of FIG. 22 is continually formed.

In the state in FIG. 25 (period T2), no conduction loss is caused in switching element S3. Furthermore, as shown also in the Expression (3), a conduction loss in accordance with reactor current IL2 is caused in switching element S5, while only a conduction loss in accordance with |IL1−IL2| smaller than IL1 is caused in switching element S2 due to branching of reactor current IL1.

A conduction loss M0 in switching elements S2 and S4 in the case that the B1L arm and the B2U arm are turned on in the boost chopper circuit including the first arm (FIG. 16) is shown in the Expression (5) in accordance with the Expressions (2) to (4).

$$Pls0 = Vfe \times (|IL1| + |IL2|) \qquad (5)$$

Based on comparison between the Expression (3) and the Expression (5), IL1 and IL2 are the same in sign, and hence it is understood that a condition of $(|IL2|+|IL1-IL2|) < (|IL1|+|IL2|)$ is satisfied. Thus, in the boost chopper circuit including the second arm, a conduction loss in the switching element is suppressed, as compared with the boost chopper circuit including the first arm.

Then, a conduction loss in the boost chopper circuit including the second arm described with reference to FIGS. 22 to 23 is compared with a conduction loss in the parallel connection mode of the power converter described in Patent Literature 2.

Figure 26:
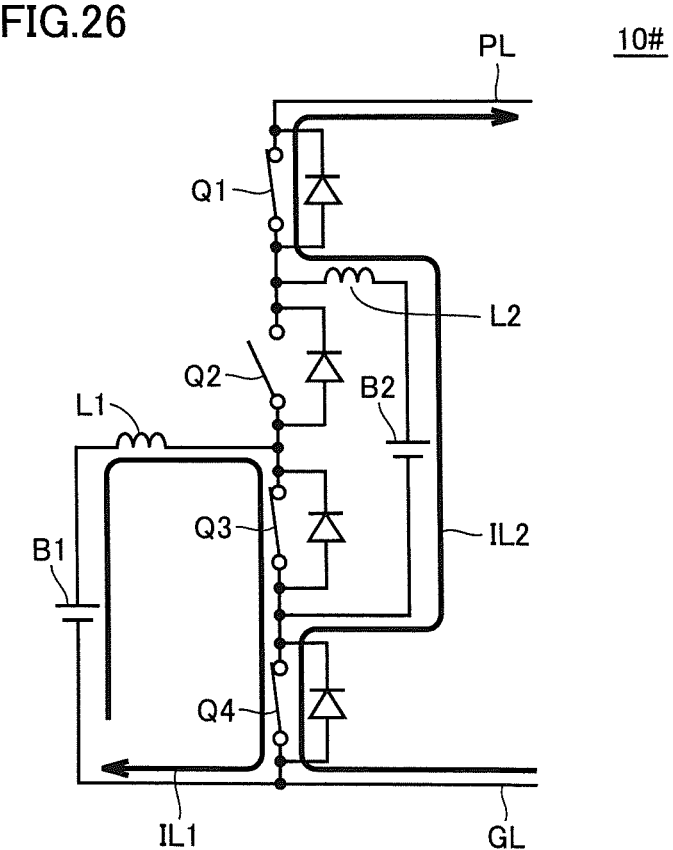
FIG. 26 is a circuit diagram for illustrating a current path when a power converter shown for comparison is operated comparably to FIG. 18.

FIG. 26 is a circuit diagram for illustrating a current path at the time when the B1L arm (DC power supply B1) and the B2U arm (DC power supply B2) are turned on in a power converter 10# shown as a comparative example. Namely, FIG. 26 shows a current path at the time when power converter 10# described in Patent Literature 2 operates in the parallel connection mode comparably to FIG. 18.

Referring to FIG. 26, in power converter 10#, switching elements Q3 and Q4 function as the lower arm of DC power supply B1, while switching elements Q1 and Q4 function as the upper arm of DC power supply B2. Therefore, while the B1L arm and the B1U arm are turned on, switching elements Q1, Q3, and Q4 are turned on in accordance with the logical sum of both of them.

In this state, reactor current IL1 forms a current path via switching elements Q3 and Q4. On the other hand, reactor current IL2 forms a current path via switching elements Q1 and Q4.

Therefore, in power converter 10#, a conduction loss in accordance with reactor current |IL1| is caused in switching element Q3 and a conduction loss in accordance with reactor current |IL2| is caused in switching element Q1. Furthermore, a conduction loss in accordance with |IL1-IL2| is caused in switching element Q4.

A conduction loss Pls# in switching elements Q1, Q3, and Q4 at this time is shown in the Expression (6), in accordance with the Expressions (2) to (5).

$$Pls\# = Vfe \times (|IL1| + |IL2| + |IL1 - IL2|) \qquad (6)$$

Based on comparison between the Expressions (5) and (6), since a condition of Pls0<Pls# is satisfied, it is understood that power converter 10# in the comparative example is greater in conduction loss in the switching element during an operation in the parallel connection mode than in the power converter in Patent Literature 1 and in power converter 10 having the boost chopper circuit including the first arm formed.

In summary, a conduction loss in the boost chopper circuit including the first arm is comparable to a conduction loss in the power converter in Patent Literature 1 and lower than a conduction loss in the parallel connection mode of the power converter in Patent Literature 2.

Furthermore, a condition of Pls2<Pls0<Pls# is satisfied based on the Expressions (3), (5), and (6). Therefore, when each of DC power supplies B1 and B2 performs the power running operation in the parallel boost mode of power converter 10, a conduction loss in the switching element is reduced during a period in which the boost chopper circuit including the second arm is formed, as compared with a case that the boost chopper including the first arm is formed.

Referring again to FIG. 20, when both of DC power supplies B1 and B2 perform the regeneration operation, that is, a condition of IL1<0 and IL2<0 is satisfied as well, current paths 121 to 123 shown in FIG. 22 are formed with a direction of a current being reversed. Therefore, in this case as well, with a mechanism the same as in a case that both of DC power supplies B1 and B2 perform the power running operation, a current path in which a conduction loss in the switching element is least is automatically selected with change in reactor currents IL1 and IL2. Namely, when both of DC power supplies B1 and B2 perform the regeneration operation as well, a conduction loss in the switching element during a period in which the boost chopper circuit is implemented by the second arm (the on period of switching element S5) is less than in the case that the boost chopper circuit is formed with the first arm.

Figure 27:
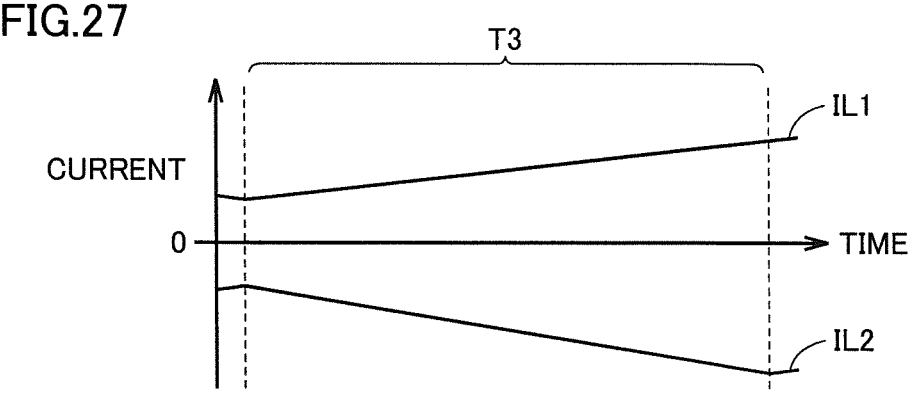
FIG. 27 is a waveform diagram showing an example of a current behavior when one DC power supply performs a power running operation and the other DC power supply performs a regeneration operation.

Then, a circuit operation at the time when one of DC power supplies B1 and B2 performs the power running operation and the other of them performs the regeneration operation during use of the second arm will now be described. By way of example, an operation of power converter 10 at the time when DC power supply B1 performs the power running operation while DC power supply B2 performs the regeneration operation, that is, a condition of IL1>0 and IL2<0 is satisfied, will be described. FIG. 27 shows a waveform example of reactor currents IL1 and IL2 in this case.

Referring to FIG. 27, a current waveform during a period T3 in which reactor current IL1 is positive while IL2 is negative (IL1>0, IL2<0), and the B1L arm is turned on (SD1=H) while the B2U arm is turned on (SD2=L) is shown. In this case as well, as shown in FIG. 18, since a condition of control pulse signals SD1=H and SD2=L is satisfied, switching elements S2, S3, and S5 are turned on. Therefore, the equivalent circuit shown in FIG. 19 is formed also during period T3.

Similarly to period T0, during period T3 as well, reactor current IL1 increases while reactor current IL2 lowers. Since reactor currents IL1 and IL2 are different from each other in orientation, a condition of IL1>IL2 is satisfied throughout period T3, unlike period T0.

FIG. 28 shows current paths in the equivalent circuit (FIG. 19) in which switching elements S2, S3, and S5 are turned on during period T3. A current path which may be formed at this time is any of three in (a)-(c) of FIG. 28, similarly to (a)-(c) of FIG. 22.

In (a) of FIG. 28, as in (a) of FIG. 22, switching elements S2 and S3 are in the conducting state. Namely, a current path 124 is formed such that reactor current IL1 flows through switching element S2 and reactor current IL2 (IL2<0) flows through switching element S3. The total of conduction losses in switching elements S2, S3, and S5 through current path 124 is comparable to Pls1 shown in the Expression (2).

In (b) of FIG. 28, as in (b) of FIG. 22, switching elements S2 and S5 are in the conducting state. Namely, a current path 125 is formed such that a current (IL1−IL2) flows through switching element S2 and reactor current IL2 (IL2<0) flows through switching element S5. The total of conduction losses in switching elements S2, S3, and S5 through current path 125 is comparable to Pls2 shown in the Expression (3).

In (c) of FIG. 28, as in (c) of FIG. 22, switching elements S3 and S5 are in the conducting state. Namely, a current path 126 is formed such that a current (IL1−IL2) flows through switching element S3 and reactor current IL1 (IL1>0) flows through switching element S5. The total of conduction losses in switching elements S2, S3, and S5 through current path 126 is comparable to Pls3 shown in the Expression (4).

Then, current paths 124 to 126 during period T3 (IL1>0, IL2<0) will be considered.

Initially, in the case of current path 124 shown in (a) of FIG. 28, a difference between forward voltages of switching elements S2 and S3 is applied to switching element S5. Namely, since a voltage applied to switching element S5 is substantially 0, it is consistent with an event that switching element S5 is not conducting.

In contrast, in the case of current path 125 shown in (b) of FIG. 28, the sum of forward voltages of switching elements S2 and S5 is applied to switching element S3. Since this sum of the forward voltages exceeds the rising voltage of switching element S3, this phenomenon is inconsistent with the event that switching element S3 is not conducting. Therefore, during period T3, current path 125 shown in (b) of FIG. 28 is not formed.

Similarly, in the case of current path 126 shown in (c) of FIG. 28, the sum of forward voltages of switching elements S3 and S5 is applied to switching element S2. Since this sum of the forward voltages exceeds the rising voltage of switching element S2, this phenomenon is inconsistent with the event that switching element S2 is not conducting. Therefore, during period T3, current path 126 shown in (c) of FIG. 28 is not formed.

FIG. 29 shows comparison of conduction losses during period T3 in current paths 124 to 126 shown in (a)-(c) of FIG. 28.

Referring to FIG. 29, since reactor currents IL1 and IL2 are opposite in direction (polarity) during period T3, the term of |IL1−IL2| is greater than any of |IL1| and |IL2|.

Therefore, as is understood from comparison among the Expressions (2) to (4), throughout period T3, Pls1 is least among Pls1 to Pls3. On the other hand, during period T3, as described with reference to (a)-(c) of FIG. 28, current path 124 is automatically selectively formed. Therefore, it is understood that, throughout period T3, current path 124 in which a conduction loss is least is automatically formed in switching elements S2, S3, and S5 in the on state.

Referring again to FIG. 24, in contrast to the example above, when DC power supply B1 performs the regeneration operation (IL1<0) while DC power supply B2 performs the power running operation (IL2>0), current paths 124 to 126 shown in FIG. 28 are formed with a direction of a current being reversed. Therefore, in this case as well, with a mechanism the same as in the case that DC power supply B1 performs the power running operation while DC power supply B2 performs the regeneration operation, current path 124 in which a conduction loss in the switching element is least is automatically selected.

Thus, during use of the second arm, when one of DC power supplies B1 and B2 performs the power running operation and the other thereof performs the regeneration operation as well, a current path least in conduction loss is automatically selected in switching elements S2, S3, and S5 in the on state. Conduction loss Pls here is comparable to a conduction loss in the boost chopper circuit including the first arm.

In a pattern in which the second arm is used, in contrast to the description with reference to FIGS. 21 to 29, the B1U arm and the B2L arm are turned on. Namely, there is a pattern in which switching elements S1, S4, and S5 are turned on (S2 and S3 are turned off). Owing to symmetry of the circuit configuration of power converter 10, however, a circuit operation while the B1U am and the B2L arm are turned on is the same as in the pattern described above in which the B1L arm and the B2U arm are turned on.

Therefore, when DC power supplies B1 and B2 perform the power running operation and the regeneration operation, respectively, in the boost chopper circuit including the second arm, a conduction loss in the switching element is comparable to a conduction loss in the boost chopper circuit (the power converter in Patent Literature 1) including the first arm.

Therefore, throughout the entire period in which the boost chopper circuit including the second arm is formed, even when DC power supplies B1 and B2 are different from each other in operation between power running and regeneration, a conduction loss in the switching element is comparable to a conduction loss in the boost chopper circuit including the first arm (that is, a conduction loss in the power converter in Patent Literature 1). Then, if there is any period during which each of DC power supplies B1 and B2 performs the power running operation or the regeneration operation, a conduction loss in the switching element in the boost chopper circuit including the second arm is less than in the boost chopper circuit including the first arm.

From the foregoing, in power converter 10 according to the present embodiment, DC power supplies B1 and B2 can carry out DC/DC conversion in parallel for power lines PL and GL (load 30) such that the boost chopper circuit including the first arm and the boost chopper circuit including the second arm are both automatically used in the parallel boost mode.

Then, as a period during which the boost chopper circuit is formed with the second arm (the on period of switching element S5) is provided, a conduction loss in the switching element can be less than a conduction loss in the boost chopper circuit including the first arm. Therefore, in the parallel boost mode of power converter 10, by suppressing a conduction loss in the switching element as compared with that in the power converters in Patent Literatures 1 and 2, DC/DC conversion can be higher in efficiency.

Modification of First Embodiment

As described above, in power converter 10 according to the first embodiment, a period during which the boost chopper circuit having the second arm is formed is provided, so that a conduction loss in the switching element is reduced. On the other hand, as is understood from FIGS. 11, 12, and 15, a period during which the boost chopper circuit having the second arm is formed is limited to a period during which control pulse signals SD1 and SD2 are different in level from each other.

Therefore, by securing a period in which control pulse signals SD1 and SD2 are different in logical level from each other as long as possible under the condition that duty ratios DT1 and DT2 are constant, a conduction loss can further be suppressed.

In the modification of the first embodiment, a conduction loss in power converter 10 is further reduced by phase control of a carrier wave used for controlling output from DC power supplies B1 and B2 (hereinafter referred to as "carrier phase control").

Figure 30:
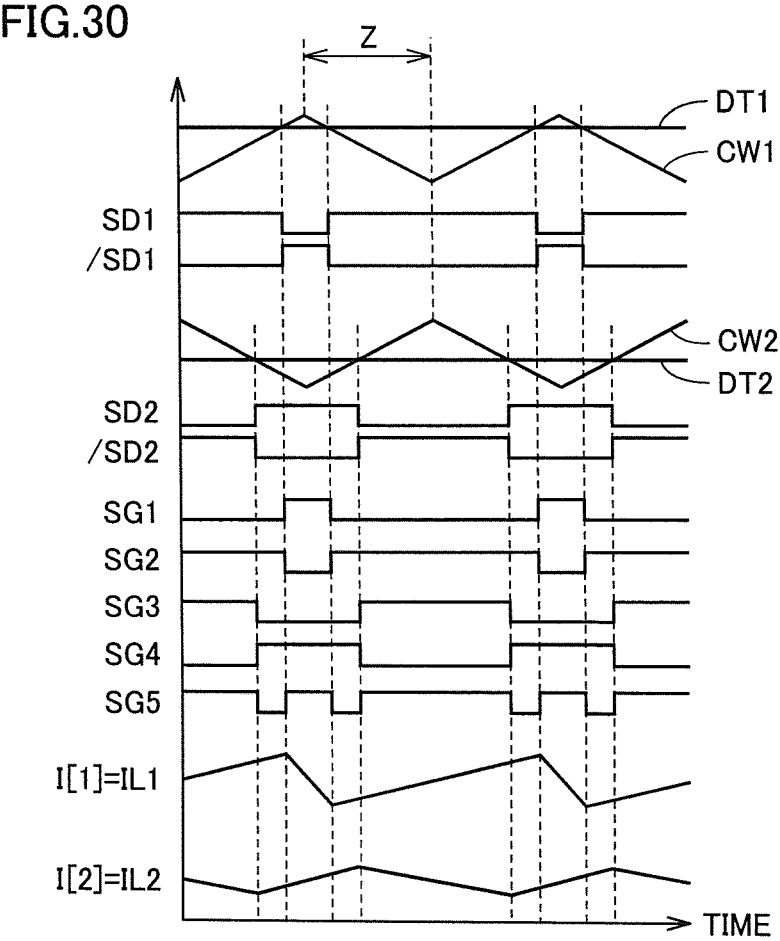
FIG. 30 is a waveform diagram for illustrating carrier phase control for the power converter according to the present first embodiment.

FIG. 30 is a waveform diagram for illustrating application of carrier phase control on power converter 10 according to the present first embodiment.

Referring to FIG. 30, during application of carrier phase control, carrier wave generation portion 240 (FIG. 13) provides a phase difference Z between carrier wave CW1 used for PWM control of DC power supply B1 and carrier wave CW2 used for PWM control of DC power supply B2. FIG. 30 exemplifies a case of Z=180 degrees.

In contrast, in the operation waveform shown in FIG. 14, carrier waves CW1 and CW2 are the same in frequency and phase. In other words, in FIG. 14, a condition of Z=0 is satisfied.

Under the condition that phase difference Z is provided as well, control pulse signals SD1 and /SD1 are generated through PWM control based on voltage comparison between carrier wave CW1 and duty ratio DT1. Similarly, control pulse signals SD2 and /SD2 are generated through PWM control based on voltage comparison between carrier wave CW2 and duty ratio DT2.

In FIG. 30, duty ratios DT1 and DT2 are the same in value as in FIG. 14. Therefore, though control pulse signal SD1 in FIG. 30 is different in phase from control pulse signal SD1 in FIG. 14, it is the same in length of the H level period. Similarly, though control pulse signal SD2 in FIG. 30 is also different in phase from control pulse signal SD2 in FIG. 14, it is the same in length of the H level period.

By providing phase difference Z between carrier waves CW1 and CW2, control signals SG1 to SG5 in FIG. 30 are different in waveform from control signals SG1 to SG5 in FIG. 14. Based on comparison between FIGS. 14 and 30, it is understood that phase relation (current phase) between reactor currents IL1 and IL2 also changes by changing phase difference Z between carrier waves CW1 and CW2.

On the other hand, it is understood that an average value for currents IL1 and IL2 is comparable between FIGS. 14 and 30, for the same duty ratios DT1 and DT2. Namely, output from DC power supplies B1 and B2 is controlled based on duty ratios DT1 and DT2, and there is no influence even when phase difference Z between carrier waves CW1 and CW2 is changed.

Therefore, in the modification of the present first embodiment, a conduction loss in the switching element in the parallel connection mode of power converter 10 is reduced through carrier phase control in which phase difference Z between carrier waves CW1 and CW2 is appropriately adjusted.

As described in the first embodiment, in the parallel boost mode of power converter 10, a conduction loss in the switching element is less in the boost chopper circuit including the second arm than in the boost chopper circuit including the first arm. On the other hand, as is understood from the Boolean expressions shown in FIG. 12, a period in which the second arm can be used by turning on switching element S5 is limited to a period in which control pulse signals SD1 and SD2 are different in logical level from each other.

Therefore, by adjusting a pulse phase such that the period in which the control pulse signals are different in logical level from each other is longer under the condition that a length of the H level period of control pulse signals SD1 and SD2 is defined by duty ratios DT1 and DT2, a period of use of the second arm in the parallel boost mode of power converter 10 can be longer. Thus, a conduction loss in the parallel boost mode of power converter 10 can further be reduced.

Figure 31:
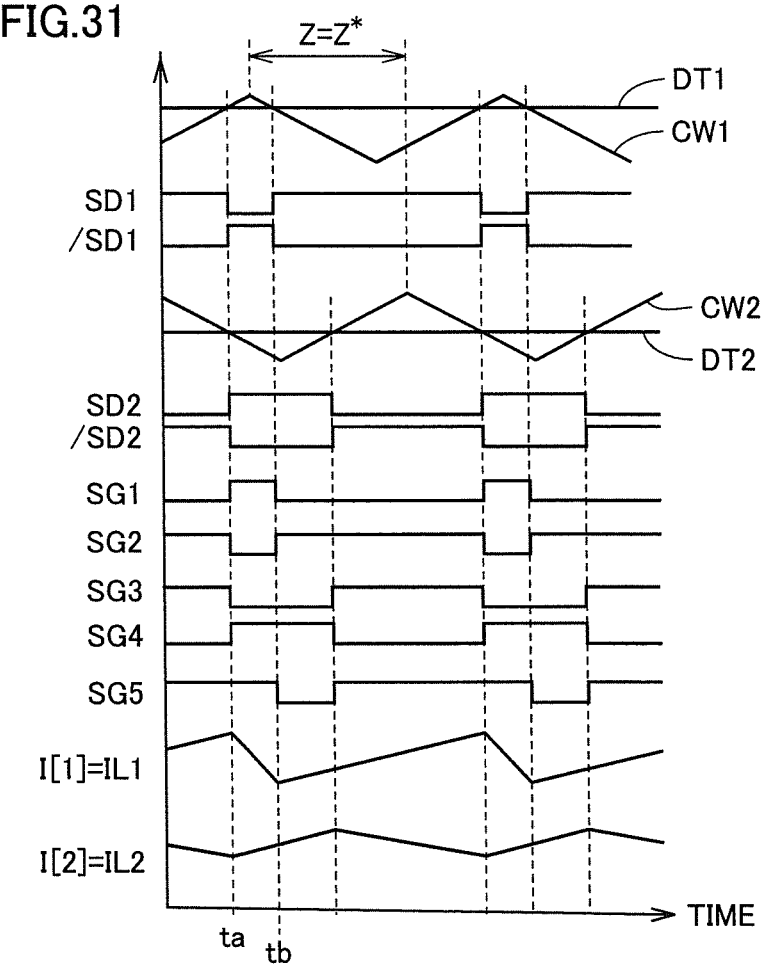
FIG. 31 is a waveform diagram for illustrating an operation example of carrier phase control according to a modification of the present first embodiment.

FIG. 31 is a waveform diagram for illustrating an operation example of carrier phase control according to a modification of the present first embodiment.

Referring to FIG. 31, by adjusting phase difference Z also under the condition that control pulse signals SD1 and SD2 are the same in the H level period, a period in which control pulse signals SD1 and SD2 are different in logical level from each other varies. As shown in FIG. 31, when a condition of phase difference Z=Z* is satisfied, timing when control pulse signal SD1 makes transition from the H level to the L level and timing when control pulse signal SD2 makes transition from the L level to the H level are the same in phase (time ta). Here, a period during which control pulse signals SD1 and SD2 are different in logical level from each other, that is, the H level period of control signal SG5, can be secured longest. Phase difference Z* bringing about such phase relation will hereinafter be also referred to as an optimal phase difference Z*.

Based on comparison between a waveform of control signal SG5 at the time when a condition of phase difference Z=0 is satisfied shown in FIG. 14 and a waveform of control signal SG5 at the time when a condition of phase difference Z=Z* is satisfied shown in FIG. 31, owing to carrier phase control, under PWM control in which duty ratios DT1 and DT2 are the same, the H level period of control signal SG5, that is, a period in which the boost chopper circuit is formed with the second arm by turning on switching element S5, can be secured longest.

In contrast to the example in FIG. 31, when phase difference Z is set such that timing when control pulse signal SD1 makes transition from the L level to the H level (time tb) and timing when control pulse signal SD2 makes transition from the H level to the L level are the same in phase as well, a period in which control pulse signals SD1 and SD2 are different in logical level from each other can similarly be secured. Namely, phase difference Z at this time can also be set to optimal phase difference Z*.

As shown in FIG. 31, at the timing when control pulse signal SD1 changes from the H level to the L level, reactor current IL1 also changes from increase to decrease. Namely, reactor current IL1 attains to a local maximum. In contrast, at timing when control pulse signal SD1 changes from the L level to the H level, reactor current IL1 also changes from decrease to increase. Namely, reactor current IL1 attains to a local minimum.

Thus, timing when the logical level of control pulse signals SD1 and SD2 makes transition corresponds to an inflection point (a local maximum point or a local minimum point) of reactor currents IL1 and IL2. Therefore, as phase difference Z=Z* is set such that control pulse signals SD1 and SD2 are the same in timing of transition of the logical level and the period of use of the second arm is maximized, the inflection points of reactor currents IL1 and IL2 come at the same timing.

As is understood also from FIGS. 14, 30, and 31, waveforms of control pulse signals SD1 and SD2 are determined by duty ratios DT1 and DT2. Therefore, it is understood that optimal phase difference Z* at which relation between control pulses SD1 and SD2 as in FIG. 31 and a current phase of IL1 and IL2 can be realized also changes in accordance with duty ratios DT1 and DT2.

Therefore, relation between duty ratios DT1 and DT2 and optimal phase difference Z* is found in advance and correspondence therebetween can be stored in control device 100 in advance as a map (hereinafter also referred to as a "phase difference map") or a function formula (hereinafter also referred to as a "phase difference calculation formula").

Therefore, while the parallel boost mode of power converter 10 is selected, carrier wave generation portion 240 (FIG. 13) can set optimal phase difference Z* by referring to the phase difference map or the phase difference calculation formula based on duty ratios DT1 and DT2 calculated by controllers 210 and 220 (FIG. 13). Furthermore, carrier wave generation portion 240 generates carrier waves CW1 and CW2 having the same frequency so as to have set optimal phase difference Z*.

PWM control unit 230 (FIG. 13) generates control pulse signals SD1 and SD2 in such phase relation that a period in which control pulse signals SD1 and SD2 are different in logical level (H/L level) from each other is longest. Furthermore, control signals SG1 to SG5 are further generated in accordance with the Boolean expressions shown in FIG. 12.

Thus, by controlling power converter 10 in response to control signals SG1 to SG5 generated through carrier phase control according to the modification of the first embodiment, on and off of switching elements S1 to S5 is controlled such that the on period of switching element S5, that is, the period in which the second arm is used, is longest under the condition that duty ratios DT1 and DT2 are the same. Here, a current phase is also controlled such that the inflection point of reactor current IL1 (the local maximum point or the local minimum point) and the inflection point of reactor current IL2 (the relative minimum point or the local maximum point) come at the same timing.

Namely, as is understood also from comparison between FIGS. 14 and 30, by applying carrier phase control for adjusting a phase difference between carrier waves CW1 and CW2 in accordance with duty ratios DT1 and DT2, a period in which the boost chopper circuit including the second arm is formed is extended and a conduction loss in the switching element can be reduced.

In particular, as shown in FIG. 31, thus, with carrier phase control according to the modification of the first embodiment, with control to Z=Z*, a period in which the second arm is used and in which a conduction loss in the switching element is less can be longest under the condition that duty ratios DT1 and DT2 are the same. Thus, an effect of reduction in conduction loss can be enhanced.

As above, by application of carrier phase control according to the modification of the present first embodiment, DC/DC conversion in the parallel boost mode of power converter 10 can further be higher in efficiency.

Second Embodiment

In a second embodiment, an operation in the series boost mode of the plurality of operation modes of power converter 10 described above will be described.

Referring again to FIG. 1, in power converter 10, by turning off switching elements S1 and S3 and turning on switching element S5, DC power supplies B1 and B2 connected in series can electrically be connected between power lines PL and GL. Thus, a state that the upper arm is turned on for DC power supplies B1 and B2 connected in series can be formed. Namely, a current path from power line PL toward DC power supplies B1 and B2, that is, a current path through which DC power supplies B1 and B2 are regeneratively charged by load 30, is formed.

On the other hand, by turning off switching elements S1, S3, and S5 while turning on switching elements S2 and S4, output from DC power supplies B1 and B2 can be stored in reactors L1 and L2 as electromagnetic energy. Namely, a state that the lower arm is turned on for each of DC power supplies B1 and B2 can be formed. Thus, in the series boost mode, switching elements S1 and S3 are fixed to off.

Figure 32:
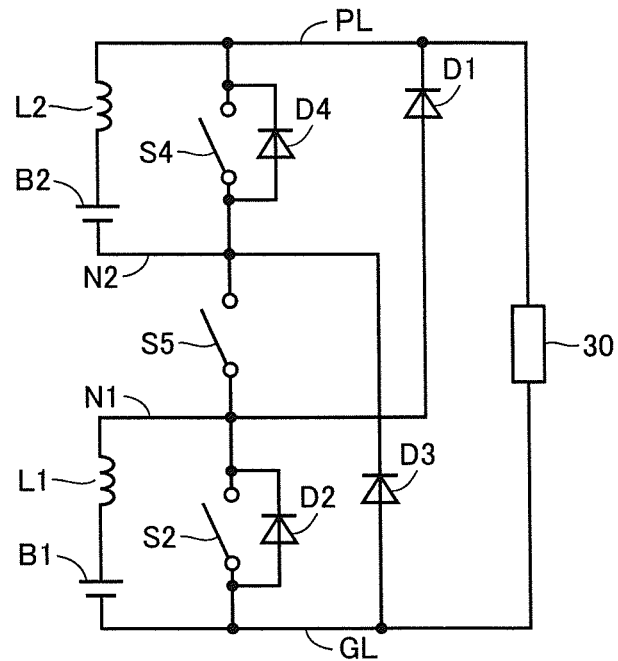
FIG. 32 is an equivalent circuit diagram in a series boost mode of the power converter according to the present embodiment, which is described in a second embodiment.

FIG. 32 is an equivalent circuit diagram of power converter 10 in the series boost mode.

Referring to FIG. 32, switching elements S1 and S3 fixed to off are not shown. In a direction from power line GL toward node N2, however, a current path can be formed by diode D3 connected in anti-parallel to switching element S3. Similarly, in a direction from node N1 toward power line PL, a current path can be formed by diode D1 connected in anti-parallel to switching element S1. A current path is formed and cut off between nodes N1 and N2, in response to on and off of switching element S5.

In the equivalent circuit diagram in FIG. 32, by alternately providing a period in which switching elements S2 and S4 are turned on while switching element S5 is turned off (a lower arm on period) and a period in which switching element S5 is turned on while switching elements S2 and S4 are turned off on the contrary (an upper arm on period), a circuit operation in the series boost mode is performed. Namely, the "upper arm on period" and the "lower arm on period" correspond to the "first period" and the "second period" in the series boost mode (the second mode), respectively.

Figure 33:
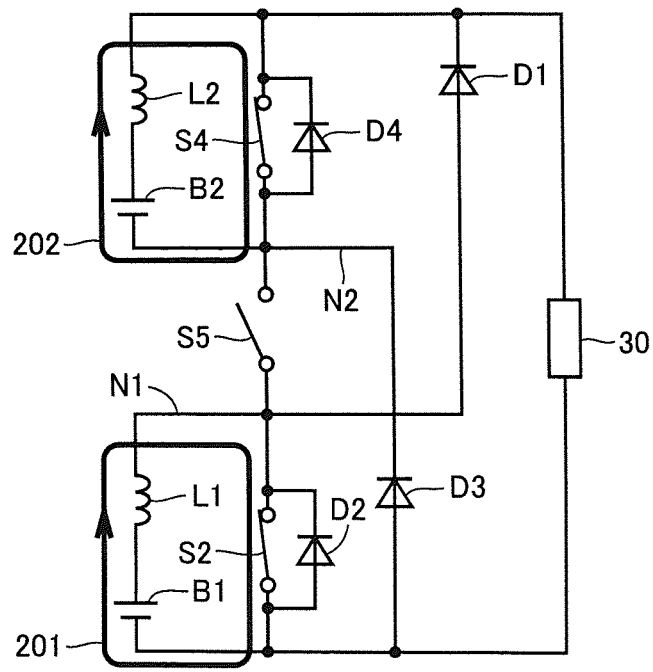
FIG. 33 is a circuit diagram for illustrating a current path during a lower arm on period in the equivalent circuit shown in FIG. 32.

FIG. 33 is a circuit diagram for illustrating a current path during the lower arm on period in the equivalent circuit shown in FIG. 32.

Referring to FIG. 33, by turning on switching elements S2 and S4 and turning off switching elements S1, S3, and S5, a current path 201 for storing energy in reactor L1 with output from DC power supply B1 and a current path 202 for storing energy in reactor L2 with output from DC power supply B2 are formed. Namely, switching elements S2 and S4 correspond to the lower arm of the boost chopper circuit for both of DC power supplies B1 and B2 in the series boost mode.

Figures 34, 35:
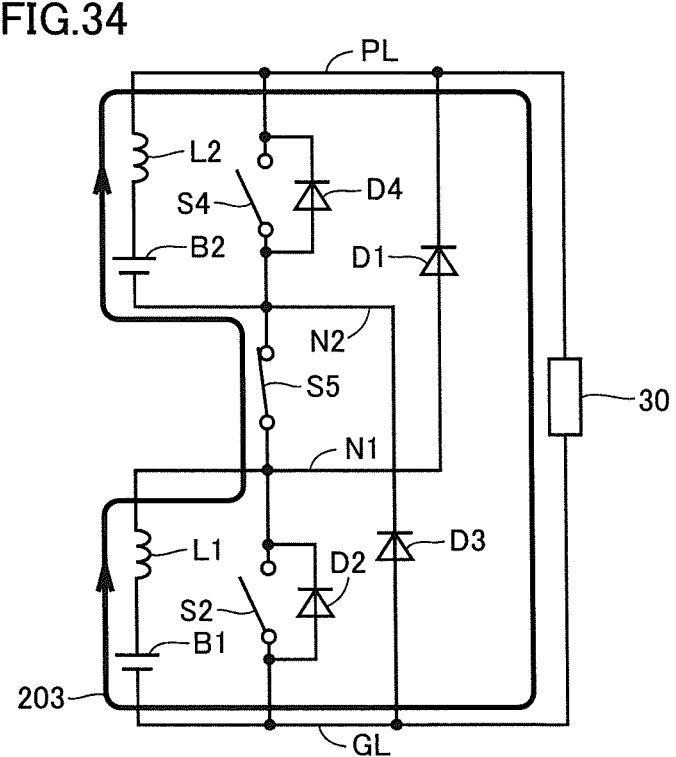
FIG. 34 is a circuit diagram for illustrating a current path during an upper arm on period in the equivalent circuit shown in FIG. 32.
FIG. 35 is a chart showing a list of Boolean expressions for controlling on and off of each switching element in the series boost mode.

FIG. 34 is a circuit diagram for illustrating a current path during the upper arm on period in the equivalent circuit shown in FIG. 32.

Referring to FIG. 34, by turning on switching element S5 and turning off switching elements S1 to S4, a current path 203 is formed. Through current path 203, the sum of energy resulting from an output voltage from DC power supplies B1 and B2 connected in series and energy stored in reactors L1 and L2 is output between power lines PL and GL. Consequently, a state that an upper arm element in the boost chopper circuit is turned on for DC power supplies B1 and B2 connected in series is formed. Namely, switching element S5 corresponds to the upper arm of the boost chopper circuit in the series boost mode.

FIG. 35 shows Boolean expressions for controlling on and off of each of switching elements S1 to S5 in the series boost mode of power converter 10.

Referring to FIG. 35, since a current which flows through DC power supplies B1 and B2 connected in series is common in the series boost mode, output from DC power supplies B1 and B2 cannot separately be controlled as in the parallel control mode. Therefore, a single boost chopper circuit is equivalently formed for a voltage V[1]+V[2]. Therefore, control pulse signal SD for duty control is common between DC power supplies B1 and B2.

In the series boost mode, switching elements S2 and S4 forming the lower arm are commonly turned on and off in response to control pulse signal SD. On the other hand, switching element S5 forming the upper arm is turned on and off in response to control pulse signal /SD (an inverted signal of SD). Namely, a pair of switching elements S2 and S4 and switching element S5 are complementarily turned on and off. Switching elements S1 and S3 are fixed to off in the series boost mode.

As described above, in the boost chopper circuit in which switching elements S2 and S4 serve as the lower arm and switching element S5 serves as the upper arm, a condition of Vi=V[1]+V[2] is satisfied in the Expression (1). Namely, in the series boost mode, the Expression (6) below is satisfied among duty ratio DT of the lower arm, voltages V[1] and V[2] of DC power supplies B1 and B2, and output voltage VH.

$$VH=1/(1-DT)\times(V[1]+V[2]) \quad (6)$$

In the series boost mode, power P[1] and P[2] of DC power supplies B1 and B2 is automatically determined in accordance with voltages V[1] and V[2]. Namely, since power allocation between DC power supplies B1 and B2 is automatically determined in accordance with the Expression (7) below, direct control as in the parallel boost mode cannot be carried out.

$$P[1]:P[2]=V[1]:V[2] \quad (7)$$

Figure 36:
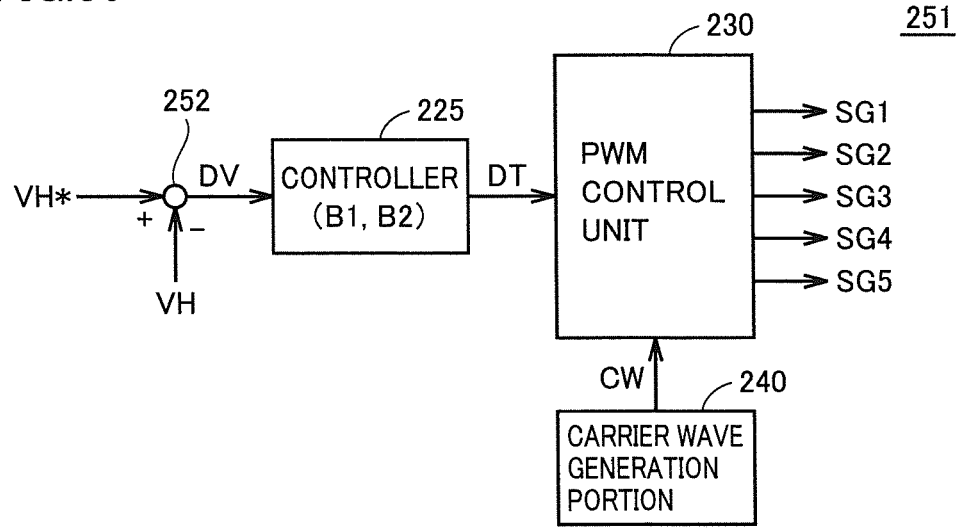
FIG. 36 is a functional block diagram for illustrating an example of control of output from the DC power supplies in the series boost mode of the power converter shown in FIG. 1.

FIG. 36 is a functional block diagram for illustrating an example of control of output from DC power supplies B1 and B2 in the series boost mode of power converter 10.

Referring to FIG. 36, in the series boost mode, as in the series connection mode in Patent Literature 2, output from DC power supplies B1 and B2 is controlled such that voltage difference DV (DV=VH*−VH) of output voltage VH is compensated for (voltage control).

A converter control unit 251 in the series boost mode exemplified in FIG. 36 includes subtraction portion 252, a controller 225 for controlling output from DC power supplies B1 and B2, PWM control unit 230, and carrier wave generation portion 240.

Subtraction portion 252 calculates voltage difference DV (DV=VH*−VH) for voltage control. Controller 225 operates duty ratio DT in the Expression (6) through feedback control for compensating for voltage difference DV (for example, PI control). Duty ratio DT can also be operated, with a theoretical boost ratio found from a voltage ratio between voltage V[1]+V[2] and voltage command value VH* being further reflected.

Carrier wave generation portion 240 generates carrier wave CW common to DC power supplies B1 and B2 in the series boost mode. PWM control unit 230 generates control signals SG1 to SG5 through PWM control based on comparison between duty ratio DT and carrier wave CW in the series boost mode.

Figure 37:
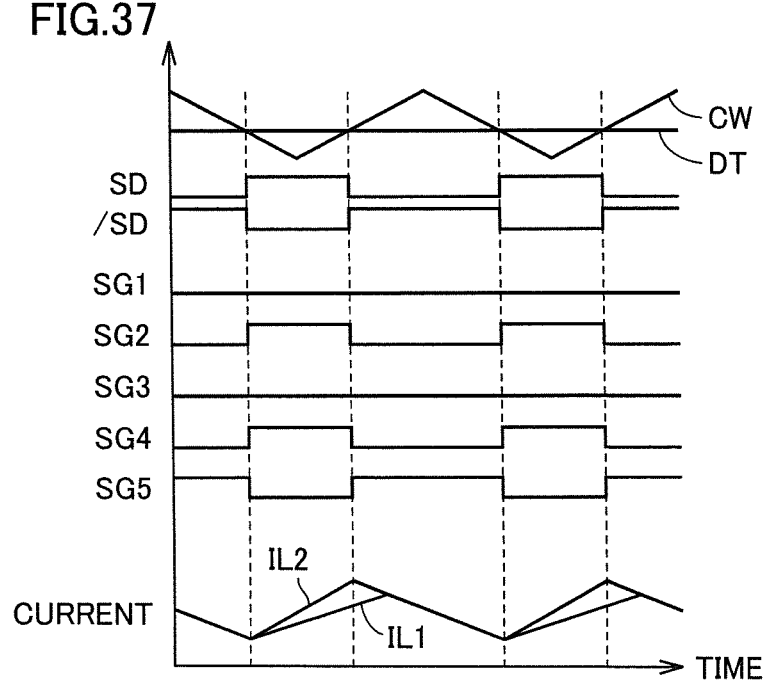
FIG. 37 is a waveform diagram for illustrating an operation in PWM control shown in FIG. 36.

FIG. 37 shows a waveform diagram for illustrating an operation of PWM control unit 230 in the series connection mode.

Referring to FIG. 37, control pulse signal SD is generated through PWM control based on voltage comparison between duty ratio DT and carrier wave CW for voltage control. During a period in which a condition of DT>CW is satisfied, control pulse signal SD is set to the H level, whereas during a period in which a condition of CW>DT is satisfied, control pulse signal SD is set to the L level.

Therefore, with increase in duty ratio DT, the H level period of control pulse signal SD is longer and the L level period of control pulse signal /SD is shorter. Since on of the lower arm of the boost chopper circuit is indicated during the H level period of control pulse signal SD as described above, output from DC power supplies B1 and B2 increases with increase in duty ratio DT, while output from DC power supplies B1 and B2 decreases with lowering in duty ratio DT.

Control signals SG1 to SG5 are generated in response to control pulse signals SD and /SD obtained through PWM control in accordance with the Boolean expressions shown in FIG. 35.

During the lower arm on period in which control pulse signal SD is set to the H level and switching elements S2 and S4 are turned on, current paths 201 and 202 (FIG. 33) are formed. Therefore, reactor currents IL1 and IL2 increase.

On the other hand, during the upper arm on period in which control pulse signal SD is set to the L level and switching element S5 is turned on (S2 and S4 are turned off), current path 203 (FIG. 34) is formed. Therefore, reactor currents IL1 and IL2 lower, as being common in value.

As shown also in FIG. 37, when voltages V[1] and V[2] are different from each other or reactors L1 and L2 are different in inductance from each other at the timing of switching from on of the lower arm to on of the upper arm, reactor currents IL1 and IL2 are different from each other in value. During this period, a reflux path which will be described in detail later is formed, so that passage of reactor currents IL1 and IL2 is maintained. Then, when a condition of IL1=IL2 is satisfied while the reflux path is formed, current path 203 in FIG. 34 is formed. Current path 203 once formed is maintained during the lower arm on period.

Thus, according to power converter 10 in the present embodiment, in the series boost mode described in the second embodiment, on and off of switching elements S1 to S5 is controlled in accordance with the Boolean expressions shown in FIG. 35 and in accordance with duty ratio DT for boosting V[1]+V[2] to output voltage VH. Thus, output voltage VH can be controlled in accordance with voltage command value VH* through DC/DC conversion in which a boost ratio (VH/(V[1]+V[2])) is suppressed. Thus, by suppressing a power loss mainly in reactors L1 and L2 as in the series connection mode in Patent Literature 2, a power loss in power converter 10 can be reduced. Specifically, as reactors L1 and L2 are connected in series and thus a gradient of variation in reactor currents IL1 and IL2 is suppressed, amplitude of ripples is smaller. Thus, an iron loss caused in cores (not shown) of reactors L1 and L2 and an AC loss caused in a coil winding (not shown) can be reduced.

Furthermore, in power converter 10 according to the present embodiment, a conduction loss in the series boost mode is suppressed as compared with that in power converter 10# (the series connection mode) in Patent Literature 2. Therefore, DC/DC conversion can further be higher in efficiency.

Figure 38:
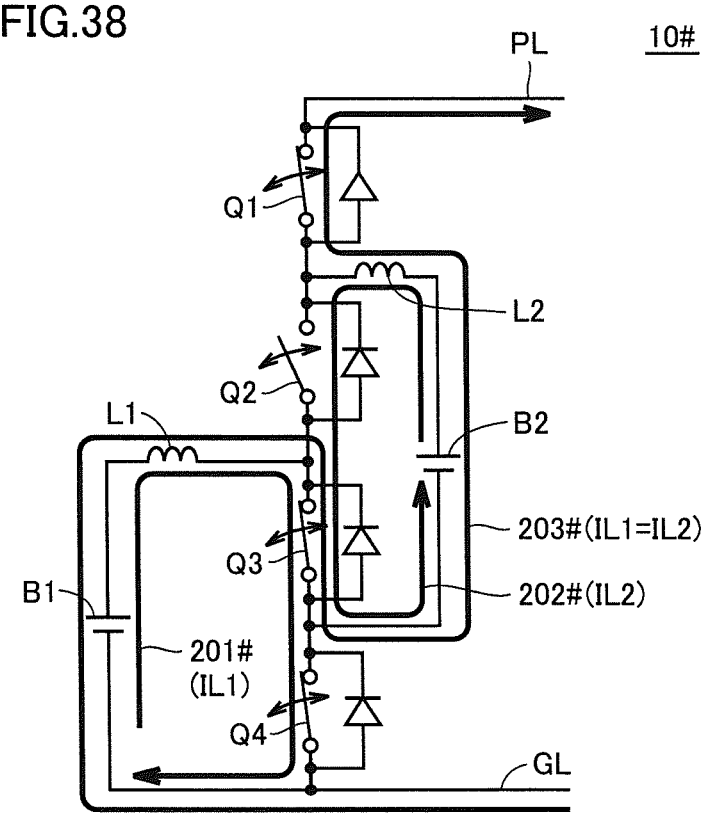
FIG. 38 is a circuit diagram for illustrating a current path when the power converter shown for comparison is operated comparably to FIGS. 33 and 34.

FIG. 38 is a circuit diagram for illustrating a current path in the series connection mode of power converter 10# shown as a comparative example. Namely, FIG. 38 shows a current path at the time when power converter 10# described in Patent Literature 2 operates comparably to FIGS. 33 and 34.

Referring to FIG. 38, in power converter 10#, during the lower arm on period for DC power supplies B1 and B2, switching elements Q2, Q3, and Q4 are turned on so that current paths 201# and 202# are formed. Here, a conduction loss in accordance with reactor current IL1 is caused in switching element Q4 and a conduction loss in accordance with reactor current IL2 is caused in switching element Q2. Furthermore, since reactor currents IL1 and IL2 flow through switching element Q3 as being superimposed on each other, a conduction loss in accordance with a current (IL1+IL2) greater than in switching elements Q2 and Q4 is caused in switching element Q3.

In contrast, during the lower arm on period in the series boost mode of power converter 10, current paths 201 and 202 shown in FIG. 33 are formed. Therefore, a conduction loss in accordance with reactor current IL1 is caused in switching element S2 and a conduction loss in accordance with reactor current IL2 is caused in switching element S4. Namely, in power converter 10, a conduction loss comparable to a conduction loss in switching elements Q2 and Q4 in power converter 10# is caused. Therefore, it can be understood that, in terms of comparison of a conduction loss in power converter 10 with a conduction loss in power converter 10#, a conduction loss in the series boost mode is suppressed by an amount of conduction loss in switching element Q3.

Referring again to FIG. 38, in power converter 10#, during the upper arm on period for DC power supplies B1 and B2, switching elements Q1 and Q3 are turned on, so that a current path 203# in which DC power supplies B1 and B2 are electrically connected in series between power lines PL and GL is formed. Therefore, reactor current IL1 (IL1=IL2) flows through each of switching elements Q1 and Q3. Thus, a conduction loss in accordance with IL1 (IL2) is caused in each of two switching elements Q1 and Q3.

In contrast, during the upper arm on period in the series boost mode of power converter 10, current path 203 shown in FIG. 34 is formed. Therefore, reactor current IL1 (IL1=IL2) flows only through switching element S5. Namely, in power converter 10, a conduction loss in accordance with IL1 (IL2) is caused only in single switching element S5. Therefore, it can be understood that a conduction loss in power converter 10 is suppressed to a conduction loss in a single switching element (that is, approximately half, as compared with a conduction loss in power converter 10#).

Thus, power converter 10 achieves a less conduction loss in the switching element in the series boost mode than in power converter 10# in the comparative example.

As described above in the second embodiment, power converter 10 according to the present embodiment can select an operation in the series boost mode for carrying out DC/DC conversion in such a state that DC power supplies B1 and B2 are connected in series, by switching a manner of on/off control of switching elements S1 to S5. By suppressing a boost ratio in a high-voltage region (VH>(V [1]+V[2])) by applying the series boost mode, DC/DC conversion can be higher in efficiency. In particular, DC/DC conversion can further be higher in efficiency in the series boost mode of power converter 10 than in the power converter (the series connection mode) in Patent Literature 2 carrying out similar DC/DC conversion, by reducing a conduction loss in the switching element.

As described in the first and second embodiments, power converter 10 according to the present embodiment achieves suppression of conduction loss in the switching element in each of the parallel boost mode in which power allocation between the DC power supplies can be controlled and the series boost mode in which efficiency in the high-voltage region is improved.

Here, a reflux path for a reactor current in power converter 10 described above will be described with reference to FIG. 39.

Figure 39:
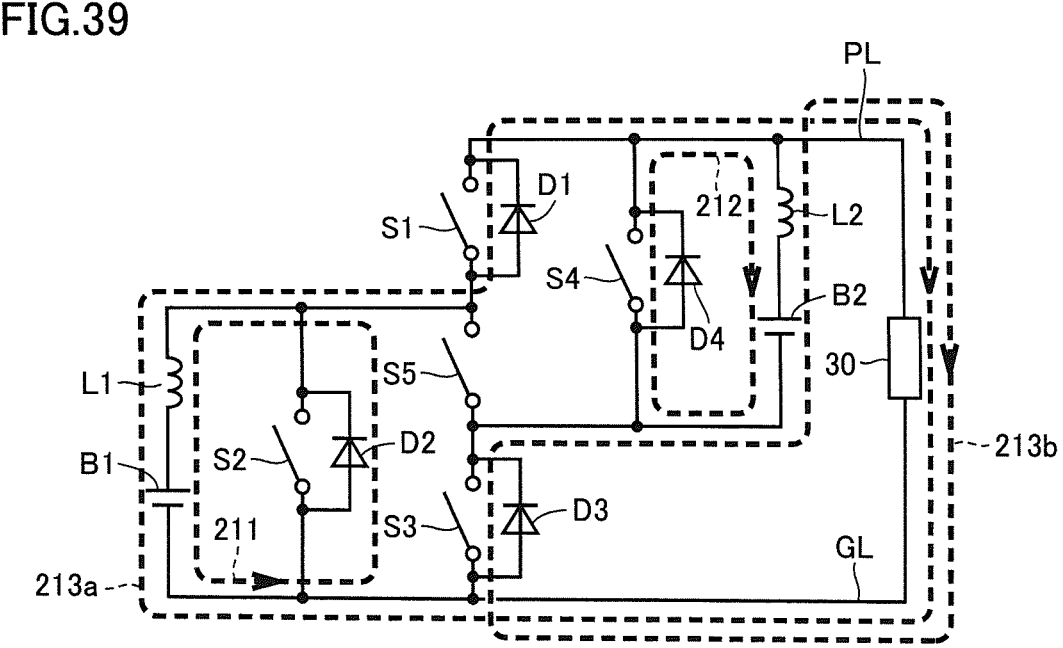
FIG. 39 is a circuit diagram illustrating a reflux path of a reactor current in the power converter according to the present embodiment.

Referring to FIG. 39, in power converter 10, for DC power supply B1, a reflux path during a period in which reactor current IL1 is negative (IL1<0) can be secured by a current path 211 formed by diode D2. A reflux path during a period in which reactor current IL1 is positive (IL1>0) can be secured by a current path 213a formed by diode D1.

Similarly, for DC power supply B2, a reflux path during a period in which reactor current IL2 is negative (IL2<0) can be secured by a current path 212 formed by diode D4. A reflux path during a period in which reactor current IL2 is positive (IL2>0) can be secured by a current path 213b formed by diode D3.

Thus, in power converter 10, in each of the plurality of operation modes including the series boost mode and the parallel boost mode, regardless of on and off of switching elements S1 to S5, reflux paths for reactor currents IL1 and IL2 can be formed. For example, when reactor currents IL1 and IL2 are different from each other at the time of start of the upper arm on period in the series boost mode shown in FIG. 37 as well, reflux paths 213a and 213b can secure paths for reactor currents IL1 and IL2.

Third Embodiment

In a third embodiment, a modification of the circuit configuration of power converter 10 described in the first and second embodiments will be described. Specifically, a modification in which switching element S5 of power converter 10 shown in FIG. 1 is implemented by a bidirectional switch is shown.

Referring again to FIGS. 32 to 34, in actual control of power converter 10, in order to prevent formation of a short-circuiting path between power lines PL and GL, what is called a "dead time" in which all of switching elements S2, S4, and S5 are turned off is provided in transition between the lower arm on period (FIG. 33) in which switching elements S2 and S4 are turned on and the upper arm on period in which switching element S5 is turned on (FIG. 34). It has been known that reflux paths for reactor currents IL1 and IL2 during a dead time period are secured by anti-parallel diodes.

Figure 40:
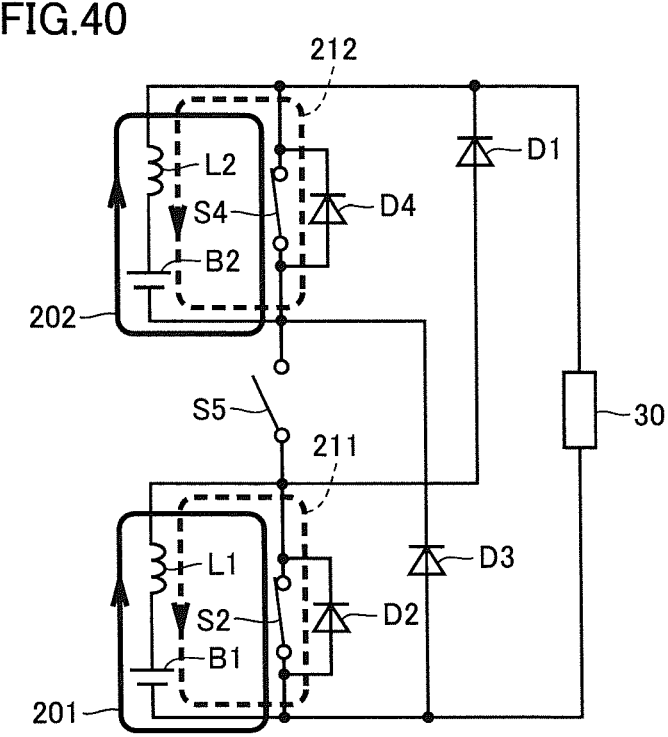
FIG. 40 is an equivalent circuit diagram illustrating a reflux path during a dead time period in the series boost mode of the power converter according to the present embodiment.

FIG. 40 shows an equivalent circuit diagram for illustrating a reflux path during the dead time period when the reactor current in the series boost mode of power converter 10 is negative.

Referring to FIG. 40, during a period in which reactor current IL1 is negative (IL1<0), reflux path 211 for reactor current IL1 during the dead time period can be secured by anti-parallel diode D2 of switching element S2 for forming current path 201 in the lower arm on period. Similarly, for reactor current IL2 as well, reflux path 212 during the dead time period while reactor current IL2 is negative (IL2<0) can be formed with anti-parallel diode D4 of switching element S4 in forming current path 202.

Figure 41:
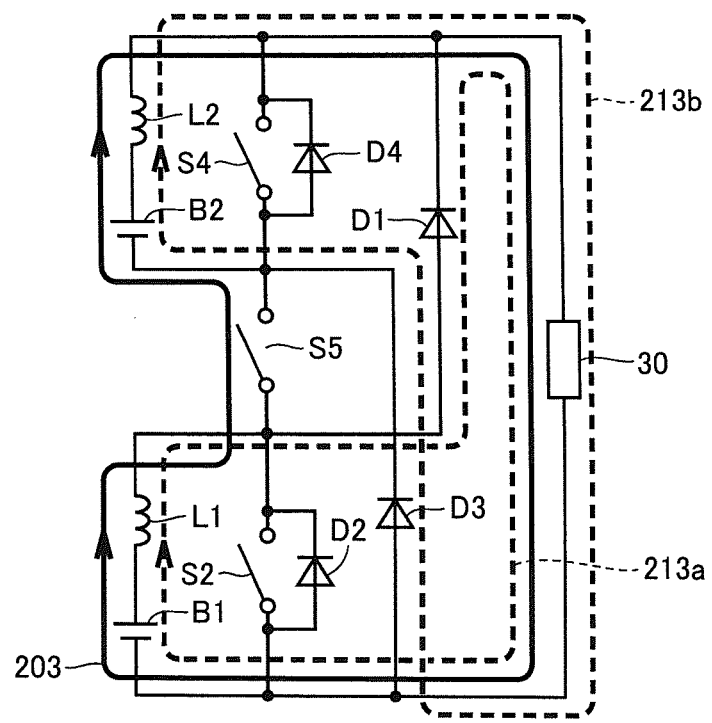
FIG. 41 is an equivalent circuit diagram illustrating a reflux path during the dead time period when a reactor current in the series boost mode of the power converter according to the present embodiment is positive.

FIG. 41 shows an equivalent circuit diagram for illustrating a reflux path during the dead time period when the reactor current in the series boost mode of power converter 10 is positive.

Referring to FIG. 41, during the upper arm on period, reflux path 203 during the dead time period is formed via switching element S5 in the on state. In contrast, reflux path 213a during the dead time period while reactor current IL1 is positive (IL1>0) is formed with conduction of diode D1, because no anti-parallel diode is disposed for switching element S5. Since diode D1 conducts only during the dead time period, a recovery loss is caused when reflux ends.

Similarly, current path 213b during the dead time period while reactor current IL2 is positive (IL2>0) is formed with conduction of diode D3. Thus, in diode D3 as well, a recovery loss is caused when reflux ends. Such a recovery loss is caused because no anti-parallel diode is disposed for switching element S5.

A reason why an anti-parallel diode cannot be arranged in switching element S5 operating as the upper arm in the series boost mode in the circuit configuration of power converter 10 shown in FIG. 1 will now be described with reference to FIG. 42.

FIG. 42 is a circuit diagram in a case that the boost chopper circuit including the first arm is formed in the parallel boost mode of power converter 10.

(a) of FIG. 42 shows a circuit diagram at the time when the upper arm is turned on for each of DC power supplies B1 and B2, and (b) of FIG. 42 shows a circuit diagram at the time when the lower arm is turned on for each of DC power supplies B1 and B2.

Referring to (a) of FIG. 42, in order to turn on the upper arm while switching element S5 is off (while the first arm is formed), switching elements S1 and S3 are turned on. Thus, node N1 is electrically connected to power line PL, while node N2 is electrically connected to power line GL. Thus, node N1 has a potential in accordance with output voltage VH, while node N2 has a potential in accordance with a ground voltage GND.

Referring to (b) of FIG. 42, in order to turn on the lower arm while switching element S5 is turned off (while the first arm is formed), switching elements S2 and S4 are turned on. Thus, in contrast to (a) of FIG. 42, node N2 is electrically connected to power line PL, while node N1 is electrically connected to power line GL. Thus, node N2 has a potential in accordance with output voltage VH, while node N1 has a potential in accordance with ground voltage GND.

As is understood from (a) and (b) of FIG. 42, in power converter 10, in the parallel boost mode, potential levels at nodes N1 and N2 are interchanged in accordance with a switching pattern. Therefore, as denoted with a dotted line in the drawings, if a diode D5 is connected, a current path is formed between nodes N1 and N2, which should electrically be disconnected from each other as switching element S5 is turned off. Namely, it is understood that diode D5 cannot be disposed in any of a direction from node N1 toward node N2 and a direction from node N2 toward node N1.

Therefore, in the third embodiment, a circuit configuration of a power converter for eliminating a recovery loss in a diode, which is caused by formation of a reflux path during the dead time period described with reference to FIGS. 40 and 41, will be described.

Figures 43, 44:
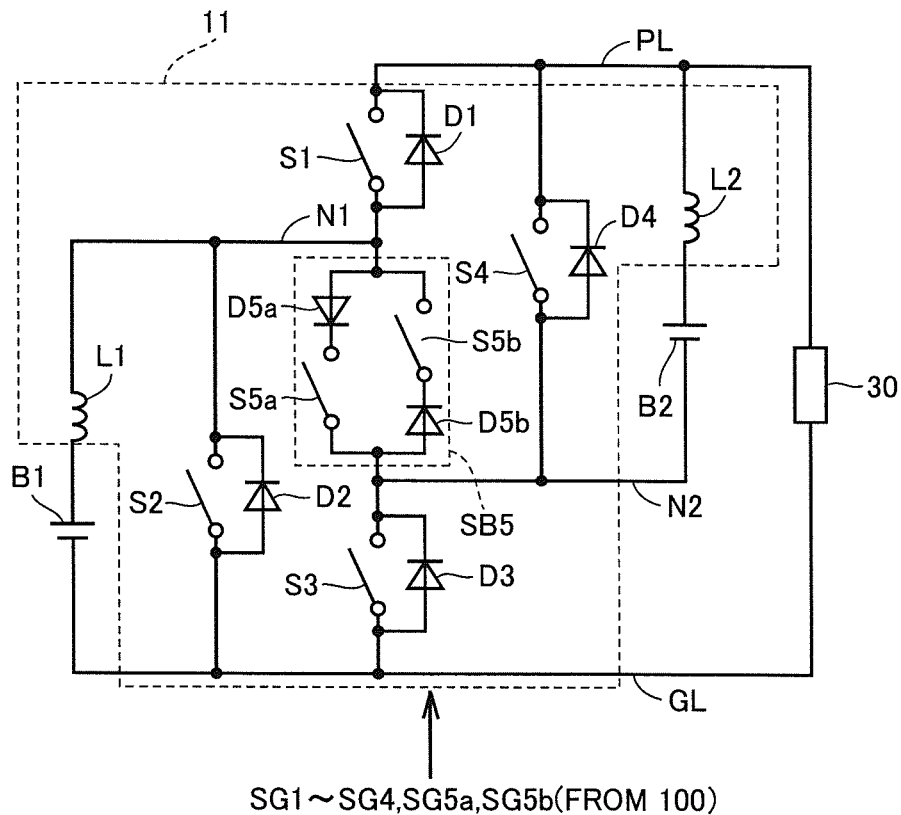
FIG. 43 is a circuit diagram for illustrating a configuration of a power converter according to a third embodiment.
FIG. 44 is a chart showing a list of Boolean expressions for controlling on and off of each switching element in the series boost mode of the power converter according to the third embodiment.

FIG. 43 is a circuit diagram for illustrating a configuration of a power converter 11 according to the third embodiment.

Referring to FIG. 43, power converter 11 is different from power converter 10 shown in FIG. 1 in having a bidirectional switch SB5 instead of switching element S5 as a semiconductor element connected between nodes N1 and N2. Namely, bidirectional switch SB5 corresponds to the "fifth semiconductor element." Since other features of power converter 11 are the same as those in power converter 10, detailed description will not be repeated.

Bidirectional switch SB5 has a diode D5a and a switching element S5a electrically connected in series between nodes N1 and N2. Diode D5a is electrically connected between nodes N1 and N2 with a direction from node N1 toward node N2 being defined as a forward direction.

Bidirectional switch SB5 further has a diode D5b and a switching element S5b electrically connected in series between nodes N1 and N2. Diode D5b and switching element S5b are connected in parallel to diode D5a and switching element S5a, between nodes N1 and N2. Diode D5b is electrically connected between nodes N1 and N2, with a direction from node N2 toward node N1 being defined as the forward direction. In the configuration of FIG. 43, switching elements S5a and S5b correspond to "first sub switching element" and "second sub switching element", respectively.

On and off of switching elements S5a and S5b is controlled in response to control signals SG5a and SG5b from control device 100 (FIG. 1).

In bidirectional switch SB5, when switching element S5a is turned on, a current path is formed by diode D5a in the direction from node N1 toward node N2. On the other hand, when switching element S5a is turned off, the current path in the direction from node N1 toward node N2 is cut off.

When switching element S5b is turned on, a current path is formed by diode D5b in a direction from node N2 toward node N1. On the other hand, when switching element S5b is turned off, the current path in the direction from node N2 toward node N1 is cut off.

Thus, by turning on switching element S5a and turning off switching element S5b in bidirectional switch SB5, a current path from node N1 toward node N2 is formed, while the current path from node N2 toward node N1 is cut off. In contrast, by turning on switching element S5b while turning off switching element S5a, a current path is formed in the direction from node N2 toward node N1, while the current path from node N1 toward node N2 is cut off.

In power converter 11 having bidirectional switch SB5, on and off of switching elements S1 to S4, S5a, and S5b is controlled in accordance with Boolean expressions shown in FIG. 44 in the series boost mode.

FIG. 44 is a chart showing a list of Boolean expressions for controlling on and off of each switching element in the series boost mode of power converter 11.

Referring to FIG. 44, on and off of switching elements S1 to S4 is controlled in accordance with Boolean expressions as in FIG. 35, as in the series boost mode of power converter 10. Namely, switching elements S2 and S4 forming the lower arm are turned on and off in response to control pulse signal SD. Switching elements S1 and S3 are fixed to off in the series boost mode.

Switching element S5a is constantly set to on in order to form a current path from node N1 toward node N2 for securing a reflux path during the dead time period. On the other hand, switching element S5b is turned on and off in response to control pulse signal /SD, similarly to switching element S5 in power converter 10. Thus, during the upper arm on period (during the period of off of switching elements S2 and S4), switching element S5b in the on state and diode D5b can form a current path for regenerative charging of DC power supplies B1 and B2. On the other hand, during the lower arm on period (during the period of on of switching elements S2 and S4), a regenerative charging path from node N2 toward node N1 is cut off.

In power converter 11 as well, during the lower arm on period (while switching elements S2 and S4 are on), current paths 201 and 202 are formed as in power converter 10. During the upper arm on period (while switching element S5b is on), current path 203 shown in FIG. 34 can be formed bidirectionally, as in power converter 10.

Therefore, in power converter 11 according to the third embodiment as well, by turning on and off switching elements S1 to S4, S5a, and S5b in accordance with the Boolean expressions shown in FIG. 44, the lower arm on period and the upper arm on period in the series boost mode can be provided as in power converter 10. Thus, power converter 11 can carry out DC/DC conversion as in power converter 10 in the series boost mode.

Figure 45:
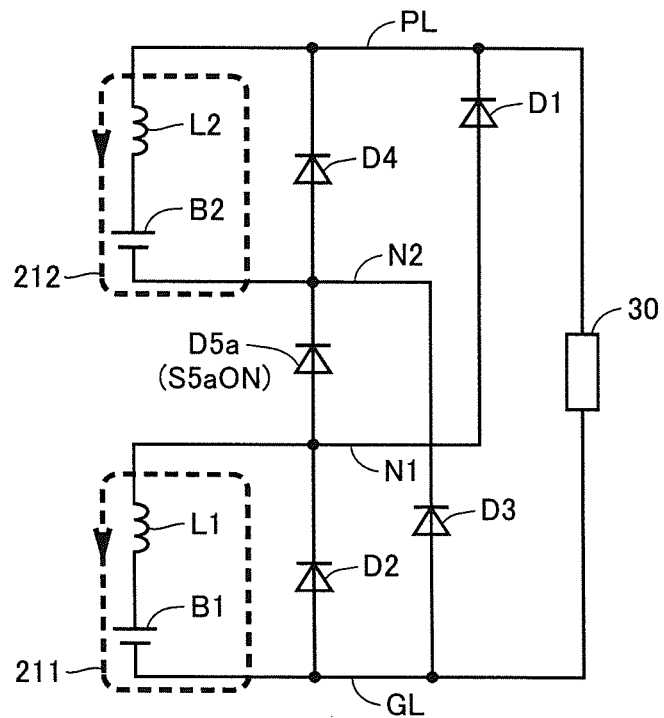
FIG. 45 is an equivalent circuit diagram illustrating a reflux path during the dead time period when a reactor current in the series boost mode of the power converter according to the third embodiment is negative.
Figure 46:
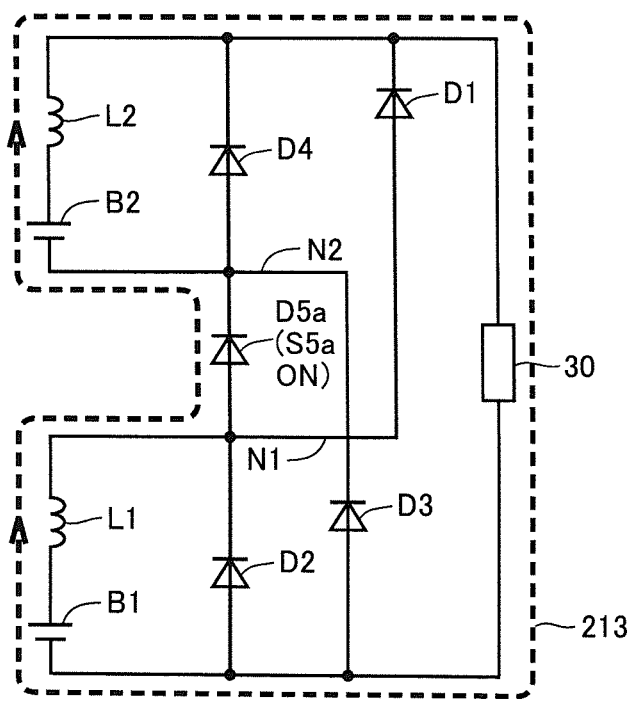
FIG. 46 is an equivalent circuit diagram illustrating a reflux path during the dead time period when a reactor current in the series boost mode of the power converter according to the third embodiment is positive.

On the other hand, a reflux path during the dead time period in the series boost mode of power converter 11 according to the third embodiment is formed as in FIGS. 45 and 46.

FIG. 45 shows an equivalent circuit diagram for illustrating a reflux path during the dead time period when the reactor current in the series boost mode of power converter 11 is negative.

Referring to FIG. 45, during the lower arm on period, reflux paths 211 and 212 during the dead time period as in FIG. 40 can be formed for reactor currents IL1 (IL1<0) and IL2 (IL2<0). Therefore, reflux paths for reactor currents IL1 and IL2 during the dead time period can be secured by anti-parallel diodes D2 and D4 of switching elements S2 and S4 for forming current paths 201 and 202 during the lower arm on period.

FIG. 46 shows an equivalent circuit diagram for illustrating a reflux path during the dead time period when the reactor current in the series boost mode of power converter 11 is positive.

Referring to FIG. 46, since switching element S5$a$ is fixed to on in the series boost mode, a current path formed by diode D5$a$ is constantly secured. Therefore, even during the upper arm on period in which switching element S5$b$ is turned off, the current path from node N1 toward node N2 formed by diode D5$b$ is secured.

Therefore, reflux path 213 during the dead time period via diode D5$a$ can be formed for each of reactor currents IL1 and IL2 (IL1>0, IL2>0). This reflux path 213 matches with current path 203 formed during the upper arm on period (FIG. 34). Therefore, in power converter 11, no recovery loss is caused in diodes D1 and D3 due to formation of a reflux path during the dead time period as in power converter 10.

Therefore, power converter 11 in the third embodiment can suppress a power loss in the series boost mode more than in power converter 10 shown in FIG. 1.

Figures 47, 48:
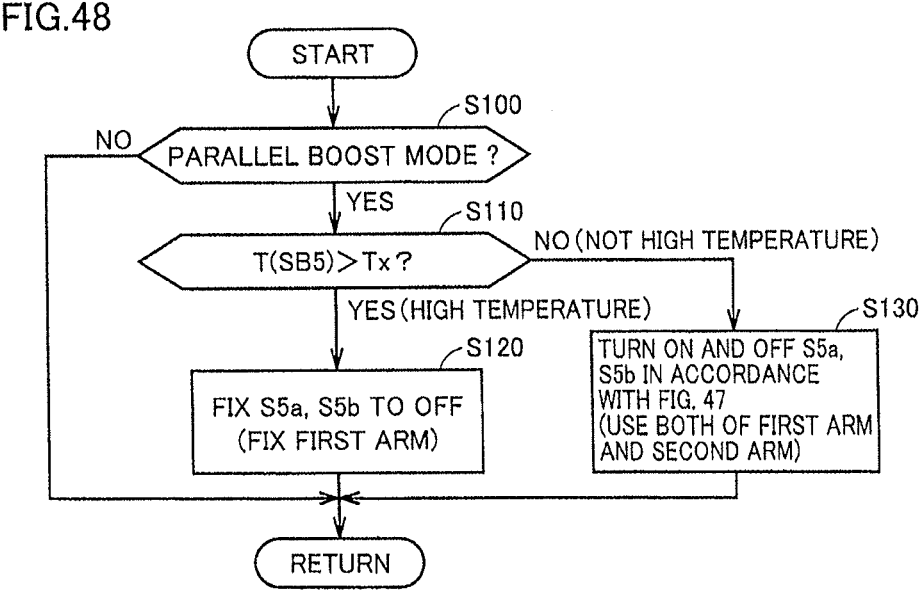
FIG. 47 is a chart showing a list of Boolean expressions for controlling on and off of each switching element in the parallel boost mode of the power converter according to the third embodiment.
FIG. 48 is a flowchart illustrating control for switching of a switching pattern in the parallel boost mode according to a modification of the third embodiment.

In power converter 11 having bidirectional switch SB5, on and off of switching elements S1 to S4, S5$a$, and S5$b$ is controlled in accordance with Boolean expressions shown in FIG. 47 in the parallel boost mode.

FIG. 47 is a chart showing a list of Boolean expressions for controlling on and off of each switching element in the parallel boost mode of power converter 11.

Referring to FIG. 47, on and off of switching elements S1 to S4 is controlled in accordance with the Boolean expressions as in FIG. 12, as in the parallel boost mode of power converter 10. Namely, switching element S2 is turned on and off in response to control pulse signal SD1, while switching element S1 is turned on and off in response to control pulse signal /SD1. Similarly, switching element S4 is turned on and off in response to control pulse signal SD2, while switching element S3 is turned on and off in response to control pulse signal /SD2. Control pulse signals SD1 and SD2 can be generated by converter control unit 250 shown in FIG. 13, as in power converter 10.

Furthermore, switching elements S5$a$ and S5$b$ are commonly turned on and off similarly to switching element S5 in power converter 10. Namely, during a period in which control pulse signals SD1 and SD2 are different from each other in logical level, switching elements S5$a$ and S5$b$ are both turned on. On the other hand, during a period in which control pulse signals SD1 and SD2 are the same in logical level, switching elements S5$a$ and S5$b$ are both turned off.

Thus, during the off period of switching elements S5$a$ and S5$b$, current paths between nodes N1 and N2 in both directions can be cut off as in the period during which switching element S5 is turned off in power converter 10. Namely, in the circuit state shown in (a) and (b) of FIG. 42 as well, nodes N1 and N2 can electrically be disconnected from each other. During the on period of switching elements S5$a$ and S5$b$, current paths between nodes N1 and N2 can be formed in both directions, as in the period during which switching element S5 is turned on in power converter 10.

Consequently, in power converter 11 as well, by turning on and off switching elements S1 to S4, S5$a$, and S5$b$ in accordance with the Boolean expressions shown in FIG. 47, DC/DC conversion as in the parallel boost mode of power converter 10 can be carried out.

In the parallel boost mode, regarding a current path between nodes N1 and N2, the current path from node N2 toward node N1 should be cut off when both of the B1L arm and the B2L arm are formed as described with reference to FIG. 6, and the current path from node N1 toward node N2 should be cut off when both of the B1U arm and the B2U arm are formed as described with reference to FIG. 7. Therefore, as described above, in addition to control for controlling each of switching elements S5$a$ and S5$b$ commonly to switching element S5, switching elements S5$a$ and S5$b$ can also be controlled separately from each other.

For example, switching element S5$a$ which cuts off the current path from node N1 toward node N2 should only be turned off at the time when the B1U arm and the B2U arm are formed, and therefore it may be controlled to be turned off only when a condition of SD1=SD2=L is satisfied. Namely, switching element S5$a$ may be controlled so as to be turned on when (SD1 or SD2) is at the H level and so as to be turned off when it is at the L level.

Similarly, switching element S5$b$ which cuts off the current path from node N2 toward node N1 should only be turned off at the time when the B1L arm and the B2L arm are formed, and therefore it may be controlled to be turned off only when a condition of SD1=SD2=H is satisfied. Namely, switching element S5$a$ may be controlled so as to be turned on when (/SD1 or/SD2) is at the H level and so as to be turned off when it is at the L level.

In the parallel boost mode of power converter 11 as well, carrier phase control according to the modification of the first embodiment can be applied. Namely, by providing a phase difference as shown in FIG. 30 or 31 between carrier waves CW1 and CW2 (FIG. 13) used for control of output from DC power supplies B1 and B2, a power loss in the parallel boost mode of power converter 11 can further be suppressed.

As described above, according to power converter 11 in which a bidirectional switch element is applied between nodes N1 and N2 as well, output voltage VH can be controlled based on high-efficiency DC/DC conversion to which the parallel boost mode and the series boost mode as in power converter 10 are selectively applied. Furthermore, power converter 11 according to the third embodiment can achieve further reduction in power loss in the series boost mode as compared with power converter 10, by eliminating a recovery loss in the diode while the reflux path during the dead time period is formed. Thus, DC/DC conversion in power converter 11 can further be higher in efficiency.

The configuration of the bidirectional switch applied to the power converter according to the third embodiment is not limited to the configuration exemplified in FIG. 43. Namely, a semiconductor element configured in any manner can be applied as bidirectional switch SB5 so long as it is configured to be able to independently control formation and cut-off of a bidirectional current path.

Modification of Third Embodiment

In power converter 11 according to the third embodiment, bidirectional switch SB5 is arranged as a semiconductor element between nodes N1 and N2. Bidirectional switch SB5, however, may be a portion lowest in thermal rating in power converter 11. Here, being low in thermal rating means that when a certain constant current passes for a certain period of time, temperature increase in a bidirectional switch is greater than temperature increase in another switching element.

Therefore, in a modification of the third embodiment, control of switching of a switching pattern suitable when bidirectional switch SB5 is more likely to increase in temperature than other switching elements S1 to S4 will be described.

FIG. 48 is a flowchart illustrating control of switching of a switching pattern according to the modification of the third embodiment. Control of switching of a switching pattern is applied during the parallel boost mode of power converter 11. Control processing in accordance with the flowchart shown in FIG. 48 is performed by control device 100 every prescribed period.

Referring to FIG. 48, control device 100 determines in step S100 whether or not the current operation mode of power converter 11 is set to the parallel boost mode.

When the parallel boost mode has been selected (determination as YES in S100), the process proceeds to step S110 and control device 100 determines whether or not a temperature T(SB5) of bidirectional switch SB5 is higher than a prescribed determination temperature Tx.

In determination in step S110, temperature T(SB5) can be sensed, for example, based on an output from a temperature sensor (not shown) provided in bidirectional switch SB5. Alternatively, temperature T(SB5) can also be estimated by estimating a thermal load of bidirectional switch SB5 based on history of a current which passes (transition over time of an amount of current) through bidirectional switch SB5.

When a condition of T(SB5)>Tx is satisfied (determination as YES in step S110), control device 100 determines that bidirectional switch SB5 is in a high-temperature state and the process proceeds to step S120. Control device 100 controls in step S120, on and off of switching elements S1 to S4, S5a, and S5b in the parallel boost mode so as to maintain bidirectional switch SB5 to the off state.

In this case, on and off of switching elements S1 to S4 is controlled in response to control pulse signals SD1 (/SD1) and SD2 (/SD2) in accordance with the Boolean expressions shown in FIG. 12 while switching elements S5a and S5b are fixed to the off state. Thus, when bidirectional switch SB5 is at a high temperature, passage of a current to bidirectional switch SB5 is avoided and further temperature increase can be avoided. Furthermore, by continually forming the boost chopper circuit including the first arm, DC/DC conversion in the parallel boost mode can be carried out.

On the other hand, when a condition of T(SB5)<=Tx is satisfied (determination as NO in step S110), control device 100 determines that bidirectional switch SB5 is in a non-high-temperature state and the process proceeds to step S130. Control device 100 controls in step S130 on and off of switching elements S1 to S4, S5a, and S5b in the parallel boost mode in accordance with the Boolean expressions shown in FIG. 47. Thus, when bidirectional switch SB5 is not at a high temperature, passage of a current to bidirectional switch SB5 is allowed and a circuit operation in the parallel boost mode in which the first arm and the second arm are both used can be performed.

Thus, according to control of switching of a switching pattern according to the modification of the third embodiment, when bidirectional switch SB5 is lower in thermal rating than other switching elements S1 to S4 in power converter 11 according to the third embodiment, DC/DC conversion in the parallel boost mode can be carried out so as to protect bidirectional switch SB5 against excessive temperature increase.

Furthermore, when bidirectional switch SB5 is not at a high temperature, as in power converter 10, high-efficiency DC/DC conversion in which a conduction loss in the switching element is reduced can be carried out.

Control of switching of a switching pattern according to the modification of the third embodiment can also be applied to the power supply system (FIG. 2) according to the first embodiment during an operation in the parallel boost mode. In this case, determination in step S110 is made based on a temperature of switching element S5, and on and off of switching elements S1 to S4 is controlled in accordance with the Boolean expressions shown in FIG. 12 when a temperature of switching element T5 is high (S120) while switching element S5 is fixed to the off state. On the other hand, when a temperature of switching element T5 is not high (S130), on and off of switching elements S1 to S5 is controlled in accordance with the Boolean expressions shown in FIG. 12.

Fourth Embodiment

In a fourth embodiment, an operation mode other than the series boost mode and the parallel boost mode described in the first to third embodiments will be described.

FIG. 49 is a chart showing a list of a plurality of operation modes applied to power converters 10 and 11.

Referring to FIG. 49, the plurality of operation modes are broadly categorized into a "boost mode" in which output voltage VH is controlled in accordance with voltage command value VH* and a "direct coupling mode" in which on and off of switching elements S1 to S5 (S5a and S5b) is fixed and DC power supply (power supplies) B1 and/or B2 are/is electrically connected to power lines PL and GL.

The boost mode includes the parallel boost mode and the series boost mode described above. In the parallel boost mode, by controlling on and off of switching elements S1 to S5 of power converter 10 in accordance with the Boolean expressions shown in FIG. 12, DC/DC conversion can be carried out in parallel between DC power supplies B1 and B2 and power lines PL and GL (load 30). Similarly, by controlling on and off of switching elements S1 to S5a and S5b of power converter 11 in accordance with the Boolean expressions shown in FIG. 47, DC/DC conversion can be carried out in parallel between DC power supplies B1 and B2 and power lines PL and GL (load 30). In the parallel boost mode, output voltage VH can be controlled in accordance with voltage command value VH* while a ratio of power allocation between DC power supplies B1 and B2 is controlled.

In the series boost mode, by controlling on and off of switching elements S1 to S5 of power converter 10 in accordance with the Boolean expressions shown in FIG. 35, DC/DC conversion can be carried out while DC power supplies B1 and B2 are connected in series. Similarly, by controlling on and off of switching elements S1 to S5a and S5b of power converter 11 in accordance with the Boolean expressions shown in FIG. 44, DC/DC conversion can be carried out while DC power supplies B1 and B2 are connected in series. In the series boost mode, since a ratio of power allocation between DC power supplies B1 and B2 is automatically determined by a ratio between voltages V[1] and V[2] in control of output voltage VH in accordance with voltage command value VH*, direct control as in the parallel boost mode cannot be carried out.

Though the series boost mode can be adapted only to a high-voltage range expressed as VH>(V[1]+V[2]), a boost ratio in the high-voltage range can be lowered and hence DC/DC conversion can be high in efficiency. On the other hand, the parallel boost mode can be adapted also to a voltage range expressed as max(V[1], V[2])<VH<=V[1]+V[2] and hence an output voltage range is wide. Furthermore, since a ratio of power allocation between DC power supplies B1 and B2 can be controlled, a state of charge (SOC) of each of DC power supplies B1 and B2 can also be controlled.

Furthermore, the boost mode includes a "mode of boost by DC power supply B1 (hereinafter a B1 boost mode)" in which only DC power supply B1 is used to carry out DC/DC conversion between the DC power supply and power lines PL and GL (load 30) and a "mode of boost by DC power supply B2 (hereinafter a B2 boost mode)" in which only DC power supply B2 is used to carry out DC/DC conversion between the DC power supply and power lines PL and GL (load 30). In an operation mode other than the parallel boost mode and the series boost mode, an operation for turning on and off each of switching elements S5a and S5b is common to an operation for turning on and off switching element S5 of power converter 10.

In the B1 boost mode, so long as output voltage VH is controlled to be higher than V[2], DC power supply B2 is not used, with a state electrically disconnected from power line PL being maintained. In the B1 boost mode, only the boost chopper circuit (the first arm) for DC power supply B1 is implemented. Therefore, switching elements S3 and S4 are fixed to off while the current path between nodes N1 and N2 is cut off by fixing switching element S5 (S5a and S5b) to off, while on and off of switching elements S1 and S2 is controlled in response to control pulse signals /SD1 and SD1 based on duty ratio DT1 for controlling output from DC power supply B1.

Similarly, in the B2 boost mode, so long as output voltage VH is controlled to be higher than V[1], DC power supply B1 is not used, with a state electrically disconnected from power line PL being maintained.

In the B2 boost mode, only the boost chopper circuit (the first arm) for DC power supply B2 is implemented. Therefore, switching elements S1 and S2 are fixed to off while the current path between nodes N1 and N2 is cut off by fixing switching element S5 (S5a and S5b) to off, while on and off of switching elements S3 and S4 is controlled in response to control pulse signals /SD2 and SD2 based on duty ratio DT2 for controlling output from DC power supply B2. In the B1 boost mode and the B2 boost mode, duty ratio DT1 or DT2 is calculated so as to control output voltage VH in accordance with voltage command value VH* (voltage control). Thus, in each of the operation modes belonging to the boost mode, output voltage VH is controlled in accordance with voltage command value VH*.

On the other hand, the direct coupling mode includes a "mode of direct coupling of DC power supply B1 (hereinafter a B1 direct coupling mode)" in which a current path to power lines PL and GL is formed only for DC power supply B1 and a "mode of direct coupling of DC power supply B2 (hereinafter a B2 direct coupling mode)" in which a current path to power lines PL and GL is formed only for DC power supply B2.

In the B1 direct coupling mode, switching element S1 is fixed to on while a current path between nodes N1 and N2 is cut off by fixing switching element S5 (S5a and S5b) to off, while switching elements S2 to S4 are fixed to off. Thus, since DC power supply B2 is disconnected between power lines PL and GL, output voltage VH is comparable to voltage V[1] of DC power supply B1 (VH=V[1]). In the B1 direct coupling mode, DC power supply B2 is not used, with a state electrically disconnected between power lines PL and GL being maintained. If the B1 direct coupling mode is applied in the state of V[2]>V[1], a short-circuiting current is produced from DC power supply B2 to DC power supply B1 via switching element S1 and diode D3. Therefore, a condition of V[1]>V[2] is required for application of the B1 direct coupling mode.

Similarly, in the B2 direct coupling mode, switching element S3 is fixed to on while a current path between nodes N1 and N2 is cut off by fixing switching element S5 (S5a and S5b) to off, while switching elements S1, S2, and S4 are fixed to off. Thus, since DC power supply B1 is disconnected between power lines PL and GL, output voltage VH is comparable to voltage V[2] of DC power supply B2 (VH=V[2]). In the B2 direct coupling mode, DC power supply B1 is not used, with a state electrically disconnected between power lines PL and GL being maintained. If the B2 direct coupling mode is applied in the state of V[1]>V[2], a short-circuiting current will be produced from DC power supply B1 to DC power supply B2 via diode D1 and switching element S3. Therefore, a condition of V[2]>V[1] is required for application of the B2 direct coupling mode.

When V[1] and V[2] are comparable to each other, a "parallel direct coupling mode" in which a state that DC power supplies B1 and B2 are electrically connected in parallel between power lines PL and GL is maintained can also be selected. In the parallel direct coupling mode, switching elements S1 and S3 are fixed to on while the current path between nodes N1 and N2 is cut off by fixing switching element S5 (S5a and S5b) to off, while switching elements S2 and S4 are fixed to off. Thus, output voltage VH is comparable to V[1] and V[2]. Since a voltage difference between V[1] and V[2] produces a short-circuiting current between DC power supplies B1 and B2, the parallel direct coupling mode can be applied only when the voltage difference is small.

Furthermore, the direct coupling mode includes a "series direct coupling mode" in which a state that DC power supplies B1 and B2 are electrically connected in series between power lines PL and GL is maintained. In the series direct coupling mode, switching elements S1 to S4 are fixed to off while the current path between nodes N1 and N2 is formed by fixing switching element S5 (S5a and S5b) to on. Thus, output voltage VH is comparable to the sum of voltages V[1] and V[2] of DC power supplies B1 and B2 (VH=V[1]+V[2]).

Since output voltage VH is determined depending on voltages V[1] and V[2] of DC power supplies B1 and B2 in each of the operation modes included in the direct coupling mode, the output voltage cannot directly be controlled. Therefore, since output voltage VH cannot be set to a voltage suitable for an operation of load 30 in each operation mode included in the direct coupling mode, a power loss in load 30 may increase.

On the other hand, since each of switching elements S1 to S5 (S5a and S5b) is not turned on and off in the direct coupling mode, a power loss (a switching loss involved with turning on and off) in power converters 10 and 11 is suppressed. Therefore, depending on an operation state of load 30, a power loss in power supply system 5 as a whole may be suppressed by application of the direct coupling mode, because an amount of reduction in power loss in power converters 10 and 11 is greater than an amount of increase in power loss in load 30.

Thus, power converters 10 and 11 can control output voltage VH while a plurality of operation modes shown in FIG. 49 are selectively applied by switching a switching pattern of switching elements S1 to S5 (S5a and S5b).

In FIG. 49, the parallel boost mode corresponds to the "first mode" and the series boost mode corresponds to the "second mode". The B1 boost mode corresponds to the "third mode", the B2 boost mode corresponds to the "fourth mode", the B1 direct coupling mode corresponds to the "fifth mode", and the B2 direct coupling mode corresponds to the "sixth mode". The series direct coupling mode corresponds to the "seventh mode".

It is noted for confirmation purpose that load 30 can be implemented by any device in the present embodiment so long as the device operates with a DC voltage (output voltage VH). Namely, though an example in which load 30 is configured to include a motor for running of an electrically powered vehicle has been described in the present embodiment, application of the present invention is not limited to such a load.

Further Modification of Configuration of Power Converter

In the present embodiment, an example in which the "first semiconductor element" to the "fourth semiconductor element" are implemented by pairs of switching elements S1 to S4 and anti-parallel diodes D1 to D4, respectively, has been described. In addition, an example in which the "fifth semiconductor element" is implemented by switching element S5 in which no anti-parallel diode is provided (the first embodiment) or by a pair of switching elements S5a and S5b for implementing a bidirectional switch has been shown. Namely, a configuration in which the "first semiconductor element" to the "fifth semiconductor element" each include a switching element which can control formation (on) and cut-off (off) of a current path has been exemplified. In such a configuration example, regenerative charging can be applied to both of DC power supplies B1 and B2.

In a configuration in which one or neither of DC power supplies B1 and B2 is regeneratively charged, however, some of the "first semiconductor element" to the "fourth semiconductor element" can be simplified in structure by omitting either a switching element or a diode. Namely, such a configuration that only some of the "first semiconductor element" to the "fifth semiconductor element" have switching elements is also possible in principle.

Figure 50:
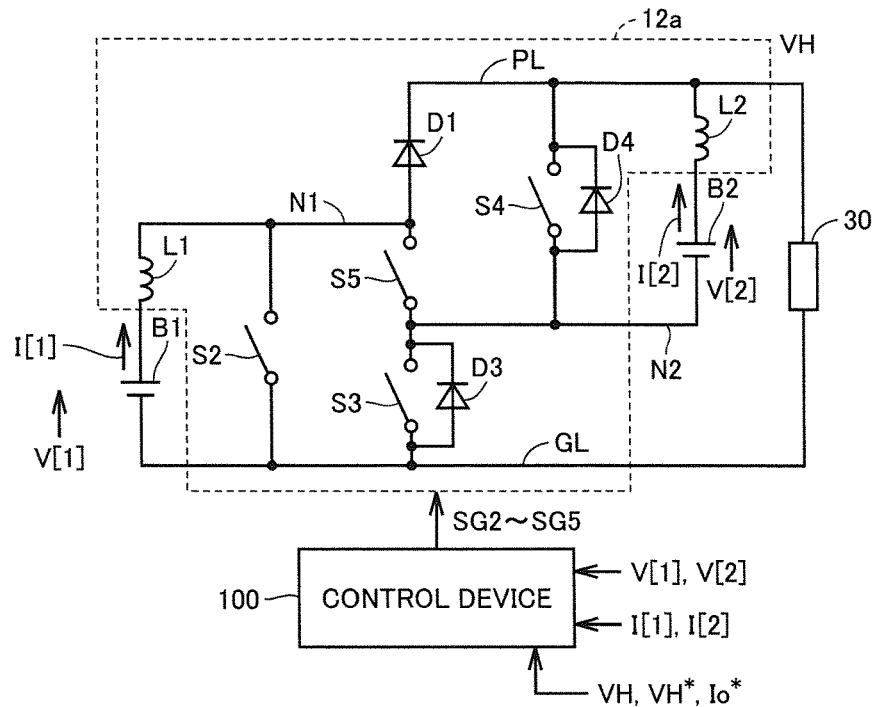
FIG. 50 is a circuit diagram showing a modification of the configuration of the power converter shown in FIG. 1 when a first DC power supply is not regeneratively charged.

For example, when DC power supply B1 is not regeneratively charged but used only for discharging (power running), a configuration of a power converter 12a shown in FIG. 50 can be employed instead of power converter 10 shown in FIG. 1.

Referring to FIG. 50, in power converter 12a, arrangement of switching element S1 for controlling regeneration to DC power supply B1 can be omitted as compared with power converter 10 shown in FIG. 1. Namely, the "first semiconductor element" between node N1 and power line PL can be implemented only by diode D1. In power converter 12a as well, on and off of switching elements S2 to S5 is controlled in accordance with FIG. 12 (the parallel boost mode), FIG. 35 (the series boost mode), or FIG. 49 (other modes). Furthermore, in power converter 12a, diode D2 arranged mainly for securing a path for a regenerative current to DC power supply B1 can also be omitted.

Figure 51:
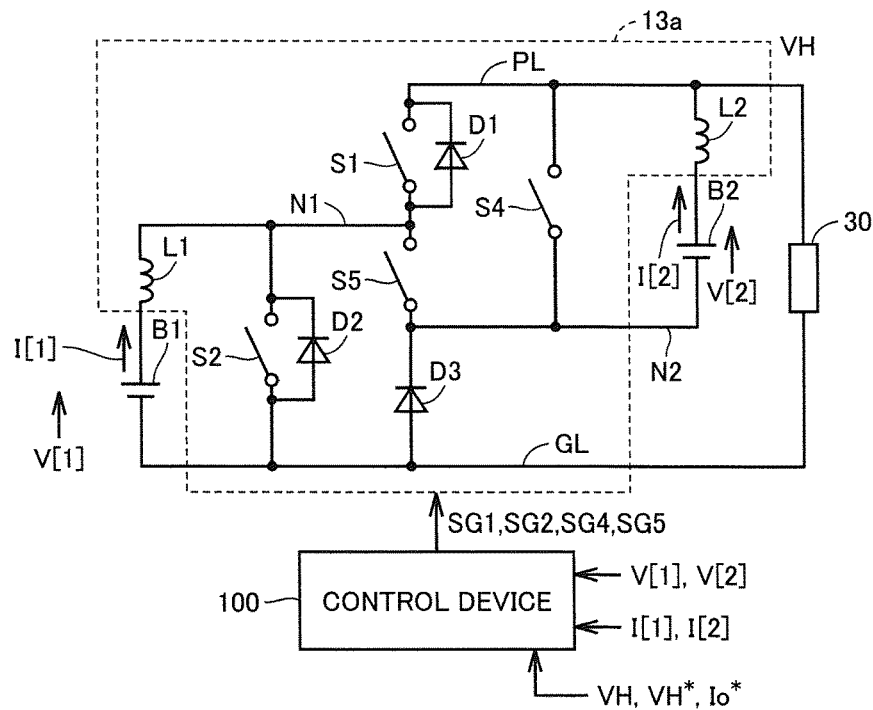
FIG. 51 is a circuit diagram showing a modification of the configuration of the power converter shown in FIG. 1 when a second DC power supply is not regeneratively charged.

Similarly, when DC power supply B2 is not regeneratively charged but used only for discharging (power running), a configuration of a power converter 13a shown in FIG. 51 can be employed. Referring to FIG. 51, in power converter 13a, arrangement of switching element S3 for controlling regeneration to DC power supply B2 can be omitted as compared with power converter 10 shown in FIG. 1. Namely, the "third semiconductor element" between node N2 and power line GL can be implemented only by diode D3. In power converter 13a as well, on and off of switching elements S1, S2, S4, and S5 is controlled in accordance with FIG. 12 (the parallel boost mode), FIG. 35 (the series boost mode), or FIG. 49 (other modes). Furthermore, in power converter 13a, diode D4 arranged mainly for securing a path for a regenerative current to DC power supply B2 can also be omitted.

Figure 52:
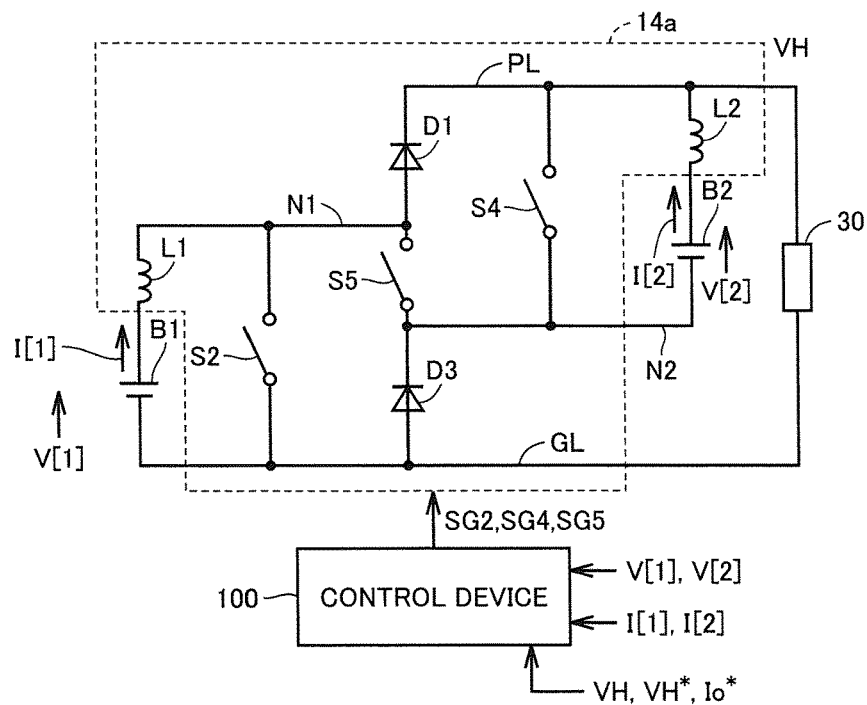
FIG. 52 is a circuit diagram showing a modification of the configuration of the power converter shown in FIG. 1 when the first and second DC power supplies are not regeneratively charged.

Furthermore, when neither of DC power supplies B1 and B2 is regeneratively charged but they are used only for discharging (power running), a configuration of a power converter 14a shown in FIG. 52 can be employed. Referring to FIG. 52, in power converter 14a, arrangement of switching elements S1 and S3 for controlling regeneration to DC power supplies B1 and B2 can be omitted as compared with power converter 10 shown in FIG. 1. Namely, the "first semiconductor element" between node N1 and power line PL can be implemented only by diode D1 and the "third semiconductor element" between node N2 and power line GL can be implemented only by diode D3. In power converter 14a as well, on and off of switching elements S2, S4, and S5 is controlled in accordance with FIG. 12 (the parallel boost mode), FIG. 35 (the series boost mode), or FIG. 49 (other modes). Furthermore, in power converter 14a, diodes D2 and D4 arranged mainly for securing a path for a regenerative current to DC power supplies B1 and B2 can also be omitted.

When even one of DC power supplies B1 and B2 cannot be regenerated in the series boost mode in power converter 11 in FIG. 43, an operation is limited to a power running operation, and hence it is not necessary to provide switching element S5b.

In the parallel boost mode as well, for example, when neither of DC power supplies B1 and B2 can be regenerated and an operation is limited to the power running operation, as is understood from FIG. 25, no current is produced in a direction of passage through switching element S5b. Alternatively, when only one of DC power supplies B1 and B2 cannot be regenerated and it performs the power running operation, no current flows through switching element S5 as described with reference to FIG. 28. As shown in FIG. 49, in any of the B1 boost mode, the B2 boost mode, the B1 direct coupling mode, and the B2 direct coupling mode, a current does not flow through switching element S5 (switching elements S5a and S5b).

Therefore, when even one of DC power supplies B1 and B2 is not regeneratively charged in the circuit configuration (FIG. 43) in the third embodiment, the current path from node N2 toward node N1 is not constantly necessary, and it is not necessary to provide switching element S5b and diode D5b. Namely, the "fifth semiconductor element" can also be configured to have only a function to turn on and off a current path from node N1 toward node N2.

Figure 53:
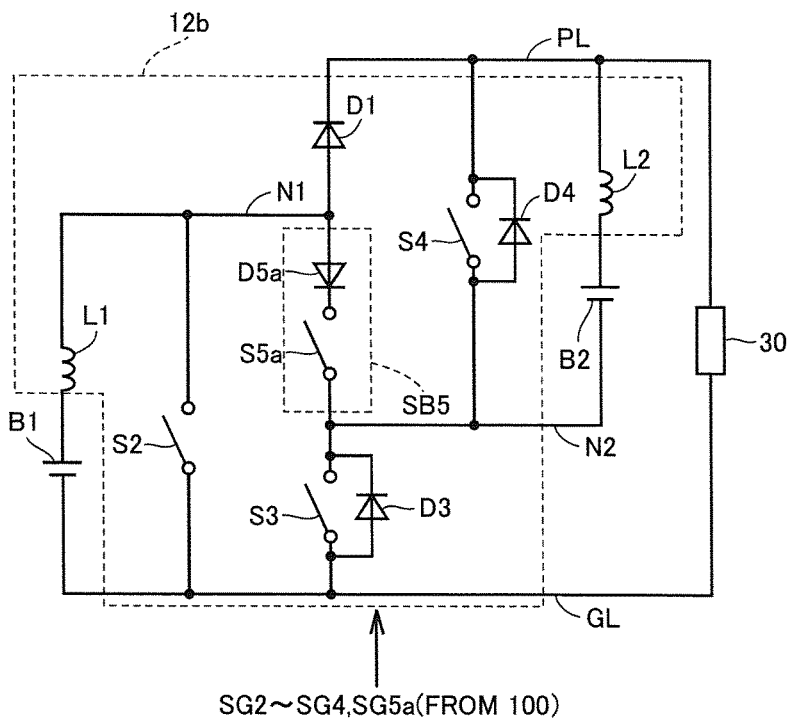
FIG. 53 is a circuit diagram showing a modification of the configuration of the power converter shown in FIG. 43 when the first DC power supply is not regeneratively charged.

Therefore, when DC power supply B1 is not regeneratively charged but used only for discharging (power running), a configuration of a power converter 12b shown in FIG. 53 can also be employed instead of power converter 11 shown in FIG. 43.

Referring to FIG. 53, in power converter 12b, switching element S5a and diode D5a for controlling formation/cut-off of a current path from node N1 toward node N2 are arranged instead of switching element S5, as compared with power converter 12a shown in FIG. 50. Namely, in power converter 12b, arrangement of switching element S1 for controlling regeneration to DC power supply B1 is omitted and switching element S5b and diode D5b for the "fifth semiconductor element" are omitted, as compared with the configuration of power converter 11 shown in FIG. 43. Diode D2 can also be omitted, as in power converter 12a (FIG. 50). In power converter 12b as well, on and off of switching elements S2 to S4 and S5a is controlled in accordance with FIG. 47 (the parallel boost mode), FIG. 44 (the series boost mode), or FIG. 49 (other modes).

Figure 54:
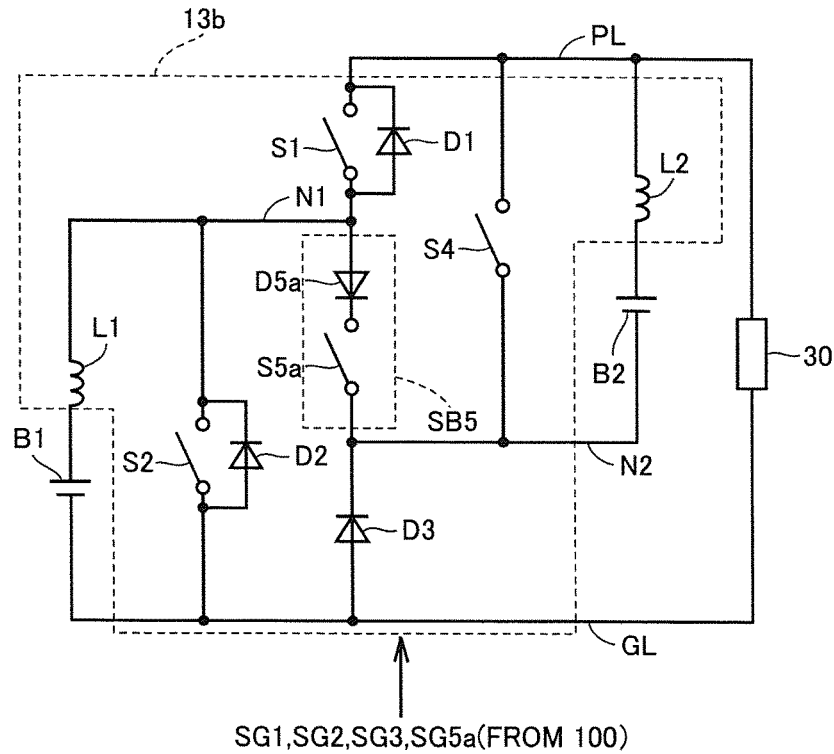
FIG. 54 is a circuit diagram showing a modification of the configuration of the power converter shown in FIG. 43 when the second DC power supply is not regeneratively charged.

When DC power supply B2 is not regeneratively charged but used only for discharging (power running), a configuration of a power converter 13b shown in FIG. 54 can also be employed instead of power converter 11 shown in FIG. 43.

Referring to FIG. 54, in power converter 13b, switching element S5a and diode D5a for controlling formation/cut-off of a current path from node N1 toward node N2 are arranged instead of switching element S5, as compared with power converter 13a shown in FIG. 51. Namely, in power converter 13b, arrangement of switching element S3 for controlling regeneration to DC power supply B2 is omitted and switching element S5b and diode D5b for the "fifth semiconductor element" are omitted, as compared with the configuration of power converter 11 shown in FIG. 43. Diode D4 can also be omitted, as in power converter 13a (FIG. 51). In power converter 13b as well, on and off of switching elements S1, S2, S4, and S5a is controlled in accordance with FIG. 47 (the parallel boost mode), FIG. 44 (the series boost mode), or FIG. 49 (other modes).

Figure 55:
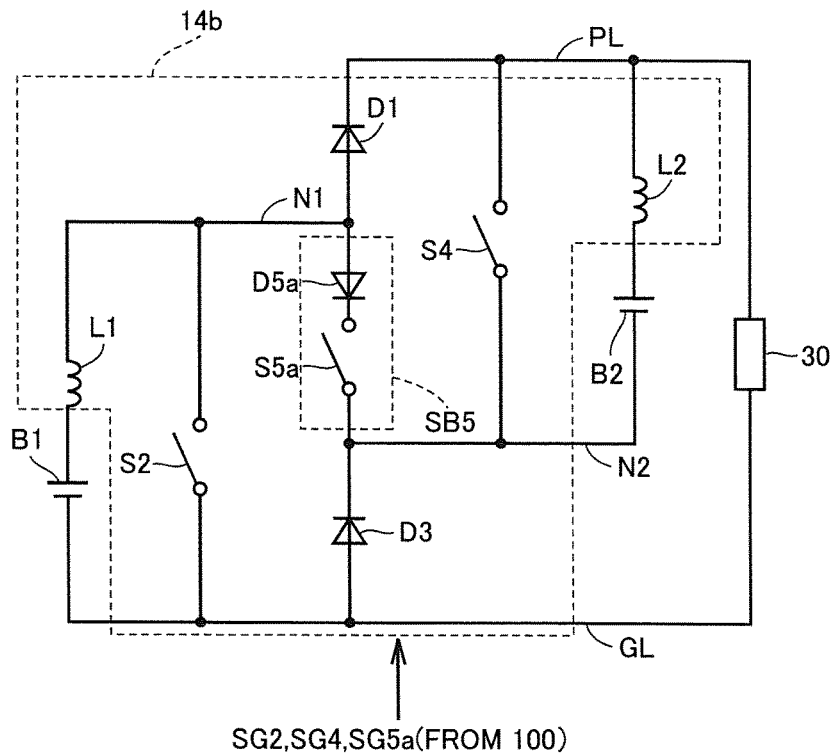
FIG. 55 is a circuit diagram showing a modification of the configuration of the power converter shown in FIG. 43 when the first and second DC power supplies are not regeneratively charged.

Similarly, when neither of DC power supplies B1 and B2 is regeneratively charged but they are used only for discharging (power running), a configuration of a power converter 14b shown in FIG. 55 can also be employed instead of power converter 11 shown in FIG. 43.

Referring to FIG. 55, in power converter 14b, switching element S5a and diode D5a for controlling formation/cut-off of a current path from node N1 toward node N2 are arranged instead of switching element S5, as compared with power converter 14a shown in FIG. 52. Namely, in power converter 14b, arrangement of switching elements S1 and S3 for controlling regeneration to DC power supplies B1 and B2 is omitted and switching element S5b and diode D5b for the "fifth semiconductor element" are omitted, as compared with the configuration of power converter 11 shown in FIG. 43. Diodes D2 and D4 can also be omitted, as in power converter 14a (FIG. 52). In power converter 14b as well, on and off of switching elements S2, S4, and S5a is controlled in accordance with FIG. 47 (the parallel boost mode), FIG. 44 (the series boost mode), or FIG. 49 (other modes).

Power converter 14b (FIG. 55) which regeneratively charges neither of DC power supplies B1 and B2 is configured such that the "first semiconductor element" is implemented by diode D1, the "second semiconductor element" is implemented by switching element S2, the "third semiconductor element" is implemented by diode D3, the "fourth semiconductor element" is implemented by switching element S4, and further the "fifth semiconductor element" has only a function to turn on and off at least a current path from node N1 toward node N2. This configuration corresponds to a configuration minimum necessary for carrying out DC power conversion (DC/DC conversion) between DC power supplies B1 and B2 and power lines PL and GL, by switching among a plurality of operation modes. In power converter 14a in FIG. 52, the "fifth semiconductor element" is configured to have a function to be able to commonly turn on and off a current path from node N2 toward node N1, in addition to a current path from node N1 toward node N2.

By further providing switching element S1 in the "first semiconductor element" in the configuration of power converter 14a (FIG. 52) and power converter 14b (FIG. 55), DC power supply B1 can regeneratively be charged (FIGS. 51 and 54). In this case, as shown also in FIGS. 51 and 54,  diode D2 is preferably connected in anti-parallel to switching element S2. By further providing switching element S3 in the "third semiconductor element" in the configuration of power converter 14a (FIG. 52) and power converter 14b (FIG. 55), DC power supply B2 can regeneratively be charged (FIGS. 50 and 53). In this case, as shown also in FIGS. 50 and 53, diode D4 is preferably connected in anti-parallel to switching element S4.

Control of switching of a switching pattern according to the modification of the third embodiment based on a temperature of switching element S5 or S5a can be applied also in power converters 12a, 12b, 13a, 13b, 14a, and 14b shown in FIGS. 50 to 55.

Regenerative charging can be applied to both of DC power supplies B1 and B2 by implementing each of the "first semiconductor element" to the "fourth semiconductor element" with a set of a switching element and a diode and having the "fifth semiconductor element" have a function to cut off a bidirectional current (a current from node N1 toward node N2 and a current from node N2 toward node N1) as in power converter 10 (FIG. 1) or power converter 11 (FIG. 43).

Though connection relation of switching elements S1 to S5 (SB5) and reactors L1 and L2 in the configuration of power converters 10 and 11 has been illustrated and described in the present embodiment, it is not intended to limit constituent elements of power converters 10 and 11 to these elements. Namely, in the present embodiment, the description constituent elements "being electrically connected" to each other encompasses the fact that other circuit elements or connector terminals are present between constituent elements and electrical connection between elements is ensured via other circuit elements.

For example, when the configuration exemplified in FIG. 1 or 43 is configured such that a circuit portion (switching elements S3 to S5, diodes D3 and D4, reactor L2, and DC power supply B2) which remains in a general boost chopper circuit constituted of DC power supply B1, reactor L1, switching elements S1 and S2, and diodes D1 and D2 is made up as a separate unit and the unit is electrically connected to the boost chopper circuit through a connector terminal as well, the power converter and the power supply system according to the present embodiment are implemented so long as electrical connection relation among illustrated circuit elements is the same.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5 power supply system; 10, 11, 12a, 12b, 13a, 13b, 14a, 14b power converter; 10# power converter (comparative example); 30 load; 32 inverter; 35 motor generator; 36 power train; 37 drive wheel; 100 control device; 101, 102, 111-118, 121-126, 201-203 current path; 211, 212, 213a, 213b current path (reflux path); 250, 251 converter control unit; 252, 254 subtraction portion; 210, 220, 225 controller; 230 control unit; 240 carrier wave generation portion; B1, B2 DC power supply; CH smoothing capacitor; CHP boost chopper circuit; CW, CW1, CW2 carrier wave; D1-D4 anti-parallel diode; DT, DT1, DT2 duty ratio; GL, PL power line; GND ground voltage; IL, ILL IL2 reactor current; L, L1, L2 reactor; N1, N2 node; Pls1-Pls3 conduction loss;

Q1-Q4, S1-S4, S5a, S5b power semiconductor switching element; SB5 power semiconductor switching element (bi-directional switch); SD, SD1, SD2 control pulse signal; SG1-SG5 control signal; T0, T1, T2, T3 time; Tx determination temperature; VH output voltage; VH* voltage command value.

The invention claimed is:

1. A power supply system for controlling a DC voltage between a first power line on a high voltage side and a second power line on a low voltage side, comprising:
   a first DC power supply;
   a second DC power supply;
   a power converter for carrying out DC voltage conversion between said first and second DC power supplies and said first and second power lines; and
   a control device for controlling an operation of said power converter,
   said power converter including
   a first semiconductor element electrically connected between said first power line and a first node,
   a first reactor electrically connected in series with said first DC power supply, between said first node and said second power line,
   a second semiconductor element electrically connected between said second power line and said first node,
   a second reactor electrically connected in series with said second DC power supply, between a second node and said first power line,
   a third semiconductor element electrically connected between said second node and said second power line,
   a fourth semiconductor element electrically connected between said first power line and said second node, and
   a fifth semiconductor element electrically connected between said first node and said second node,
   at least some of said first to fifth semiconductor elements each including a switching element which is configured to control formation and cut-off of a current path in response to a signal from said control device, and
   said power converter operating as switching among a plurality of operation modes different in manner of said DC voltage conversion, by switching a manner of on/off control of said switching element by said control device.

2. The power supply system according to claim 1, wherein each of said first to fourth semiconductor elements includes
   the switching element for selectively forming an on state in which the current path is formed and an off state in which the current path is cut off, in response to the signal from said control device, and
   a diode connected in anti-parallel to said switching element, for forming a current path during forward biasing, and
   said fifth semiconductor element includes the switching element for selectively forming an on state in which a current path between said first and second nodes is formed and an off state in which the current path is cut off, in response to a signal from said control device.

3. The power supply system according to claim 1, wherein each of said first to fourth semiconductor elements includes
   the switching element for selectively forming an on state in which the current path is formed and an off state in which the current path is cut off, in response to the signal from said control device, and
   a diode connected in anti-parallel to said switching element, for forming a current path during forward biasing, and
   said fifth semiconductor element includes
   a first sub switching element for selectively forming an on state in which a current path from said first node toward said second node is formed between said first and second nodes and an off state in which the current path is cut off, in response to the signal from said control device, and
   a second sub switching element for selectively forming an on state in which a current path from said second node toward said first node is formed between said first and second nodes and an off state in which the current path is cut off, in response to the signal from said control device.

4. The power supply system according to claim 1, wherein
   the switching element for selectively forming an on state in which the current path is formed and an off state in which the current path is cut off in response to the signal from said control device is provided in each of said second and fourth semiconductor elements,
   a diode connected to have a direction from said first node toward said first power line as a forward direction and a diode connected to have a direction from said second power line toward said second node as the forward direction are provided in said first and third semiconductor elements, respectively, and
   the switching element for controlling formation and cut-off of at least the current path from said first node to said second node is provided in said fifth semiconductor element.

5. The power supply system according to claim 4, wherein
   the switching element connected in parallel with said diode is further provided in any one of said first and third semiconductor elements, and the switching element selectively forms said on state and said off state in response to the signal from said control device.

6. The power supply system according to claim 2, wherein
   said plurality of operation modes include a first mode for carrying out DC voltage conversion in parallel between said first and second DC power supplies and said first and second power lines,
   in said first mode, said control device controls on and off of said switching elements in said first and second semiconductor elements in accordance with an output duty ratio from said first DC power supply and controls on and off of said switching elements in said third and fourth semiconductor elements in accordance with an output duty ratio from said second DC power supply, and
   in said fifth semiconductor element, at least a current path from said first node toward said second node is not formed during a period in which said current path is formed in both of said first and third semiconductor elements, while at least a current path from said second node toward said first node is not formed during a period in which said current path is formed in both of said second and fourth semiconductor elements.

7. The power supply system according to claim 6, wherein
   in said first mode, said control device varies a phase difference between a first carrier wave used for first pulse width modulation control for controlling an output from said first DC power supply and a second carrier wave used for second pulse width modulation control for controlling an output from said second DC power supply in accordance with the output duty ratio from said first DC power supply and the output duty ratio from said second DC power supply, and controls formation and cut-off of said current path by each said switching element based on a first control pulse signal obtained in said first pulse width modulation control and a second control pulse signal obtained in said second pulse width modulation control.

8. The power supply system according to claim 7, wherein said control device adjusts said phase difference such that an inflection point of a current of said first reactor and an inflection point of a current of said second reactor are identical in timing in said first mode.

9. The power supply system according to claim 6, wherein said plurality of operation modes further include a second mode for carrying out DC voltage conversion between said first and second DC power supplies connected in series and said first and second power lines, and in said second mode, said control device controls on and off of each said switching element such that a first period and a second period are alternately provided, in said first period, said switching elements in said second and fourth semiconductor elements are set to said on state, and in said second period, said switching elements in said second and fourth semiconductor elements are set to said off state and a current path through said fifth semiconductor element is formed between said first and second nodes.

10. The power supply system according to claim 9, wherein said plurality of operation modes further include a third mode in which DC voltage conversion is carried out between said first DC power supply and said first and second power lines, and a state of electrical disconnection of said second DC power supply between said first and second power lines is maintained, and a fourth mode in which DC voltage conversion is carried out between said second DC power supply and said first and second power lines, and a state of electrical disconnection of said first DC power supply between said first and second power lines is maintained, and said control device controls in said third mode, said DC voltage between said first and second power lines by maintaining said switching elements in said third, fourth, and fifth semiconductor elements in the off state and controlling on and off of said switching elements in said first and second semiconductor elements, and in said fourth mode, said DC voltage between said first and second power lines by maintaining said switching elements in said first, second, and fifth semiconductor elements in said off state and controlling on and off of said switching elements in said third and fourth semiconductor elements.

11. The power supply system according to claim 9, wherein said plurality of operation modes further include a fifth mode in which a state that said first DC power supply is electrically connected between said first and second power lines and said second DC power supply is electrically disconnected between said first and second power lines is maintained, a sixth mode in which a state that said second DC power supply is electrically connected between said first and second power lines and said first DC power supply is electrically disconnected between said first and second power lines is maintained, and a seventh mode in which a state that said first and second DC power supplies are electrically connected in series between said first and second power lines is maintained.

12. The power supply system according to claim 10, wherein said plurality of operation modes further include a fifth mode in which a state that said first DC power supply is electrically connected between said first and second power lines and said second DC power supply is electrically disconnected between said first and second power lines is maintained, a sixth mode in which a state that said second DC power supply is electrically connected between said first and second power lines and said first DC power supply is electrically disconnected between said first and second power lines is maintained, and a seventh mode in which a state that said first and second DC power supplies are electrically connected in series between said first and second power lines is maintained.

13. The power supply system according to claim 2, wherein said plurality of operation modes include a first mode for carrying out DC voltage conversion in parallel between said first and second DC power supplies and said first and second power lines, and in said first mode, said control device fixes said switching element in said fifth semiconductor element to off and controls on and off of said switching elements in said first to fourth semiconductor elements when a temperature of said fifth semiconductor element is higher than a prescribed determination temperature, and controls on and off of said switching elements in said first to fifth semiconductor elements when a temperature of said fifth semiconductor element is lower than said determination temperature.

* * * * *